(12) United States Patent
Whelan et al.

(10) Patent No.: US 8,910,246 B2
(45) Date of Patent: Dec. 9, 2014

(54) CONTEXTUAL-BASED VIRTUAL DATA BOUNDARIES

(75) Inventors: David A. Whelan, Newport Coast, CA (US); Gregory M. Gutt, Ashburn, VA (US); David G. Lawrence, Santa Clara, CA (US); Michael L. O'Connor, Redwood City, CA (US); Arun Ayyagari, Seattle, WA (US); Rachel Rane' Schmalzried, San Jose, CA (US)

(73) Assignee: The Boeing Company, Chicago, IL (US)

( * ) Notice: Subject to any disclaimer, the term of this patent is extended or adjusted under 35 U.S.C. 154(b) by 82 days.

(21) Appl. No.: 13/471,178

(22) Filed: May 14, 2012

(65) Prior Publication Data

US 2013/0031598 A1    Jan. 31, 2013

Related U.S. Application Data

(63) Continuation-in-part of application No. 12/949,404, filed on Nov. 18, 2010, and a continuation-in-part of application No. 13/073,830, filed on Mar. 28, 2011, now Pat. No. 8,584,205.

(51) Int. Cl.
| | |
|---|---|
| *H04L 29/06* | (2006.01) |
| *H04L 9/32* | (2006.01) |
| *G01S 1/72* | (2006.01) |
| *H04B 7/185* | (2006.01) |
| *H04W 12/06* | (2009.01) |
| *H04W 12/08* | (2009.01) |
| *H04W 4/02* | (2009.01) |

(52) U.S. Cl.
CPC ............ *H04L 9/3239* (2013.01); *G01S 1/725* (2013.01); *H04B 7/18593* (2013.01); *H04L 63/083* (2013.01); *H04L 63/107* (2013.01); *H04L 63/108* (2013.01); *H04W 12/06* (2013.01); *H04W 12/08* (2013.01); *H04L 2209/805* (2013.01); *H04W 4/021* (2013.01)
USPC ............................................................ 726/3

(58) Field of Classification Search
USPC ..................................... 726/3, 5, 22; 713/168
See application file for complete search history.

(56) References Cited

U.S. PATENT DOCUMENTS

| 6,430,504 B1 * | 8/2002 | Gilbert et al. ................. 701/475 |
| 7,042,392 B2 | 5/2006 | Whelan et al. |

(Continued)

FOREIGN PATENT DOCUMENTS

| EP | 0997808 A1 | 5/2000 |
| EP | 2573998 A2 | 3/2013 |

OTHER PUBLICATIONS

PCT International Search Report and Written Opinion, for PCT Application No. PCT/US2013/038282, Aug. 12, 2013.

*Primary Examiner* — Ali Abyaneh
(74) *Attorney, Agent, or Firm* — Vista IP Law Group LLP; Cynthia A. Dixon

(57) ABSTRACT

A system, method, and apparatus for contextual-based virtual data boundaries are disclosed herein. In particular, the present disclosure relates to improvements in access control that work to restrict the accessibility of data based on assigning contextual data thresholds that create a virtual boundary. Specifically, the disclosed method involves assigning at least one threshold to at least one contextual criterion. The method further involves determining whether contextual information from the claimant meets at least one threshold to at least one contextual criterion. Also, the method involves authenticating the claimant, if the contextual information from the claimant meets at least one of the thresholds to at least one contextual criterion. Further, the method involves allowing the claimant access to the data, if the claimant is authenticated.

43 Claims, 27 Drawing Sheets

(56) References Cited

U.S. PATENT DOCUMENTS

| | | |
|---|---|---|
| 7,372,400 B2 | 5/2008 | Cohen et al. |
| 7,450,930 B2 * | 11/2008 | Williams et al. ............. 455/411 |
| 7,468,696 B2 | 12/2008 | Bornholdt |
| 7,489,926 B2 | 2/2009 | Whelan et al. |
| 7,554,481 B2 | 6/2009 | Cohen et al. |
| 7,579,986 B2 | 8/2009 | DiEsposti |
| 7,579,987 B2 | 8/2009 | Cohen et al. |
| 7,583,225 B2 | 9/2009 | Cohen et al. |
| 7,619,559 B2 | 11/2009 | DiEsposti |
| 7,688,261 B2 | 3/2010 | DiEsposti |
| 7,996,882 B2 * | 8/2011 | L'Heureux et al. ............ 726/4 |
| 8,126,971 B2 * | 2/2012 | Shuster ...................... 709/206 |
| 8,312,064 B1 * | 11/2012 | Gauvin ...................... 707/822 |
| 2002/0138632 A1 | 9/2002 | Bade et al. |
| 2005/0159891 A1 | 7/2005 | Cohen et al. |
| 2008/0010365 A1 * | 1/2008 | Schneider .................. 709/223 |
| 2008/0059059 A1 | 3/2008 | Cohen et al. |
| 2008/0143605 A1 | 6/2008 | Bornholdt |
| 2008/0146246 A1 | 6/2008 | Bornholdt |
| 2009/0174597 A1 | 7/2009 | DiLellio et al. |
| 2009/0228210 A1 | 9/2009 | Gutt |
| 2009/0315764 A1 | 12/2009 | Cohen et al. |
| 2009/0315769 A1 | 12/2009 | Whelan et al. |
| 2010/0171652 A1 | 7/2010 | Gutt et al. |

\* cited by examiner

Location 2: Employee's Home

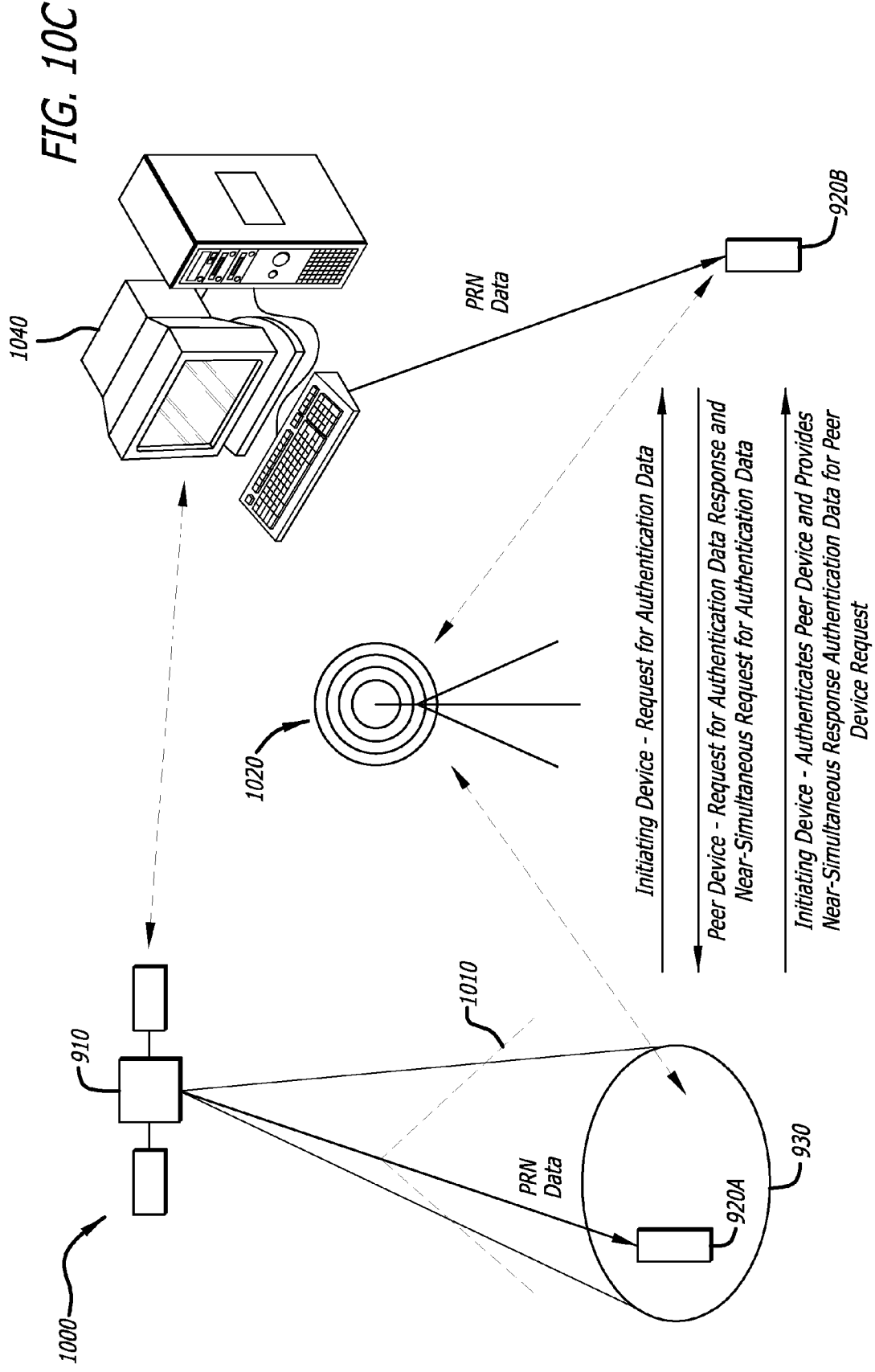

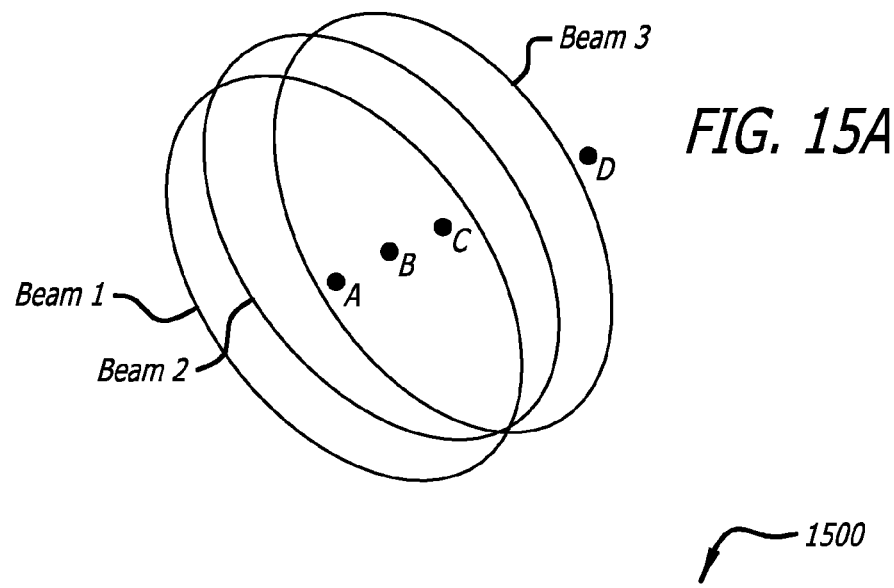
FIG. 15A
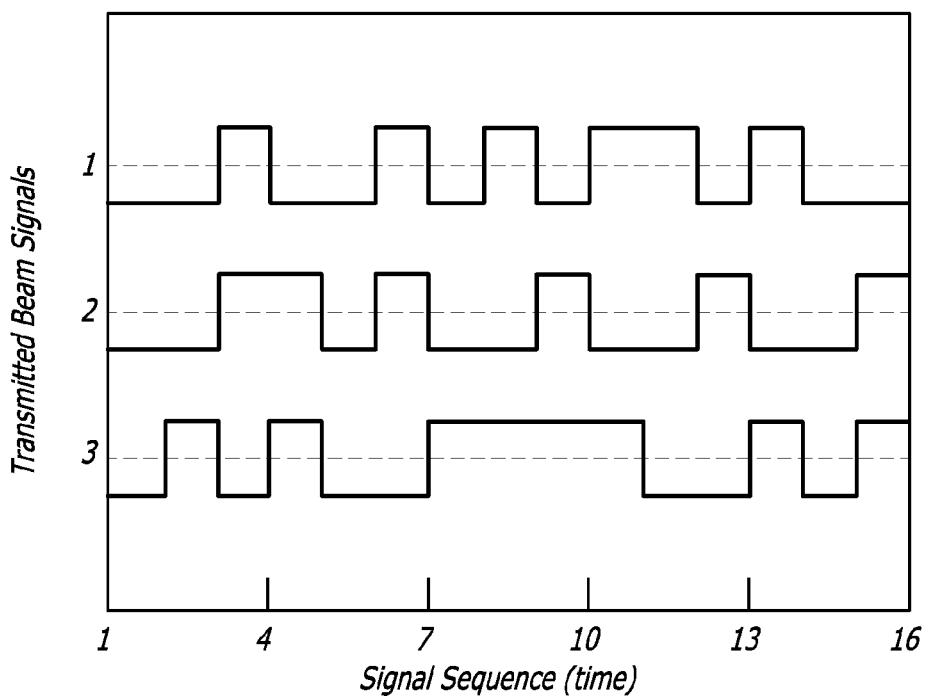
FIG. 15B
$$sbr = \begin{Bmatrix} A & B & C & D \\ 10 & 2 & .5 & 0 \\ 3 & 11 & 2.5 & 0 \\ .2 & 1.5 & 12 & 0 \end{Bmatrix} \begin{matrix} \\ \text{Beam 1} \\ \text{Beam 2} \\ \text{Beam 3} \end{matrix}$$
FIG. 15C FIG. 15D
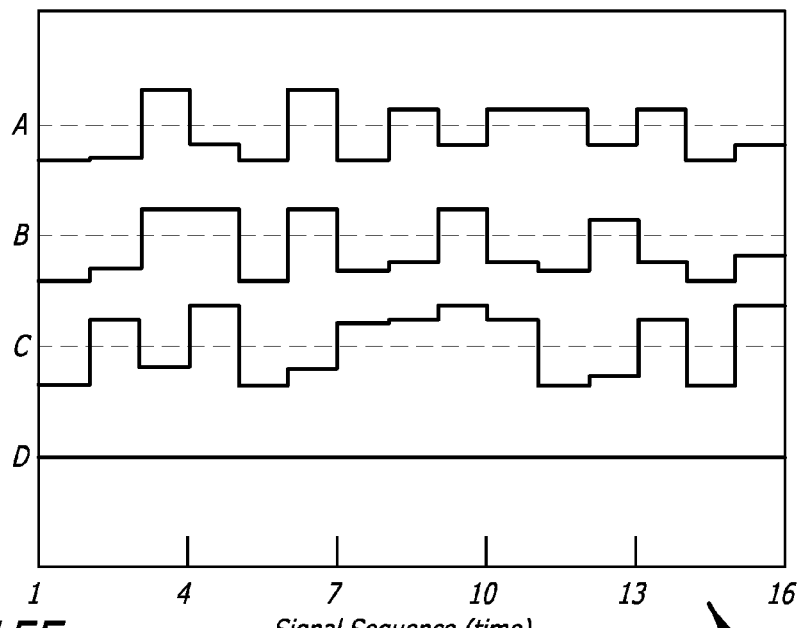
FIG. 15E
|  | A | B | C | D |
|---|---|---|---|---|
| 1 | -9.24 | -10.15 | -10.5 | 0 |
| 2 | -8.96 | -8.05 | 6.3 | 0 |
| 3 | 8.96 | 8.05 | -6.3 | 0 |
| 4 | -4.76 | 7.35 | 9.8 | 0 |
| 5 | -9.24 | -10.15 | -10.5 | 0 |
| 6 | 8.96 | 8.05 | -6.3 | 0 |
| 7 | -8.96 | -8.05 | 6.3 | 0 |
| 8 | 5.04 | -5.25 | 7 | 0 |
| 9 | -4.76 | 7.35 | 9.8 | 0 |
| 10 | 5.04 | -5.25 | 7 | 0 |
| 11 | 4.76 | -7.35 | -9.8 | 0 |
| 12 | -5.04 | 5.25 | -7 | 0 |
| 13 | 5.04 | -5.25 | 7 | 0 |
| 14 | -9.24 | -10.15 | -10.5 | 0 |
| 15 | -4.76 | 7.35 | 9.8 | 0 |
| 16 | -9.24 | -10.15 | -10.5 | 0 |
FIG. 15F

CONTEXTUAL-BASED VIRTUAL DATA BOUNDARIES

CROSS-REFERENCE TO RELATED APPLICATIONS

This application is a Continuation-In-Part application of, and claims priority to and the benefit of, U.S. patent application Ser. No. 12/949,404, filed Nov. 18, 2010, entitled "Spot Beam Based Authentication". This application is a Continuation-In-Part application of, and claims priority to and the benefit of, U.S. patent application Ser. No. 13/073,830, filed Mar. 28, 2011, entitled "Guard Spot Beams to Deter Satellite-Based Authentication System Spoofing". The contents of both of these applications are hereby incorporated by reference in their entirety.

BACKGROUND

The present disclosure relates to virtual data boundaries. In particular, it relates to contextual-based virtual data boundaries.

SUMMARY

The present disclosure relates to a method, system, and apparatus for contextual-based virtual data boundaries. In particular, the present disclosure teaches a method to improve data access control that involves assigning at least one threshold to at least one contextual criterion. The method further involves receiving contextual information from a claimant. Also, the method involves determining whether the contextual information from the claimant meets at least one threshold to at least one contextual criterion. Additionally, the method involves authenticating the claimant, if the contextual information from the claimant meets at least one of the thresholds to at least one contextual criterion. Further, the method involves allowing the claimant access to the data, if the claimant is authenticated. It should be noted that a claimant is either a device associated with a user or a device associated with an entity.

In one or more embodiments, at least one contextual criterion is a permitted geographic area of permitted accessibility defined by a permitted virtual data boundary, a non-permitted geographic area of non-permitted accessibility defined by a non-permitted virtual data boundary, a permitted time of permitted accessibility, a non-permitted time of non-permitted accessibility, a permitted subset of the population with permitted accessibility, a non-permitted subset of the population with non-permitted accessibility, and/or a password. In at least one embodiment, the permitted subset of the population and/or the non-permitted subset of the population each include at least one person. In some embodiments, the contextual information from the claimant includes a geographical location of the claimant when the claimant is attempting to access the data, a time of day the claimant is attempting to access the data, a day of the week the claimant is attempting to access the data, a job function assigned to the claimant, a quantity of data the claimant has gained access to during a first predefined time period, a number of times the claimant has logged into the system during a second predefined time period, and/or a type of a device associated with the claimant that the claimant is using to attempt to access the data.

In at least one embodiment, the geographical location of the claimant is determined by using satellite geolocation techniques, which may include, but are not limited to, Spot Beam Based Authentication and/or Guard Spot Beam Based Authentication, which are both discussed in more detail in their respective sections below. In one or more embodiments, the satellite geolocation techniques use at least one signal for authentication in order to obtain the geographical location of the claimant. In some embodiments, at least one signal used for authentication is transmitted by at least one transmission source, and is received by at least one receiving source associated with the claimant. In at least one embodiment, at least one transmission source is employed in at least one satellite and/or at least one pseudo-satellite. In one or more embodiments, at least one satellite is a Lower Earth Orbiting (LEO) satellite, a Medium Earth Orbiting (MEO) satellite, and/or a Geosynchronous Earth Orbiting (GEO) satellite. In some embodiments, at least one satellite is at least one Global Positioning System (GPS) satellite, at least one Global Navigation Satellite System (GLONASS) satellite, at least one Galileo satellite, and/or at least one Globalstar satellite. In at least one embodiment, the LEO satellite is an Iridium LEO satellite. In at least one embodiment, the geographical location of the claimant is determined by using ranging techniques that send pings (i.e. signals) to at least one node (e.g., server, router, or device) that has a known location.

In one or more embodiments, the disclosed method employs an Iridium LEO satellite constellation. In at least one embodiment, each of the Iridium LEO satellites in the constellation has an antenna geometry that transmits forty-eight (48) spot beams with a distinctive spot beam pattern. In at least one embodiment, at least one signal used for authentication may be transmitted from at least one of the Iridium satellites in the constellation. The forty-eight (48) spot beams of an Iridium satellite may be used to transmit localized signals used for authentication to receiving sources located on or near the Earth's surface. The broadcasted message burst content associated with these signals may include pseudorandom noise (PRN) data. Since a given message burst may occur within a specific satellite spot beam at a specific time, the message burst content including any PRN and unique beam parameters (e.g., time, satellite identification (ID), beam identification (ID), time bias, orbit data, etc.) may be used to authenticate the location of the claimant. It should be noted that when employing one of the above-described Iridium LEO satellites, the transmission signal power is sufficiently strong enough to allow for the signal to penetrate into an indoor environment reliably, and may employ signal encoding methods in order to do so. This allows for these geolocation techniques to be used for many indoor applications. It should be further noted that this system could employ at least one existing Iridium satellite (as described above), at least one next generation Iridium satellite, or a combination of existing Iridium satellites with the next generation Iridium satellite configuration.

In at least one embodiment, access to the data is viewing at least a portion of the data, copying at least a portion of the data, editing at least a portion of the data, deleting at least a portion of the data, and/or adding additional data to the data. In some embodiments, the method further involves providing viewing access to at least a portion of the data, if the claimant is authenticated, by supplying to the claimant a file containing at least a portion of the data and/or a link to a webpage including at least a portion of the data. In one or more embodiments, at least a portion of the data is related to at least one textual file, at least one image file, at least one application, at least one webpage, at least one computer code, and/or at least one server structure. In some embodiments, at least one of the contextual criterions is dependent upon the type of a device that is associated with the claimant. In at least one embodiment, the type of the device associated with the claimant is a laptop computer, a desktop computer, a cellular device, and/or a personal digital assistant (PDA).

In one or more embodiments, at least a portion of the contextual information from the claimant is related to an identity of the claimant, a device associated with the claimant that is attempting to access the data, a device associated with the claimant that is not attempting to access the data, the data the claimant is attempting to access, a node that is storing the data the claimant is attempting to access, interconnects between the node that is storing the data and the device associated with the claimant, and/or the network that the data the claimant is attempting to access resides. In some embodiments, the method further involves logging at least a portion of the contextual information from the claimant.

In at least one embodiment, the data is encrypted. In some embodiments, the encrypted data is decrypted by the claimant by using a decryption key. In at least one embodiment, the decryption key is based on at least one of the contextual criterions. In one or more embodiments, the data is encrypted by the author of the data, the owner of the data, the editor of the data, the device creating the data, and/or the network node transmitting the data. In some embodiments, at least one threshold to at least one of the contextual criterions is assigned by the author of the data, the owner of the data, the editor of the data, the device creating the data, and/or the network management entity.

In one or more embodiments, a portable device (e.g., a universal serial bus (USB) drive, a smart phone, a personal digital assistant (PDA), or a cellular phone) to improve data access control involves at least one processor to enforce data access control policies. The disclosed device further involves a transmitter to transmit contextual information related to a claimant associated with the device. Also, the device involves a receiver to receive the data. Further, the device involves memory to store the data and to store at least one executable program product to enforce at least one of the data access control policies.

In at least one embodiment, a disclosed portable device (e.g., a USB drive, a smart phone, a PDA, or a cellular phone) to improve data access control involves memory to store the data, data access control policies, and at least one executable program product to enforce at least one of the data access control policies. The device further involves a transmitter to transmit contextual information related to a claimant associated with the device. Also, the device involves a receiver to receive a response regarding whether the claimant is authenticated. Further, the device involves at least one processor to enforce the data access control policies and to allow the claimant access to at least a portion of the data, if the claimant is authenticated.

In one or more embodiments, a method for a device to improve data access control involves storing, in memory of the device, the data, data access control policies, and at least one executable program product to enforce at least one of the data access control policies. The method further involves transmitting, with a transmitter associated with the device, contextual information related to a claimant associated with the device. Also, the method involves receiving, with a receiver associated with the device, a response regarding whether the claimant is authenticated. In addition, the method involves enforcing, with at least one processor associated with the device, the data access control policies and allowing the claimant access to at least a portion of the data, if the claimant is authenticated.

In at least one embodiment, the method further involves performing with at least one processor at least one of: causing at least a portion of the data to be deleted from the memory, encrypting at least a portion of the data in memory, causing a notification to be sent to a network management entity, and providing to the claimant access to false data; when the response regarding whether the claimant is authenticated is not received within a predefined time duration starting from when the transmitter transmitted the contextual information. In some embodiments, the method further involves performing with at least one processor at least one of: causing at least a portion of the data to be deleted from the memory, encrypting at least a portion of the data in memory, causing a notification to be sent to a network management entity, and providing to the claimant access to false data, when the data is not accessed by the claimant within a predefined time duration starting from when at least one processor allows the claimant access to the data. In one or more embodiments, the method further involves performing with at least one processor at least one of: causing at least a portion of the data to be deleted from the memory, encrypting at least a portion of the data in memory, causing a notification to be sent to a network management entity, and providing to the claimant access to false data, when the data is attempted to be accessed by the claimant after the receiver received a response that the claimant is not authenticated.

In one or more embodiments, if the response regarding whether the claimant is authenticated is not received within a predefined time duration starting from when the transmitter transmitted the contextual information, at least one processor will perform at least one of: cause at least a portion of the data to be deleted from the memory, encrypt at least a portion of the data in memory, cause a notification to be sent to the network management entity, and provide to the claimant access to false data by providing to the claimant a file containing false data and/or link to the webpage containing the false data. In some embodiments, if the data is not accessed by the claimant within a predefined time duration starting from when at least one processor allows the claimant access to the data, at least one processor will perform at least one of: cause at least a portion of the data to be deleted from the memory, encrypt at least a portion of the data in memory, cause a notification to be sent to the network management entity, and provide to the claimant access to false data by providing to the claimant a file containing false data and/or link to the webpage containing the false data. In at least one embodiment, if the data is attempted to be accessed by the claimant after the receiver received a response that the claimant is not authenticated, at least one processor will perform at least one of: cause at least a portion of the data to be deleted from the memory, encrypt at least a portion of the data in memory, cause a notification to be sent to the network management entity, and provide to the claimant access to false data by providing to the claimant a file containing false data and/or link to the webpage containing the false data.

In at least one embodiment, a system to improve data access control involves a first transmitter to transmit contextual information from a claimant, and a first receiver to receive the contextual information from a claimant. The system further involves at least one processor: to determine whether the contextual information from the claimant meets at least one threshold that is assigned to at least one contextual criterion, to authenticate the claimant if the contextual information from the claimant acceptably meets at least one of the thresholds to at least one contextual criterion, and to allow the claimant access to the data if the claimant is authenticated. Further, the system involves a second transmitter to transmit a response regarding whether the claimant is authenticated, and a second receiver to receive the response regarding whether the claimant is authenticated.

In one or more embodiments, if the claimant is authenticated, at least one processor is to provide the viewing access to at least a portion of the data by supplying to the claimant a file containing at least a portion of the data and/or a link to a webpage including at least a portion of the data. In some embodiments, at least one processor is to log at least a portion of the contextual information from the claimant.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 9 is a schematic diagram of a satellite-based communication system that may be employed by the disclosed spot beam based authentication system, in accordance with at least one embodiment of the present disclosure.

Figure 10A:
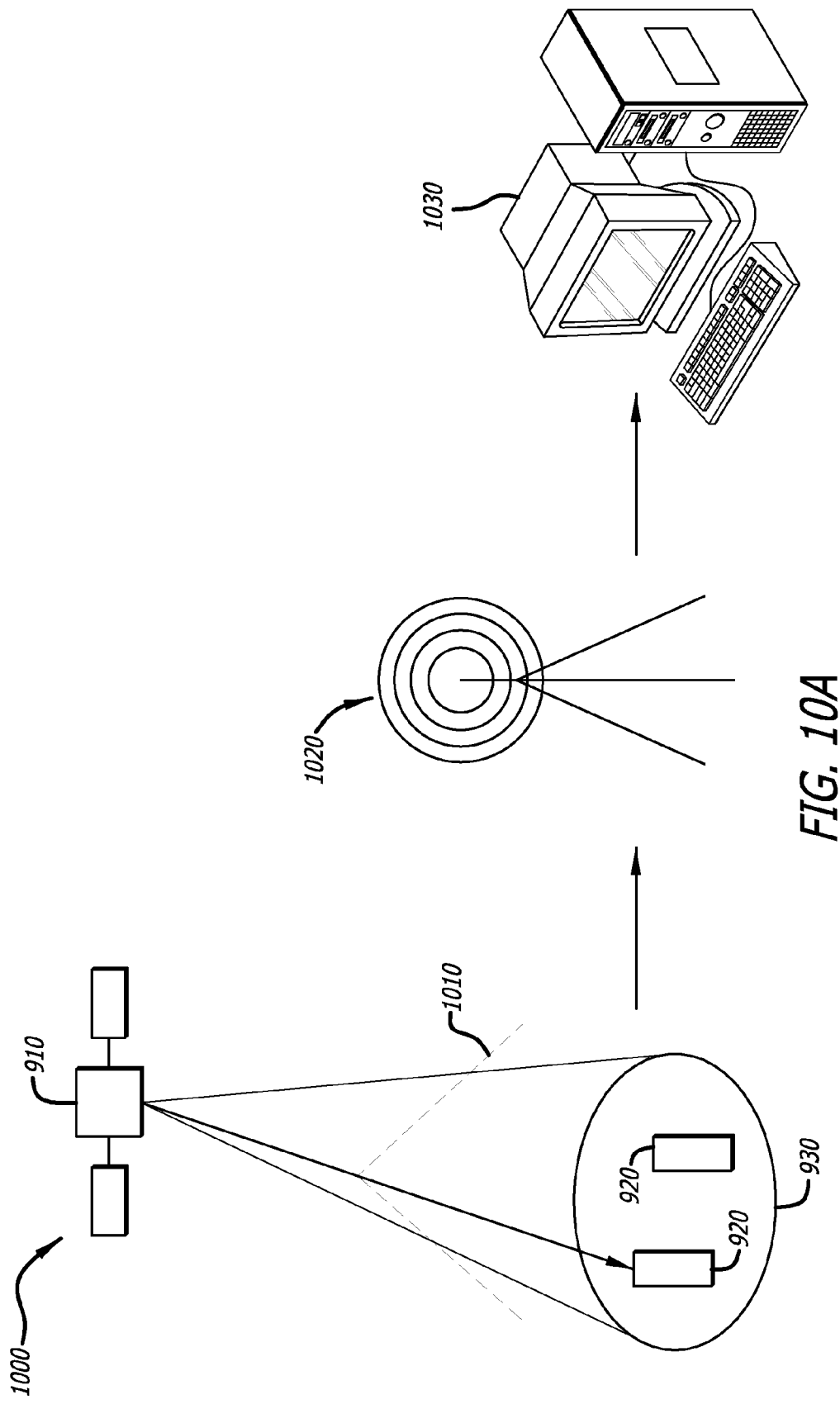
Figure 10B:
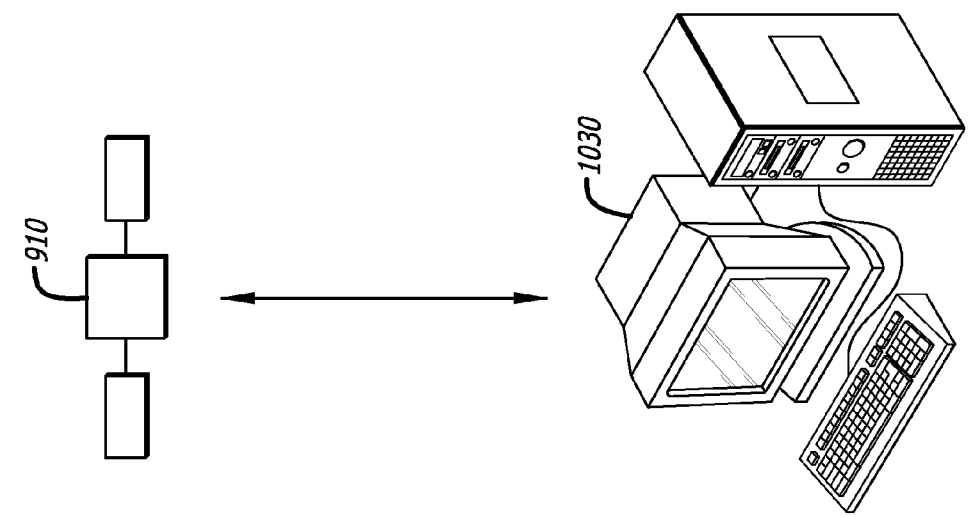

FIGS. 10A, 10B, and 10C are schematic diagrams illustrating satellite-based authentications systems, in accordance with at least one embodiment of the present disclosure.

Figure 11A:
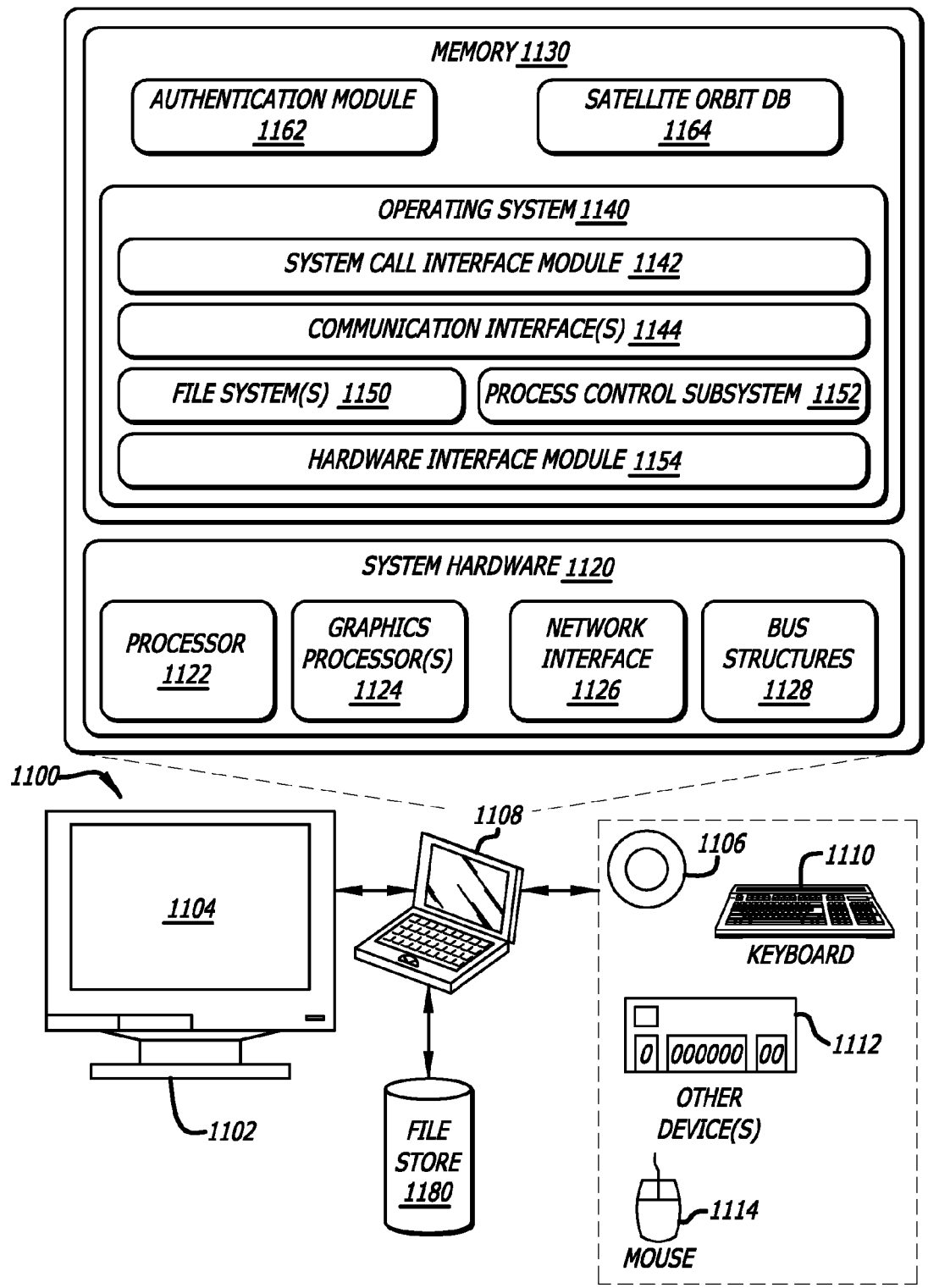

FIG. 11A is a schematic diagram of a computing device which may be adapted to implement the disclosed satellite-based authentication system, in accordance with at least one embodiment of the present disclosure.

Figure 11B:
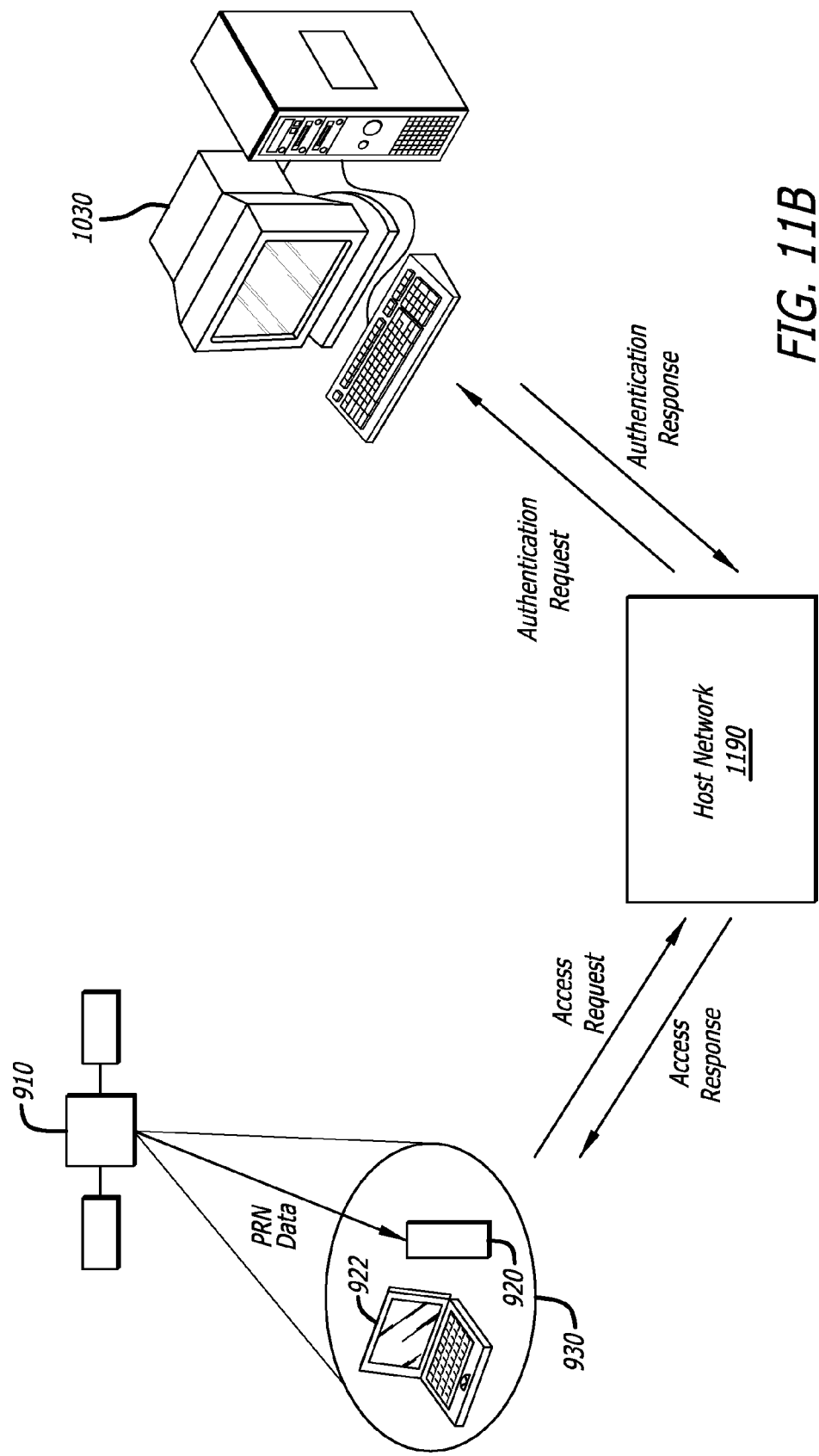

FIG. 11B is a schematic diagram of a satellite-based communication system that may be employed by the disclosed spot beam based authentication system, in accordance with at least one embodiment of the present disclosure.

Figure 12:
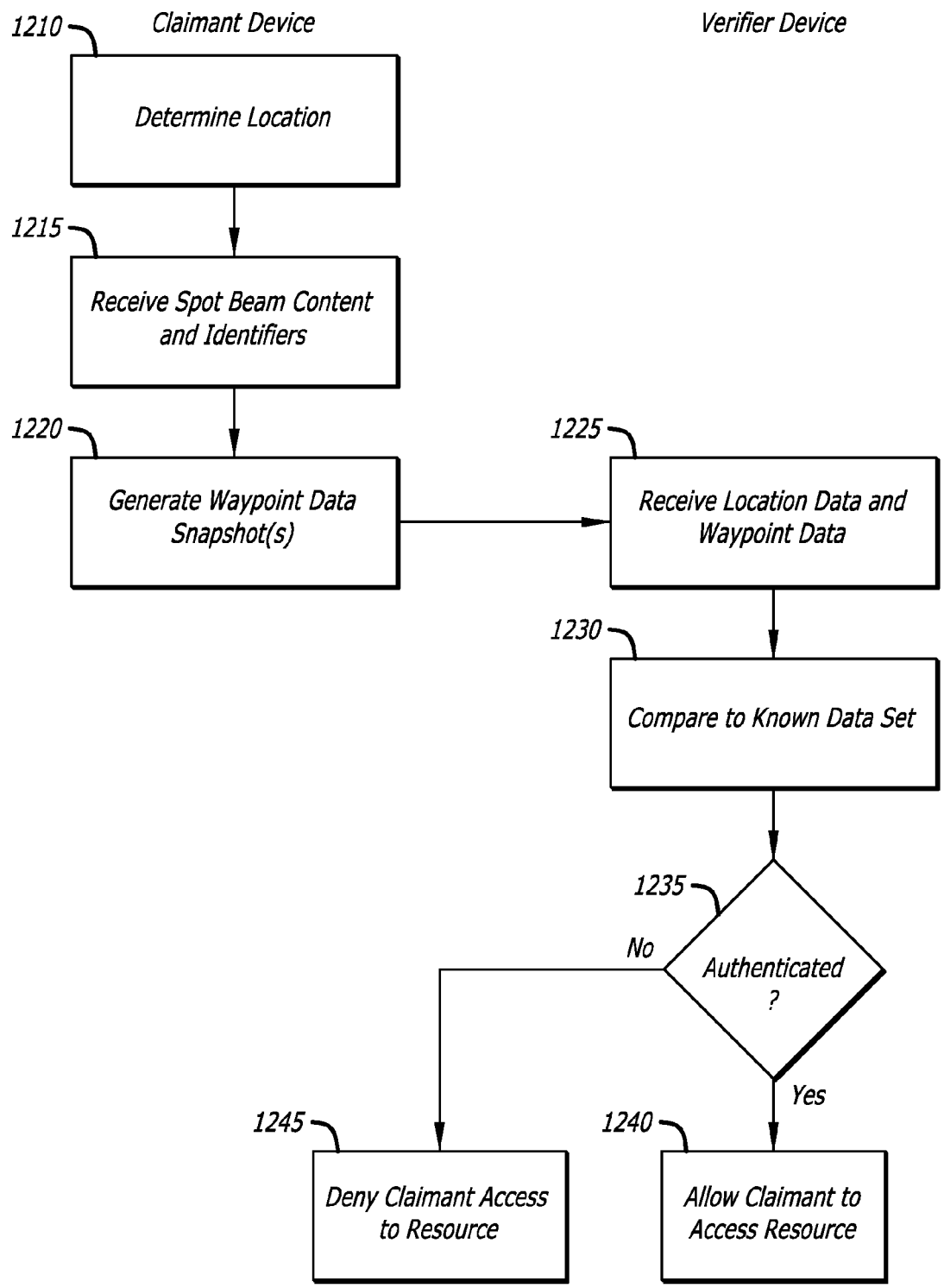

FIG. 12 is a flow diagram showing the disclosed spot beam based authentication method to authenticate a target node, in accordance with at least one embodiment of the present disclosure.

FIGS. 13 through 19 are directed towards the disclosed system and method for guard spot beam based authentication of the user device.

Figure 13:
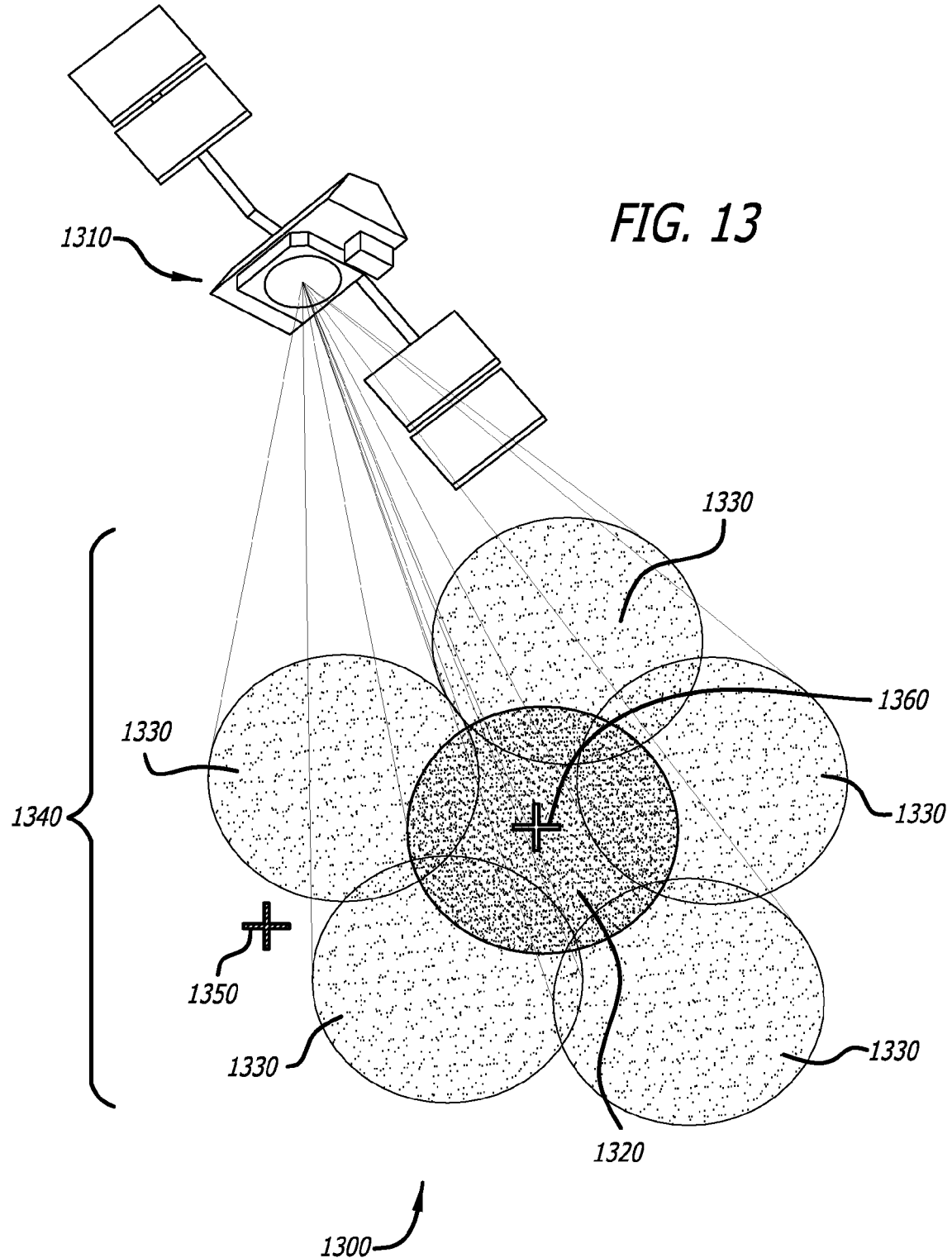

FIG. 13 illustrates an embodiment of a transmission-based authentication system employing a satellite to transmit an authentication beam along with multiple guard beams.

Figure 14:
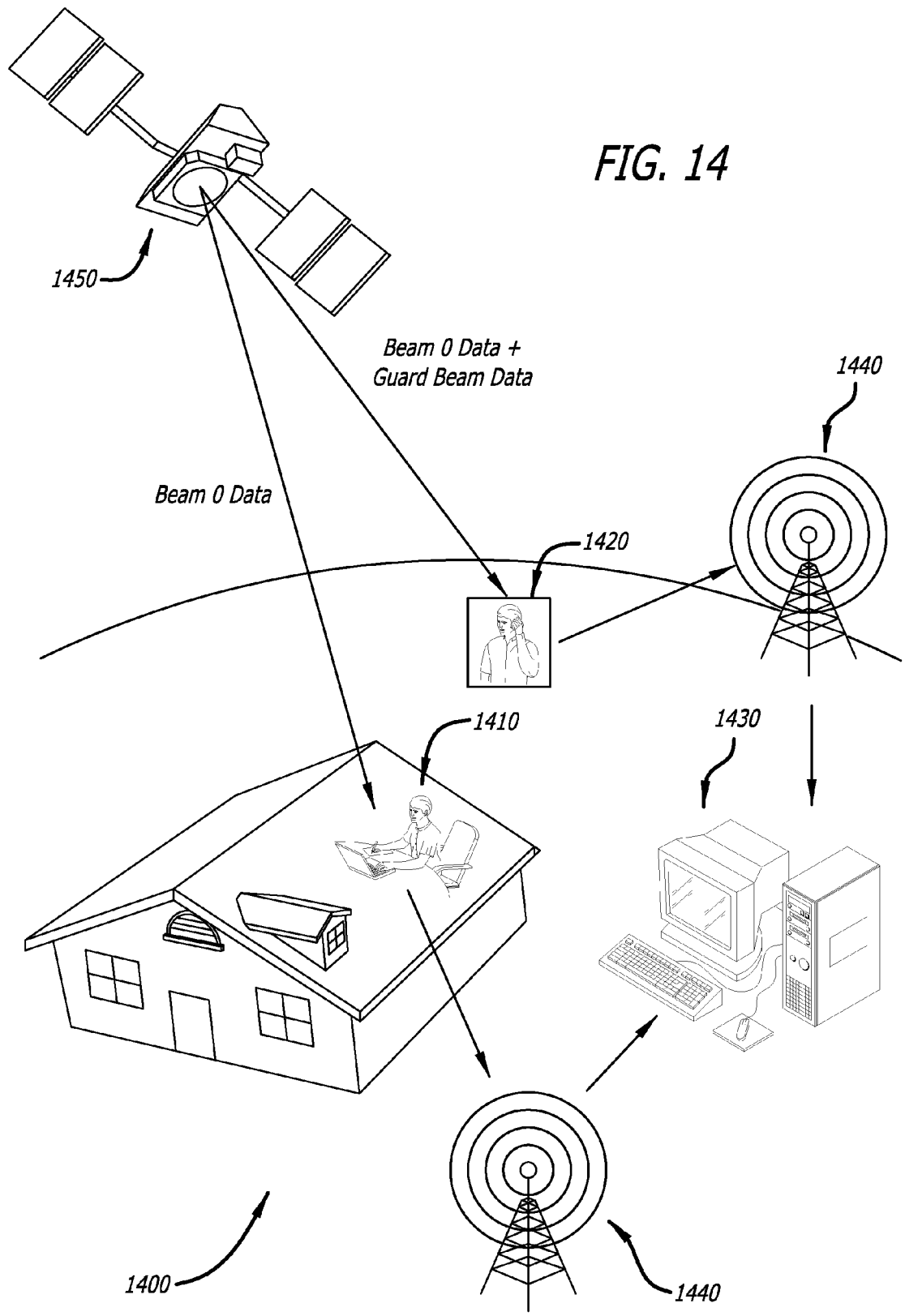

FIG. 14 illustrates an embodiment of a transmission-based authentication system used with an indoor environment.

FIG. 15A illustrates an embodiment of a transmission-based authentication system having four claimants located at various positions within and near three overlapping spot beams.

FIG. 15B illustrates an embodiment of a graph of signals transmitted by the three spot beams of FIG. 15A.

FIG. 15C illustrates an embodiment of an array of signal strengths of the three spot beams at the locations of the four claimants of FIG. 15A.

Figure 3B:
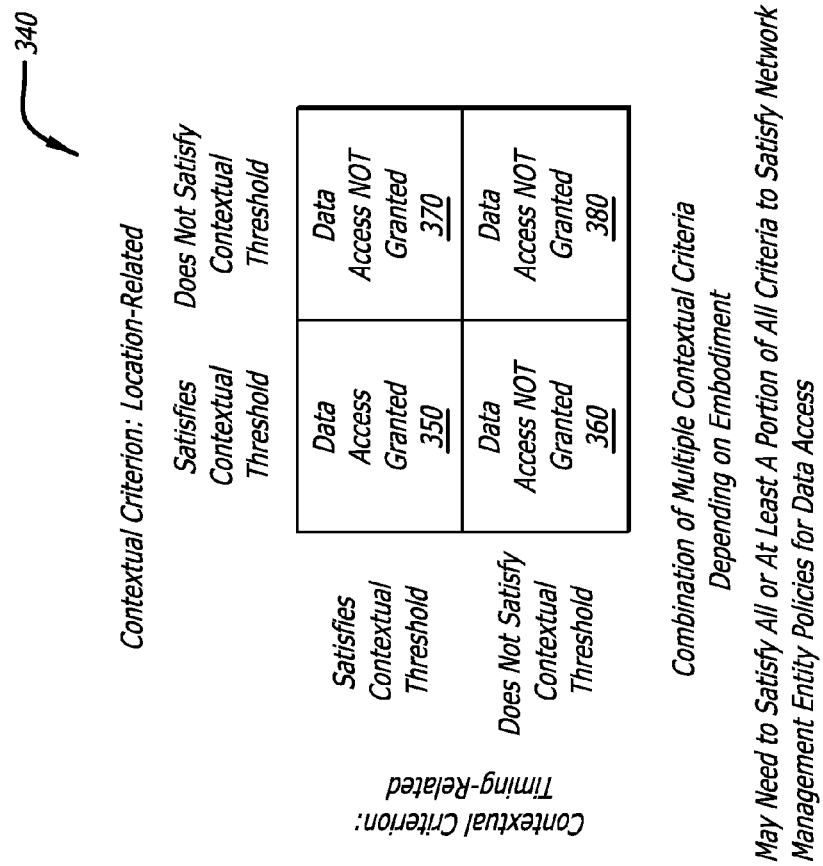
FIG. 3B is a matrix showing the possible combinations for a claimant for meeting the thresholds to the contextual criterion of the system depicted in FIG. 3A, in accordance with at least one embodiment of the present disclosure.
Figure 3A:
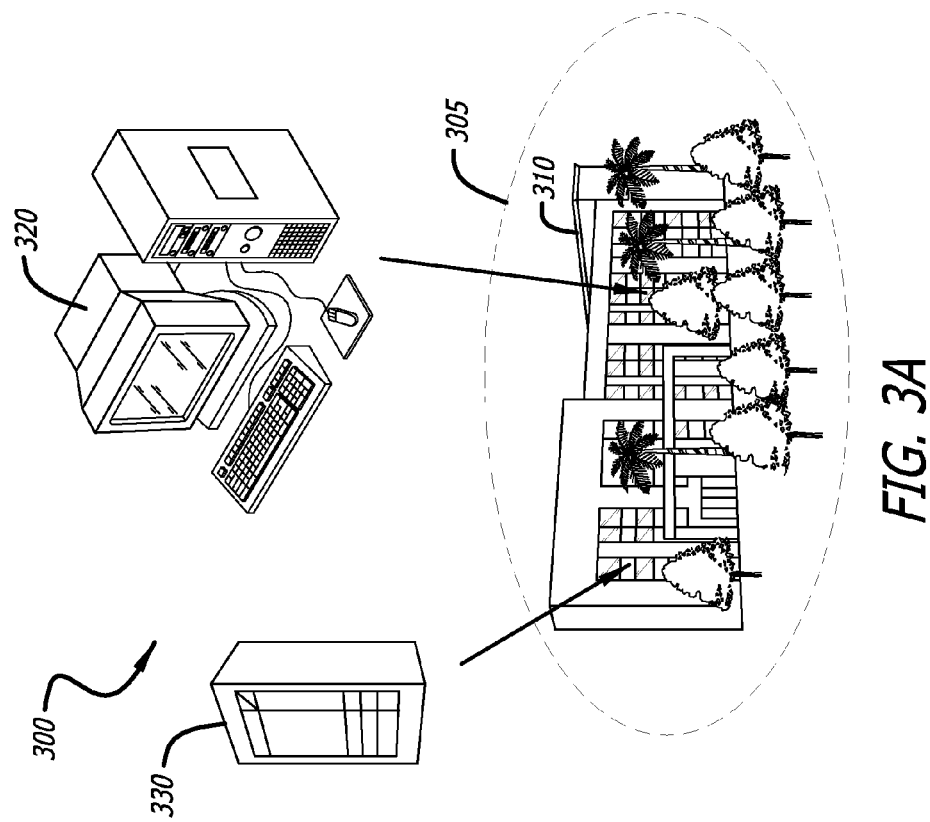
FIG. 3A is a schematic diagram of the disclosed system to improve data access control where the contextual criterion includes a permitted geographical area and a permitted time duration to access company data, in accordance with at least one embodiment of the present disclosure.

FIG. 15D illustrates an embodiment of an array of bits for the three spot beams of FIG. 3A.

FIG. 15E illustrates an embodiment of an array of resultant signal sequences received by the four claimants of FIG. 15A.

Figure 16:
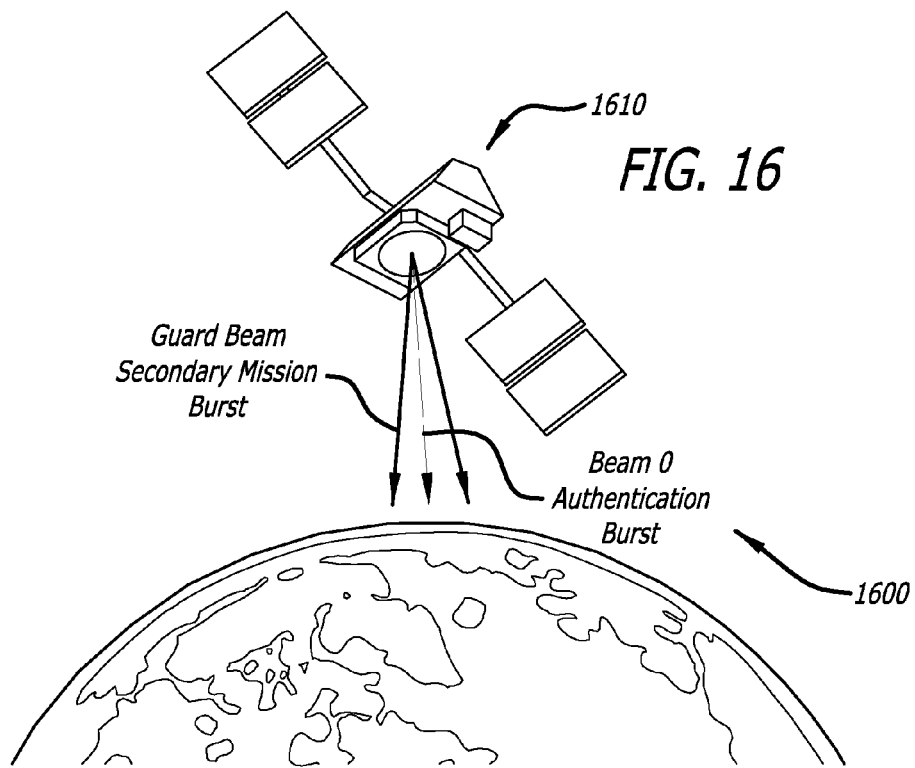

FIG. 15F illustrates an embodiment of a graph depicting resultant signals received by the four claimants of FIG. 15A FIG. 16 illustrates an embodiment of a transmission-based authentication system using guard beam transmission as part of a secondary mission.

Figure 17:
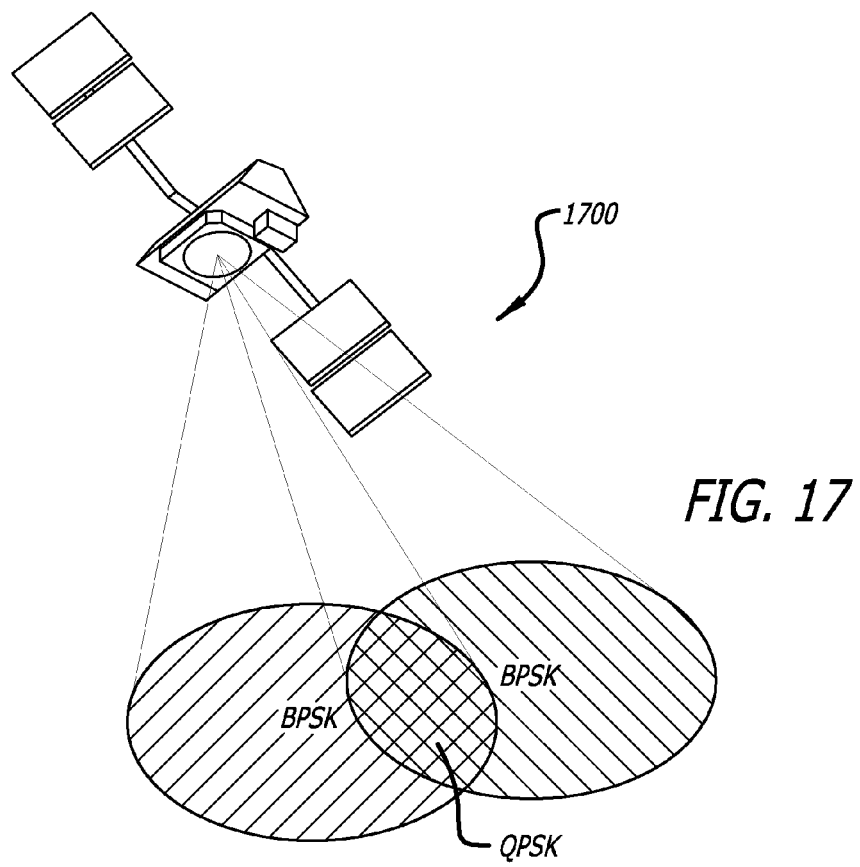

FIG. 17 illustrates an embodiment of a transmission-based authentication system employing out-of-phase binary phase shift keying (BPSK) guard beam transmission.

Figure 18:
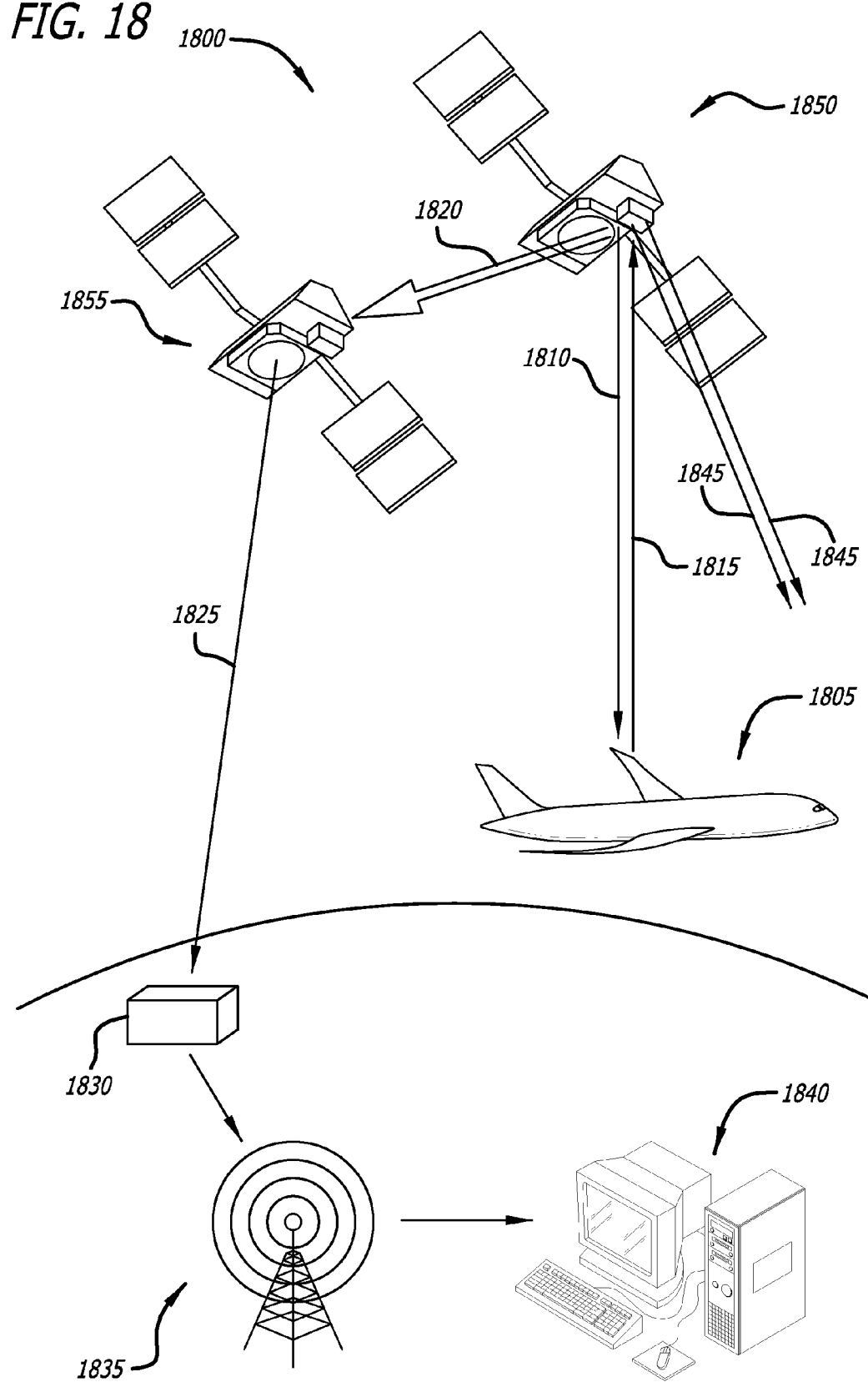

FIG. 18 illustrates an embodiment of a transmission-based authentication system having an air-based claimant.

Figure 19:
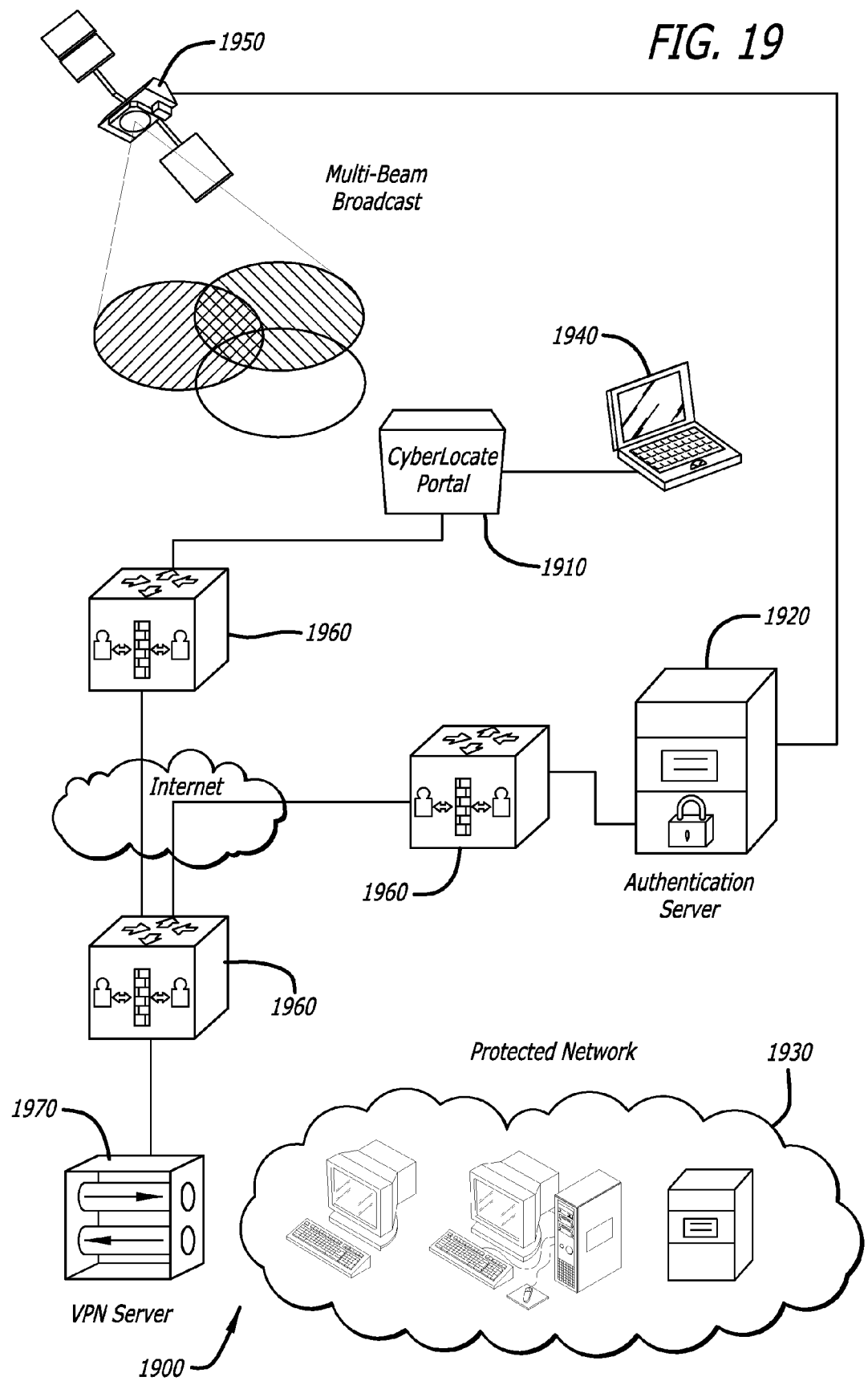

FIG. 19 illustrates an embodiment of a transmission-based authentication system employing a cyber locate portal in conjunction with an authentication server.

DESCRIPTION

The methods and apparatus disclosed herein provide an operative system for contextual-based virtual data boundaries. In particular, the system relates to improving data security. Specifically, the system relates to improvements in access control that work to restrict the accessibility of data based on assigning contextual data thresholds that create a virtual boundary.

In some embodiments, access to data may be restricted by a geographic area of permitted access. In some embodiments, access to the data may be restricted by a defined time duration of permitted access. In some embodiments, access to the data may be restricted to a subset of the population, where the subset of the population includes at least one person. In some embodiments, a combination of a permissible geographic area and time duration may be used to restrict access to the data. In some embodiments, a combination of a permissible geographic area and time duration may be used to restrict access to the data for a subset of the population. In some embodiments, access to the data may be restricted based on other contextual information and/or a combination of all of the previously mentioned criteria (i.e. geographical area, time duration, and subset of the population) to restrict the accessibility to the data.

In some embodiments, the claimant(s) attempting to access the data may be legitimate with legitimate needs to access the data. While in other embodiments, the claimant(s) attempting to access the data may be legitimate with ill intentions (i.e. rogue users). In at least one embodiment, the claimant(s) may not be a legitimate user(s) attempting to access the data. It should be noted that the disclosed system and method, alternatively to restricting access to data, may be used to provide access to data in the manner as identified above to those claimants that fall within acceptable thresholds of a permissible geographic area, time duration, and/or other contextual information which may be monitored either actively or passively as an additional data access control criterion.

Currently, cyber security is becoming increasingly important as electronic systems become more and more engrained into everyday business and social tasks. Vast amounts of critical data are stored in networked systems that, if accessed by an unauthorized party, would have varying degrees of societal impact from annoyance to catastrophe.

In parallel with this increased reliance on electronic systems, the nation has also seen a dramatic increase in cyber terrorism, thus requiring improved methods to protect networked computer systems. Cyber attacks are becoming all too common, which has brought about continued discussion of dangers of network penetrations by external threats in both commercial and military environments.

Current access control approaches are principally based on either static passwords or authentication based on password and badge credentials. As attacks are often conducted by impersonating the end user, there has been a tendency for organizations to focus on user authentication methods to curtail network vulnerabilities. These approaches continue to be vulnerable to sophisticated attacks, and thus a need has developed for a new paradigm of access control to data that leverages additional contextual information, such as a claimant's physical location.

This present disclosure relates generally to devices that may benefit from increased data security. In particular, the present disclosure focuses on improvements in access control that work to restrict the accessibility of data based on assigning contextual data thresholds that create a virtual boundary based on at least one of the following: a geographic area of permissible access, a geographic area of non-permissible access, a time duration of permissible access, a time duration of non-permissible access, and/or other contextual information which may be monitored either actively or passively as additional data access control criterion.

The present disclosure may utilize methods of authentication to validate that a claimant is who they claim to be and that the claimant is attempting to access data within permissible contextual criteria. These permissible contextual criteria may be determined by monitoring at least one of the following: whether the claimant is located within a permissible geographic area when the claimant is attempting to access the data and whether the claimant is attempting to access the data within a permissible time duration. Methods that may be leveraged to authenticate the claimant may include, but are not limited to, geolocation-based authentication, time-based authentication, passwords, key cards, smart cards, gold cards, and/or biometrics.

There are at least five primary features of the present disclosure, which are defined further in the detailed description. The first feature involves a method of controlling access to data based on contextual thresholds, such as a user's physical location (i.e. location-based data). In addition to location-based data, other contextual thresholds may be based off data based on at least one of the following: time duration of access, time of year of access, day of access, type of device accessing the data, type of data being accessed, and the identity of the claimant accessing the data. Data may be encrypted when it is created and/or when it is transmitted over a network. The data may be decrypted by a device that is authenticated by meeting at least one contextual threshold. For example, as in the case for location-based contextual thresholds, the data may be decrypted by a device associated with a claimant that is authenticated because it is located within a certain permissible geographical area when it is attempting to access the data. These contextual thresholds may be specified at the time of encryption by the author of the data, by a subsequent owner of the data, an editor of the data, a device creating the data, and/or by another party, such as a network management entity that does so based on network data access policy enforcement.

The second feature involves data that may be stored unencrypted on a network node. For this feature, such data may be accessed by a user that has provided authentication such that they satisfactorily meet at least one of the contextual thresholds.

The third feature of the present disclosure involves data that may be encrypted by using an encryption/decryption key that may change over time. For this feature, the encryption/ decryption key may change as part of a planned rotation schedule, on-demand, and/or the time of change may be based on a pseudo random number or a significant random number generator. Such encrypted data may be downloaded, but is not viewable without the proper key. A claimant may have to request such a key, for example from a hosting node, such as an authentication server. But such a request may require the claimant to prove that they successfully met the required contextual thresholds prior to the claimant receiving the requested key. In some embodiments, this process may be on-demand. In other embodiments, this process may be part of an on-going function and/or a communication protocol for a device. In some embodiments, the device may flag itself, or be flagged by a network management entity, as being outside a permissible data access threshold as part of an on-going authentication key access related function.

The fourth feature involves data that may be stored unencrypted on a network node, but is encrypted upon transmittal. For this feature, a claimant seeking to decrypt the data may request a key within some period of time after the data was sent and must provide proof that they satisfactorily meet the required contextual thresholds.

The fifth feature relates to data that is stored on a portable storage device (e.g., a USB drive, smart phone, PDA, or a cellular phone), which may be more vulnerable to being compromised since it may be more likely to be lost, purposely taken with ill intent, or otherwise stolen. These types of devices can act similarly to other non-portable storage devices, however, since they are portable, it is likely beneficial to add additional layers of security to them. In some embodiments, data stored on a portable media device may require, prior to allowing the claimant access to the data, that the claimant attempting to gain access provide authentication that the claimant is located within a permissible geographical area when attempting to access the data. In at least one embodiment, the device may delete at least a portion of the data that resides on it, if the device is located outside of the permissible geographical area when the claimant is attempting to access the data. Alternatively, the portable (i.e. mobile) device may require that it can authenticate its own location as being within a permissible geographical area before providing access to the data. In at least one embodiment, the device may delete at least a portion of the data that resides on it, if the claimant attempts to access data during a time that is not within an identified permissible duration of time. In some embodiments, a storage device may confirm that the claimant is still active (i.e. a legitimate user that may have access to the data) by referring to a roster of record prior to allowing the claimant to have access to the data. However, again, it should be noted that the disclosed system and method, alternatively to restricting the data, may be used to provide access to data in the manner as identified above to those claimants that fall within acceptable thresholds of a permissible geographic area, time duration, and/or other contextual information which may be monitored either actively or passively as an additional data access control criterion.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

As previously mentioned, methods, systems, and devices according to various embodiments are disclosed for improving data security. In particular, the present disclosure focuses on improvements in data access control that work to restrict data from being accessed by non-legitimate claimants of the data, and thereby provides access to only legitimate users of the data. The present disclosure does so by assigning contextual data thresholds that create a virtual boundary, where only claimants that satisfactory meet the contextual thresholds are allowed to access the data within the virtual boundary. The principle intent of the present disclosure is to secure data so that only legitimate users have access to it, and so that non-legitimate claimants cannot directly and/or indirectly cause harm to the data, harm to the network the data resides on, harm to its users, or otherwise harm. The present disclosure does this by providing methods to authenticate a claimant based on contextual data.

In some embodiments, data access may be restricted by a defined geographic area of permitted accessibility. Alternatively, data access may be restricted by a defined geographic area of non-permitted accessibility. In some embodiments, data access may be restricted by a defined time duration (e.g., a start time and a stop time for the time duration is defined) of permitted accessibility. Alternatively, data access may be restricted by a defined time duration of non-permitted accessibility. In some embodiments, data access may be restricted by a permitted accessibility by a subset of the population, where the subset of the population includes at least one person. Alternatively, data access may be restricted by the non-permitted accessibility of a subset of the population, where the subset of the population includes at least one person. In some embodiments, a combination of a permissible geographic area, a non-permissible geographic area, a permissible time duration, a non-permissible time duration, a permitted accessibility by a subset of the population, and/or a non-permitted accessibility by a subset of the population may be used to restrict access to the data.

In some embodiments, access may be restricted based on other contextual information and/or a combination of all previously mentioned types of information (i.e. defined geographical areas, time durations, subsets of the population) to restrict the accessibility of the data. Contextual information may be based on a variety of factors within a specific embodiment, such as: the claimant's identity, at least one of the claimant's device(s), the data the claimant is attempting to gain access to, a node in which the data the claimant is attempting to access is located, the interconnects between the claimant's device and the node housing the desired data, and the network the data resides on in its entirety. For example, some contextual information that may be used to restrict data access may include, but is not limited to, the following: the location where the data is being accessed from, the time of day of access, the day of week of access, the business working days of the claimant, the claimant's job function, the quantity of data that has been accessed in a given session by a particular claimant, the number of sessions the claimant has logged in on a given day, and the type of device that is attempting to access the data.

In some embodiments, data encryption is location sensitive and, thus, its use is based on whether a claimed user (i.e. a claimant) is located within a permissible geographic area. Security of data can be improved by authenticating a claimant's (i.e. an end user's) physical location prior to allowing the claimant access to the data, where the data may only be decrypted by an entity (or a claimant) that can provide authentication that they are located within a permissible geographical area when they are attempting to access the data. For example, in several states of the United States of America, medical records and some government documents are not legally allowed to be viewed outside of that state. Similarly, it may be desirable to ensure that documents related to national security cannot be viewed unless the end user is located within a permissible geographic area, or conversely, is located outside of a prescribed physical location (i.e. a foreign country). International Traffic in Arms Regulations (ITAR) regulations comprise another potential application of geographically-determined access.

It should be noted that, alternatively to restricting access, the present disclosure may be used to provide access in the manners as identified above to those claimants that fall within acceptable thresholds of being located within a permissible geographic area when attempting to access the data, attempting to access the data within a permissible time duration, and/or other contextual information, which may be monitored as additional data access control criterion. This implies that data may only be accessible by claimants that have shown that they meet acceptable access control thresholds, such as those related to a geographic area, time duration, and/or other contextual information. In at least one embodiment, accessibility of the data refers to allowing the authenticated claimant to view the data. In another embodiment, accessibility of the data refers to allowing the authenticated claimant to copy the data. In yet another embodiment, accessibility of the data refers to allowing the authenticated claimant to edit the data. It should be evident, that accessibility standards may be assigned to an array of functions associated with data access control (e.g., functions may include deleting a file and creating a file) and may be further dependent on network policies and/or the type of device the claimant is using when attempting to access the data.

In some embodiments, the claimant may be legitimate with legitimate needs to access the data; while in other embodiments, the claimant may be legitimate with ill intentions (i.e. rogue users). In other embodiments, the claimant may be a legitimate claimant that is located within a non-permissible geographical area when attempting to access the data. In further embodiments, the claimant may not be a legitimate user who is attempting to gain access to the data through an illegitimate or legitimate means.

The present disclosure utilizes methods of authentication to validate elements of this system, which includes at least one device associated with the claimant in which the claimant is using to attempt to access the data. In one or more embodiments, this device may be the device was used to create the data (e.g., a personal computing device such as a laptop), a desktop computer, a personal digital assistant (PDA), a cell phone, a smart phone, and/or a device that is capable of storage, such as a server and/or a personal computing device (e.g., a laptop, desktop, PDA, cell phone, external hard drive, Universal Serial Bus (USB), and other portable storage device). In addition, the system may include any third party devices that may be used to assist in the data access control process, such as a network management entity's associated device, which may include a server or other such hardware.

In at least one embodiment, data on an enabled device is encrypted when the file is created. In some embodiments, data encryption may be specific to the type of device it was created on, stored on, and/or transmitted through. In at least one embodiment, the author of the data (e.g., the data file) may manage the encryption policies for the data. In another embodiment, data is encrypted when it is sent over a network, and the encryption policies may be managed by a network management entity. In other embodiments, another third party entity may manage the encryption policies.

In some embodiments, data stored on a portable media device may require that a claimant attempting to gain access to it provide authentication that that they are located within a permissible geographical area prior to allowing the claimant access to the data. In at least one embodiment, the device may delete at least a portion of the data that resides on it, if the device the data is on is located outside the permissible geographical area. In at least one embodiment, the device may delete at least a portion of the data that resides on it, if the data is not accessed by the device within a defined duration of time.

In some embodiments, network users may download onto a portable storage device sensitive information that is meant for only a subset of the population to view, such as proprietary technical content, competition sensitive information, business practices, business strategies, and/or human resources information (e.g., highly sensitive information, such as social security numbers and clearance statuses). In one example, a user may willingly take home an external hard drive device containing proprietary information from his or her former employer. Once the user (i.e. the former employee) attempts to access the data from his or her home, the device will attempt to confirm its physical geographical location. As the user is no longer in the system as an employee of the company, his or her home location, which may have previously been an acceptable location to access data from in order to perform work, is no longer an active acceptable location in the system and, thus, the data on the hard drive device may not be accessible by the user. In addition, further measures could be implemented to make the data even more difficult for this individual to gain access to (e.g. other levels of authentication are required when an initial verification fails). These further measures may include a need for an administrator to unlock the device for a user to be able to access the data and/or may include deletion of the data altogether. These policies may be set up by a network administrator, with the device then aiding in policy enforcement.

Methods that may be leveraged to authenticate the claimant may include, but are not limited to, location (i.e. geo-based) authentication and/or time-based authentication. Additional methods that may be used to reduce the likelihood of a non-legitimate claimant gaining access to the data may include passwords, smart cards, key cards, and/or biometrics. The preferred method, in this invention, for authenticating the location of a claimant is through the utilization of satellite signals in space, although it should be obvious that other ground-based or other means of determining location could be used. In at least one embodiment, satellite signals may come from at least one of at least one Iridium satellite, a least one Global Positioning System (GPS) satellite, at least one Global Navigation Satellite System (GLONASS) satellite, at least one Galileo satellite, at least one BeiDou (COMPASS) Navigation satellite, and/or at least one Globalstar satellite. For example, claimants may be authenticated by various satellite geolocation techniques including, but not limited to, Spot Beam Based Authentication and/or Guard Spot Beam Based Authentication. Such authentication methods can help to ensure that a claimant is who they say they are and that are within permissible contextual criteria. This contextual criteria may include a user being located within a permissible geographic area and/or a user accessing the data within a permissible time duration.

In at least one embodiment, a claimant and/or an approver (e.g., approval device) may be authenticated via a peer-to-peer authentication method. In another embodiment, a claimant and/or approver may be authenticated via a third party such as an authentication server, such as done in the Spot Beam Based Authentication technique.

In at least one embodiment, authentication for a claimant may be provided to allow the claimant access to the data for an entire computing session. While in other embodiments, authentication for a claimant may be provided to allow the claimant access to only a specific application and/or a file. In some embodiments, access may be provided on a per-view basis. In some embodiments, access may be provided on a timed basis. In some embodiments access privileges may be defined by, but not limited to, the author of the data, the owner of the data, and/or a network management entity. In at least one embodiment, an approver, who is the owner of the data, provides permission access to a claimant in order to give the claimant permission to view the data.

In some embodiments, the authentication for a claimant may be provided to allow the claimant access to the data for a given period of time. For example, a granting of access to data could involve a patient being notified that a certain doctor wishes to view his or her test results, the patient logging into a secure web site and being authenticated (e.g., the patient could be authenticated by having their location validated), and the patient granting data access to the doctor, who is located in a defined permissible geographical area, for a period of time. In at least one embodiment, a network management entity may manage the encryption policies/protocol, which may include the network management entity identifying acceptable locations for a claimant to be when they are permitted to access the data. In at least one embodiment, data accessibility may be restricted by time duration by means of a network management or author encryption policy/protocol.

In some embodiments, security may be further heightened by making logs related to data access control which may include information regarding which user accessed what data, information regarding where the user was located, information regarding when the user accessed the data, and/or information regarding what type of device was used for accessing the data. In some embodiments, security may similarly be heightened by logging data related to information regarding when access was restricted versus only when it was granted.

Figure 1A:
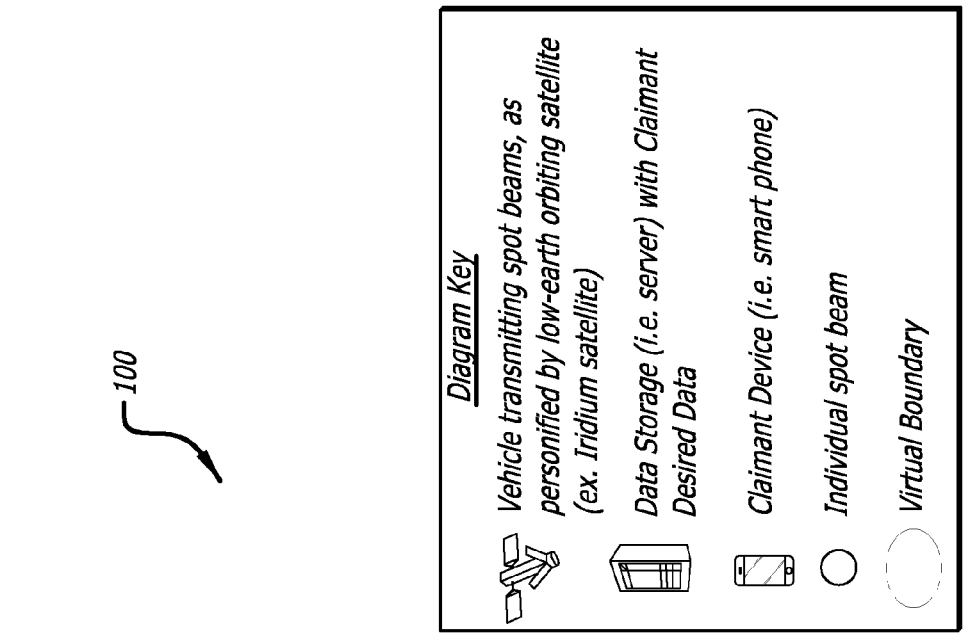
FIG. 1A depicts a schematic diagram of the disclosed system to improve data access control utilizing satellite geolocation techniques to authenticate the claimant, in accordance with at least one embodiment of the present disclosure.
Figure 1A:
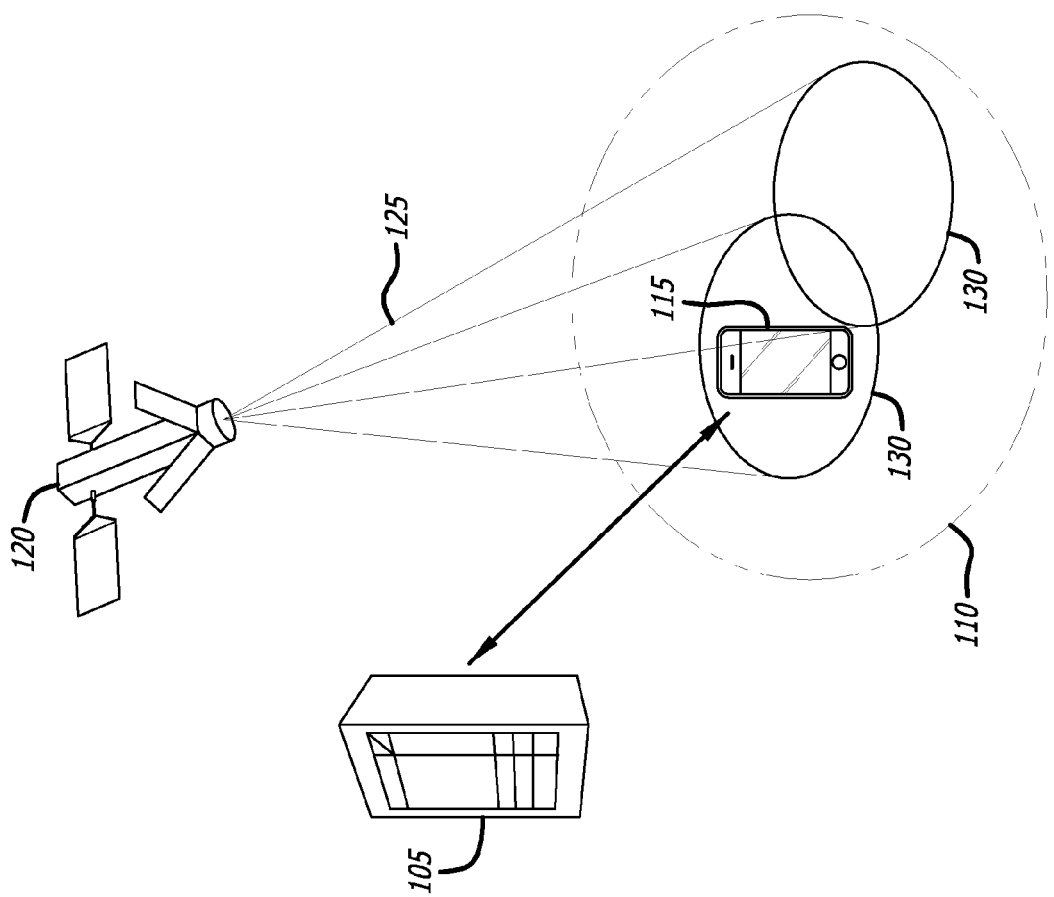

FIG. 1A depicts a schematic diagram 100 of the disclosed system to improve data access control utilizing satellite geolocation techniques to authenticate the claimant, in accordance with at least one embodiment of the present disclosure. Data desired to be accessed by a claimant is stored on a server 105. Also shown is a virtual data boundary 110. In order for a user to access the data on the server 105, contextual criterion thresholds must be satisfied in order to authenticate that the claimant and/or the claimant's device 115 is within a virtual data boundary 110.

In one or more embodiments, satellite based geolocation techniques are used by the disclosed system and method to authenticate the physical location of the claimant's user device (e.g., a smart phone) 115. For these embodiments, a satellite 120 is used to transmit at least one signal 125 used for authentication to the device 115. In one or more embodiments, a LEO Iridium satellite is employed for satellite 120. Different types of satellite geolocation techniques may be employed by the disclosed system and method. The Spot Beam Based Authentication section of the present disclosure, which includes the description of FIGS. 9 through 12, discusses one example satellite geolocation technique (i.e. spot beam based authentication) that may be utilized by the disclosed system and method. Also, the Guard Spot Beam Based Authentication section of the present disclosure, which includes the description of FIGS. 13 through 19, discusses another example satellite geolocation technique (i.e. guard spot beam based authentication) that may be utilized by the disclosed system and method.

In FIG. 1A, a number of spot beams 130 are shown to be transmitted from a satellite 120 to the claimant's device 115. In at least one embodiment, the signal(s) 125 includes specific parameters and/or a pseudo random number (PRN) or significant random number (RN) code to further aid the authentication techniques. This information may be used, in turn, to authenticate the physical location of the claimant to the server 105. On successfully meeting the threshold criterion that has been assigned to the contextual data (e.g., the claimant is located in a permissible geographic area for data access), the claimant is granted access to data.

In this example, geolocation data is at least a portion of the contextual data. The threshold criterion may require that a claimant be located within an identified proximity from, for example, a place of business. This criterion relates to the claimants being located within a permissible geographic region in order to access the data. For example, the claimant may satisfy the criterion if they are located at their place of business or at their home (if the claimant's home is considered a permissible geographic region for access the data), but obviously not both locations at the same time because it would not be possible for a single claimant to be physically located at two locations at the same time.

Figure 1B:
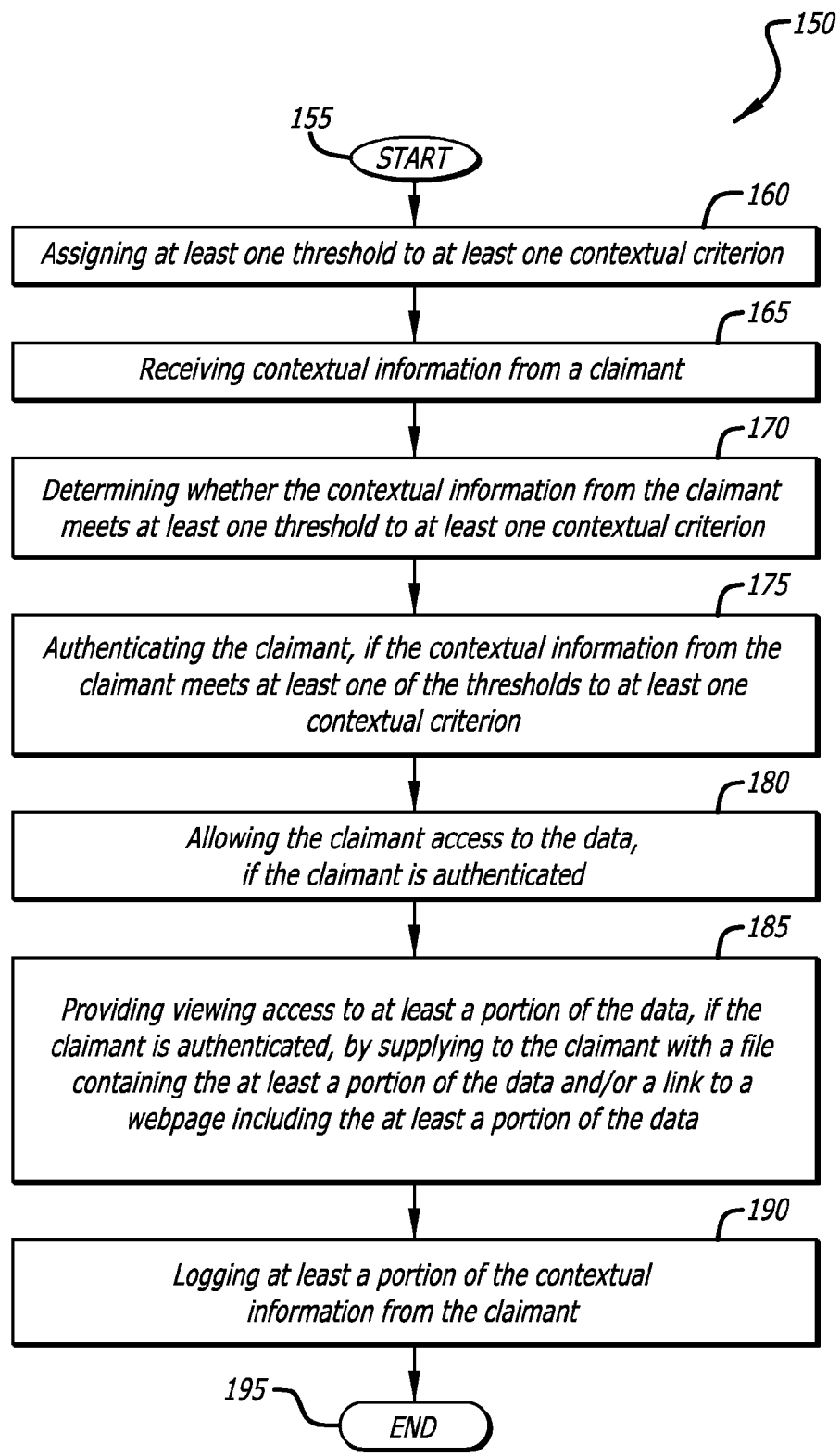
FIG. 1B is a flow diagram for the disclosed method to improve data access control, in accordance with at least one embodiment of the present disclosure.

FIG. 1B is a flow diagram for the disclosed method 150 to improve data access control, in accordance with at least one embodiment of the present disclosure. At the start 155 of the method 150, at least one threshold is assigned to at least one contextual criterion 160. A receiver receives contextual information from a claimant 165. After the contextual information from the claimant is received, at least one processor determines whether the contextual information from the claimant meets at least one threshold to at least one contextual criterion 170. At least one processor, which may be located in an authentication device, authenticates the claimant if the contextual information from the claimant meets at least one threshold to at least one contextual criterion 175. If the claimant is authenticated, at least one processor, which may be located in a data storage device such as a server, allows the claimant to access the data 180.

In some embodiments, if the claimant is authenticated, at least one processor provides viewing access to at least a portion of the data by supplying to the claimant a file containing at least a portion of the data to be viewed and/or a link to a webpage including at least a portion of the data to be viewed 185. In some embodiments, at least one processor logs at least a portion of the contextual information from the claimant in a data storage area, such as in memory and/or in a database 190. Then, the method 150 ends 195.

It should be noted that in some embodiments, the above-described steps to the disclosed method 150 may be performed in a different order. Also, it should be noted that, in some embodiments, more or less steps than the steps described above may be performed for the disclosed method 150.

Figure 2:
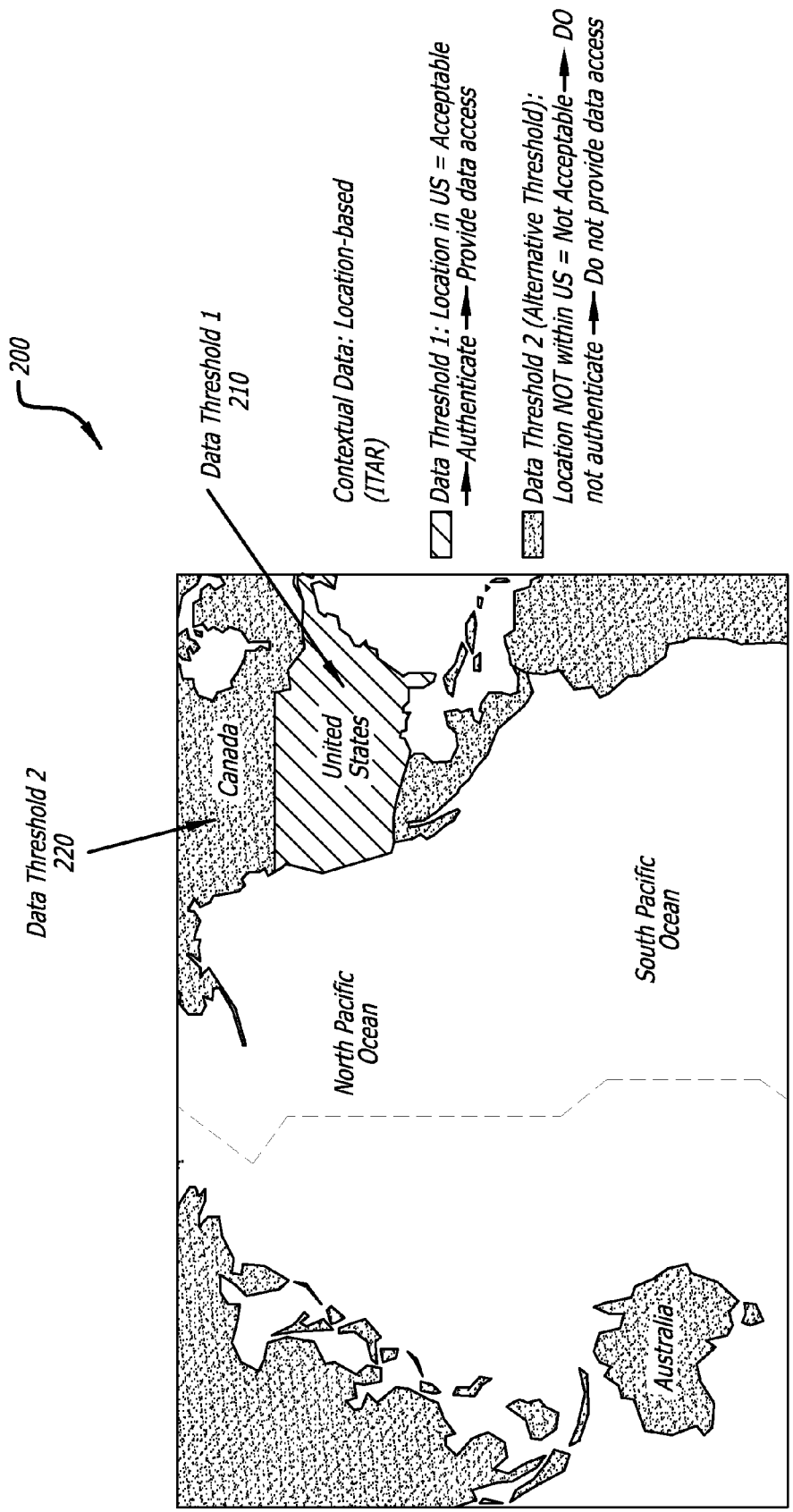
FIG. 2 is a schematic diagram of the disclosed system to improve data access control where the contextual criterion includes a permitted geographical area and a non-permitted geographical area, in accordance with at least one embodiment of the present disclosure.

FIG. 2 is a schematic diagram of the disclosed system 200 to improve data access control where the contextual criterion includes a permitted geographical area 210 and a non-permitted geographical area 220, in accordance with at least one embodiment of the present disclosure. In this figure, two example contextual thresholds for virtual data boundaries have been defined for access control related to International Traffic in Arms Regulations (ITAR) related data. It should be noted that while not both thresholds are required for the boundaries to function, it should be obvious that the combination of both types of these permissibility thresholds (i.e. a permissibility geographical area 210 and a non-permissibility geographical area 220) may find utility in real-world applications.

In this figure, the first threshold, identified as Data Threshold 1 210, provides a threshold requiring that someone (i.e. a claimant) attempting to gain access to the international traffic in arms regulations (ITAR) restricted data must be physically located within the perimeter of the United States contiguous land mass (CONUS) to access it. Note that while in this example the United States land mass is a permissible geographic area and, thus, data can be accessed throughout the United States, it is likely that additional contextual thresholds would be established, such as whether the claimant had the appropriate citizenship (i.e. whether the claimant is a United States citizen) and whether they had a need to know the data (e.g., the contents of the data relate to the claimant's job function such that they had a need to know the data in order to perform their job).

Alternatively, Data Threshold 2 220 is an alternate way of developing a contextual threshold. For this alternative threshold, someone physically located outside of the United States is not able to access the data. It should be noted that bodies of water, such as oceans, may also be included within this threshold (i.e. the virtual data boundary 220) for a real-world implementation. Additionally, it should be evident that this example may not be so clear-cut, but for the simplicity of outlining the basics of the disclosed system and method, it has been defined as such.

While FIGS. 1A and 2 represent simplistic embodiments, it is important to provide an additional example of how the disclosed system and method can perform with multiple thresholds to contextual criterion. One such example is illustrated in FIGS. 3A-4D.

FIG. 3A is a schematic diagram of the disclosed system 300 to improve data access control where the contextual criterion includes a permitted geographical area and a permitted time duration to access company data, in accordance with at least one embodiment of the present disclosure. In this example, an employee (i.e. a claimant) at a company has both a desktop computer 320 located at the employee's work facility 310 and a laptop computer (not shown) located at the employee's home (not shown). The employee's company has implemented contextual data virtual boundaries 305, 405 for both the employee's on-site work facility 310 location and off-site home location. In addition, the employee's company has implemented time-relation contextual criterion where the employee only has access to the data during specific time durations during the day that are dependent upon the location from which the employee is attempting to access the data. All thresholds (i.e. the location-based threshold and the time-based threshold) must be satisfied for the employee to be authenticated and thereby gain access to the data.

In FIG. 3A, an employee (i.e. a claimant) desires to gain access to data on a server 330 via their on-site desktop computer 320. Since a desktop computer 320 is generally considered to be a device that stays in one location (i.e. is not mobile), the location-related criteria requires that the desktop computer 320 is only able to access the data from its on-site location (i.e. work facility location 310). If the desktop computer 320 attempts to access the data from a location other than its work facility location 310, the claimant would not be provided access to the data. This contextual criterion is likely to be implemented through a network management policy. In this scenario, the employee's location may be authenticated through satellite geolocation techniques.

Similarly, a time-related criterion may require that the employee only has access to the data via his desktop computer 320 during the employee's normal working hours at the work facility 310. For example, the employee may have a schedule of working hours from 9 AM to 5 PM on weekdays at the work facility 310. As such, the time-related threshold may only allow the employee access to the data though his desktop computer 320 during the hours of 9 AM to 5 PM on Monday through Friday, excluding holidays. The time-related criterion may be established by a network management entity in the form of a policy, where the network will not grant access to the data if the employee attempts to access the data outside of these permissible time durations.

FIG. 3B is a matrix 340 showing the possible combinations for a claimant for meeting the thresholds to the contextual criterion of the system depicted in FIG. 3A, in accordance with at least one embodiment of the present disclosure. In this figure, the matrix 340 shows the four possible combinations that may occur when the employee is attempting to access the data. One of the four possible combinations, combination 350, occurs when employee is located within the permissible geographical area when the employee is attempting to access the data and the employee is attempting to access the data during a permissible time period. When this combination occurs, the employee is granted access to the data. Another possible combination, combination 360, occurs when the employee is located within the permissible geographical area when the employee is attempting to access the data and the employee is attempting to access the data during a non-permissible time period. When this combination occurs, the employee is not granted access to the data because both of the thresholds are not met. It is important to note that in this case, instead of not granting access to the employee based on the non-permissible time period, additional authentication and/or authorization policies may be applied. For example, the claimant may need to provide additional information to authenticate himself or work to receive special approval to work outside their typical hours. In an alternative example, the claimant may be provided with only a limited amount of data. This could reduce the ability of an ill-intentioned employee from gaining access to data outside of their normal business hours when they may be more easily able to not disclose their devious activities to their work colleagues and security personnel.

Another possible combination, combination 370, occurs when the employee is not located within the permissible geographical area when the employee is attempting to access the data and the employee is attempting to access the data during a permissible time period. When this combination occurs, the employee is not granted access to the data. Yet another possible combination, combination 380, occurs when the employee is not located within the permissible geographical area when the employee is attempting to access the data and the employee is attempting to access the data during a non-permissible time period. When this combination occurs, the employee is not granted access to the data.

Figure 4A:
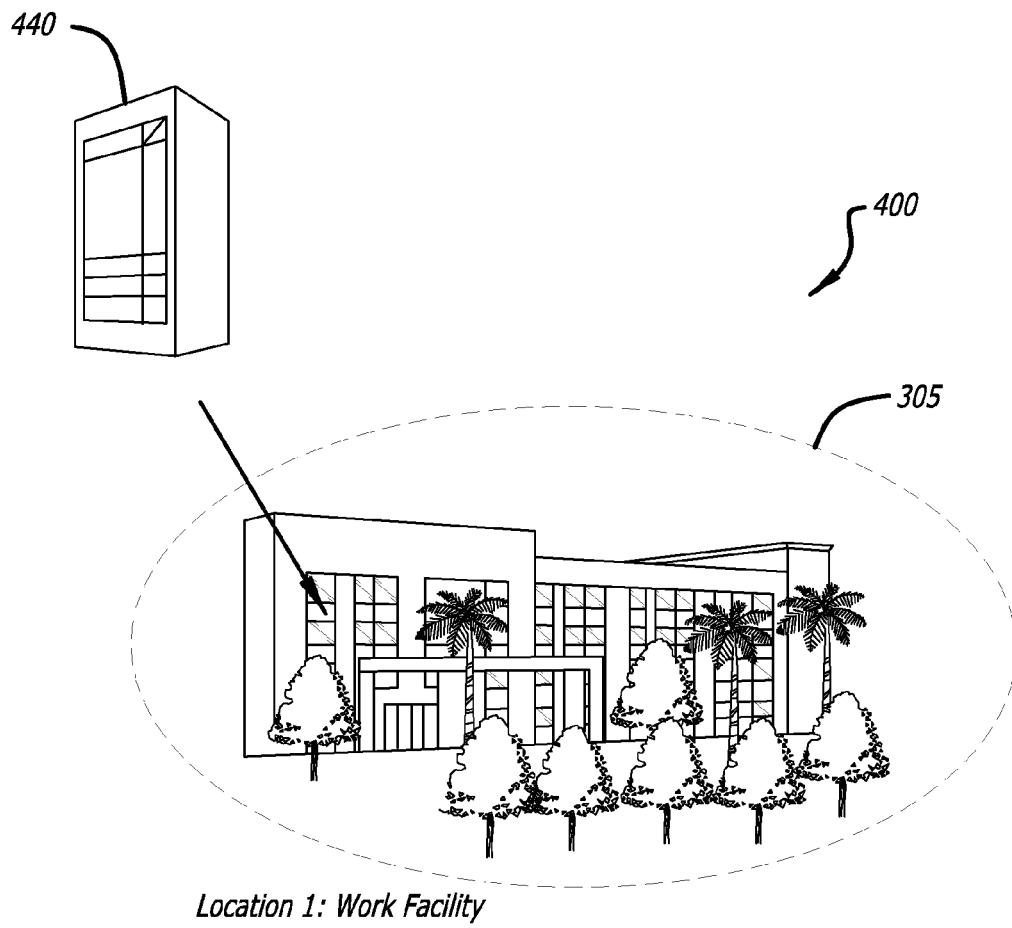
FIG. 4A is a schematic diagram, and related threshold matrix, of the disclosed system to improve data access control where the contextual criterion includes a permitted geographical area relating to a work facility and a permitted time duration, in accordance with at least one embodiment of the present disclosure.
Figure 4B:
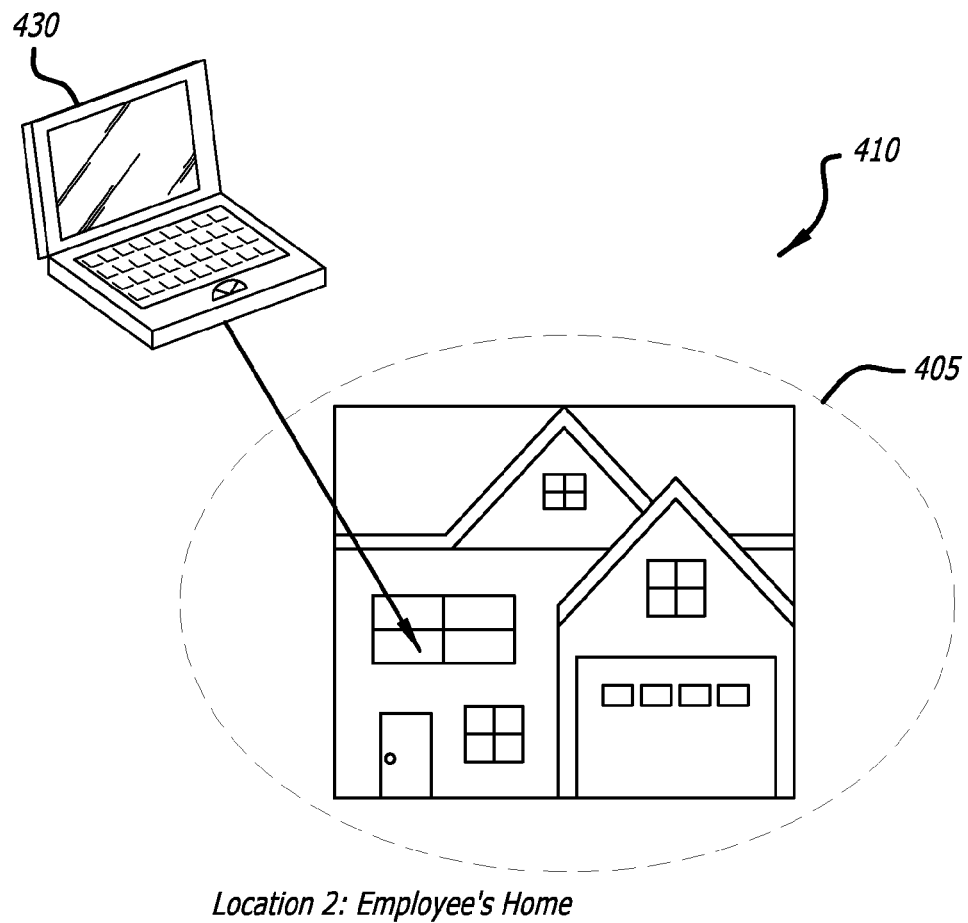
FIG. 4B is a schematic diagram, and related threshold matrix, of the disclosed system to improve data access control where the contextual criterion includes a permitted geographical area relating to an employee's home and a permitted time duration, in accordance with at least one embodiment of the present disclosure.
Figure 4C:
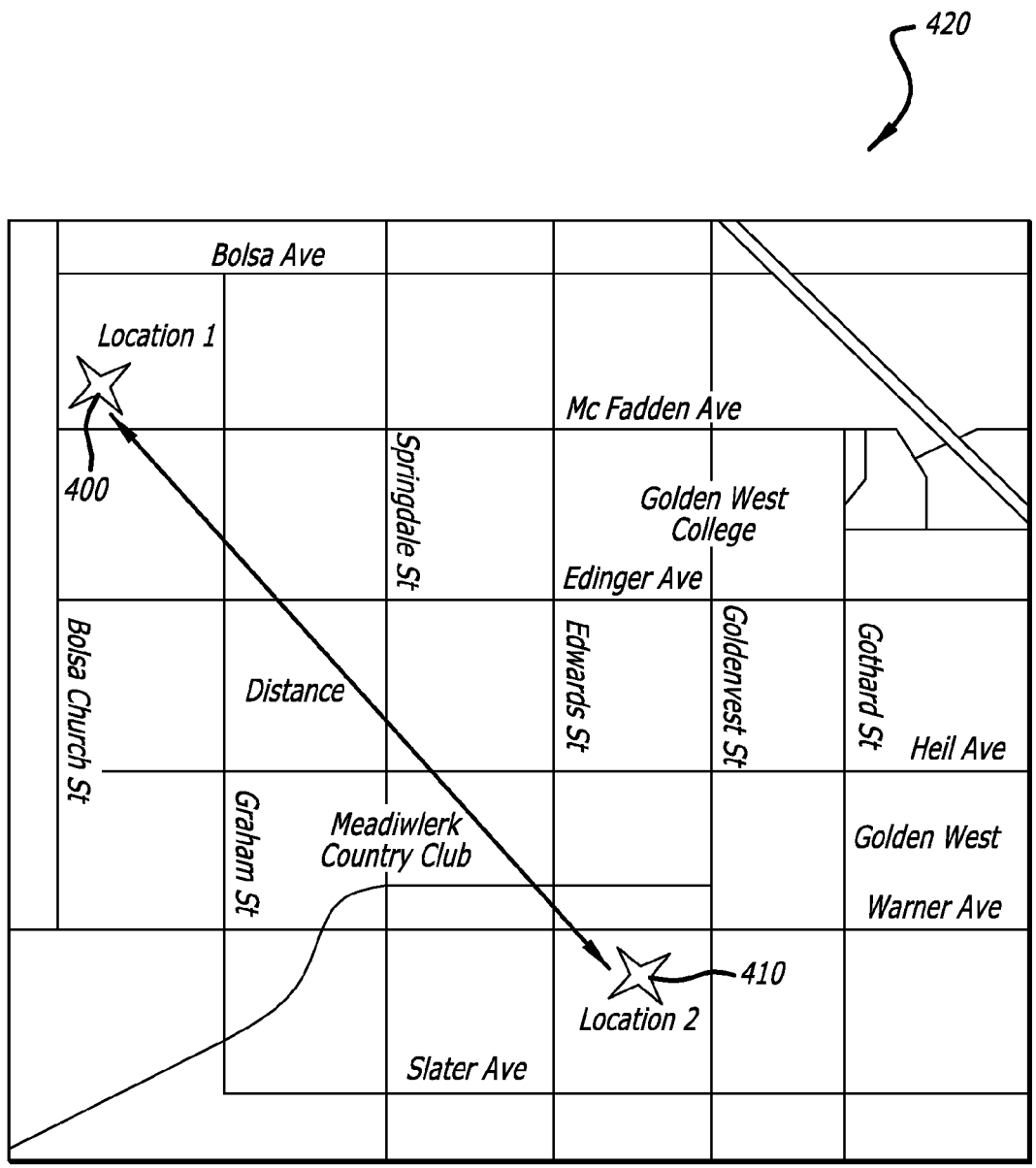
FIG. 4C is an example street map showing the location of the work facility in FIG. 4A in relation to the location of the employee's home in FIG. 4B, in accordance with at least one embodiment of the present disclosure.

FIG. 4A is a schematic diagram, and related threshold matrix, of the disclosed system to improve data access control where the contextual criterion includes a permitted geographical area relating to a work facility 400 and a permitted time duration, in accordance with at least one embodiment of the present disclosure. FIG. 4B is a schematic diagram, and related threshold matrix, of the disclosed system to improve data access control where the contextual criterion includes a permitted geographical area relating to an employee's home 410 and a permitted time duration, in accordance with at least one embodiment of the present disclosure. FIG. 4C is an example street map 420 showing the location of the work facility 400 in FIG. 4A in relation to the location of the employee's home 410 in FIG. 4B, in accordance with at least one embodiment of the present disclosure.

In these figures, the same employee from FIG. 3A, has a laptop computer 430 which they use in their lab that is on-site at their work facility 400. They also bring their laptop computer 430 home 410, on occasion, to complete tasks. This is a clear example of why virtual data boundaries may be device dependent, as devices may have access control set-up to operate differently depending upon other contextual information, such as where and when they are attempting to access data. For example, it may be acceptable for an employee to use their laptop computer 430 to access the company network or server 440 from the employee's home location 410 during hours that are outside of the employee's normal working hours (i.e. access the data during hours other than the employee's assigned working hours to work at the work facility 400). However, alternatively, it would not be acceptable for the employee to use their desktop computer (not shown) at the work facility 400 to attempt to access the data within the same contextual parameters (i.e. access the data during hours other than the employee's assigned working hours to work at the work facility 400).

Figure 4D:
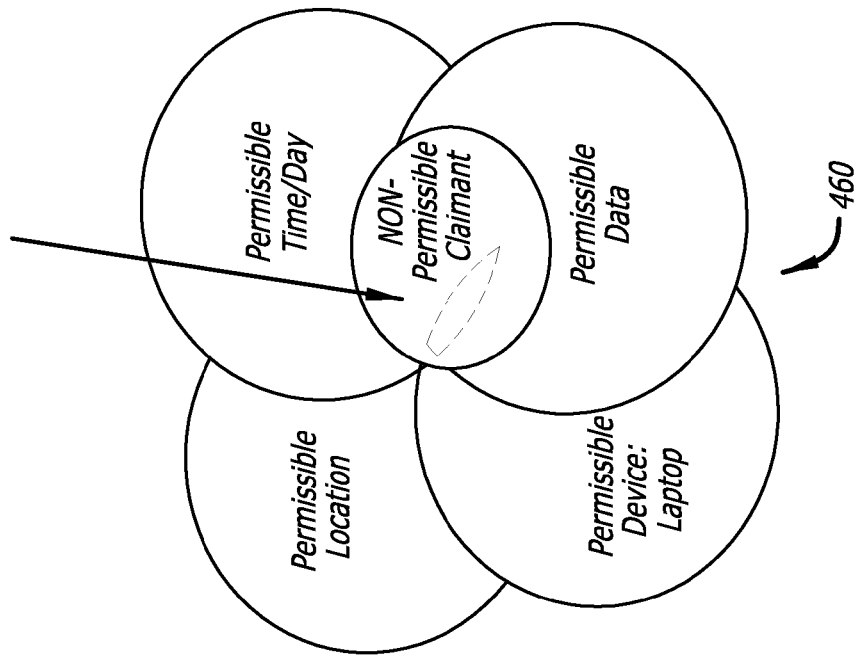
FIG. 4D shows Venn diagrams depicting the different threshold scenarios that may occur for a current employee and a former employee, in accordance with at least one embodiment of the present disclosure.
Figure 4D:
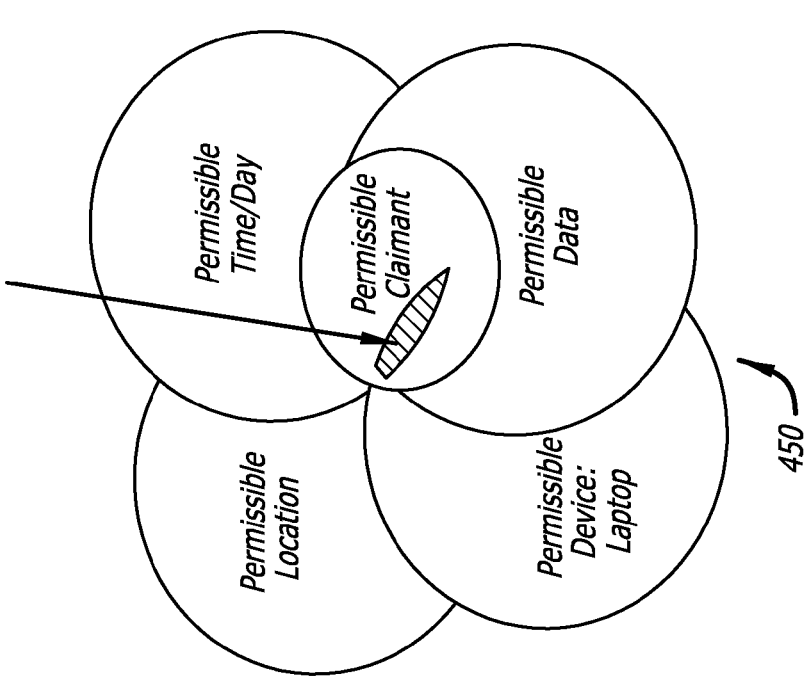

FIG. 4D shows Venn diagrams 450, 460 depicting the different threshold scenarios that may occur for a current employee and a former employee, in accordance with at least one embodiment of the present disclosure. For this figure, the same employee from FIGS. 3A-4C, is attempting to access the data via their laptop computer (not shown) during their assigned work hours at their lab at the work facility. The employee is authenticated because all required thresholds have been satisfactorily met, which is shown by shaded region 470 on the left Venn diagram 450. While not shown in this figure, there are similar regions of permissible location and time/day of access associated with the laptop computer's ability to access data while located at the employee's home. These permissible times for accessing the data via the laptop computer from the employee's home may or may not overlap with the assigned working hours for the employee at their lab at the work facility. Note that it is not possible for the laptop computer to access data from their home at the same time the laptop computer is accessing data from the work facility.

In this example, at a later time, the same employee is fired from the company. The employee decides to try to use some proprietary data from one of their past analyses to entice a new potential employer. The proprietary data resides on their laptop computer. After the employee was terminated, the employee's desktop computer was removed from their office and the employee's general access privileges to the company network and server(s) were revoked. However, the employee did not return to the company their laptop computer, which was in their car at the time of their firing. After being fired, the employee goes home and immediately attempts to access the data via their laptop computer. However, once the employee attempts to access the data via their laptop computer, the employee cannot be authenticated because they are no longer listed as an acceptable claimant on the company's permissible roster. For this reason, access to the data is denied. In this example, it is assumed that the rest of the acceptable thresholds were met, as is shown in the right Venn diagram 460. However, it should be noted that in one potential real-world scenario, the employee's full profile would be removed and, thus, the permissible locations and time durations for data access by the employee would likely also have been removed so as to not enable the employee to meet these thresholds.

Figure 5A:
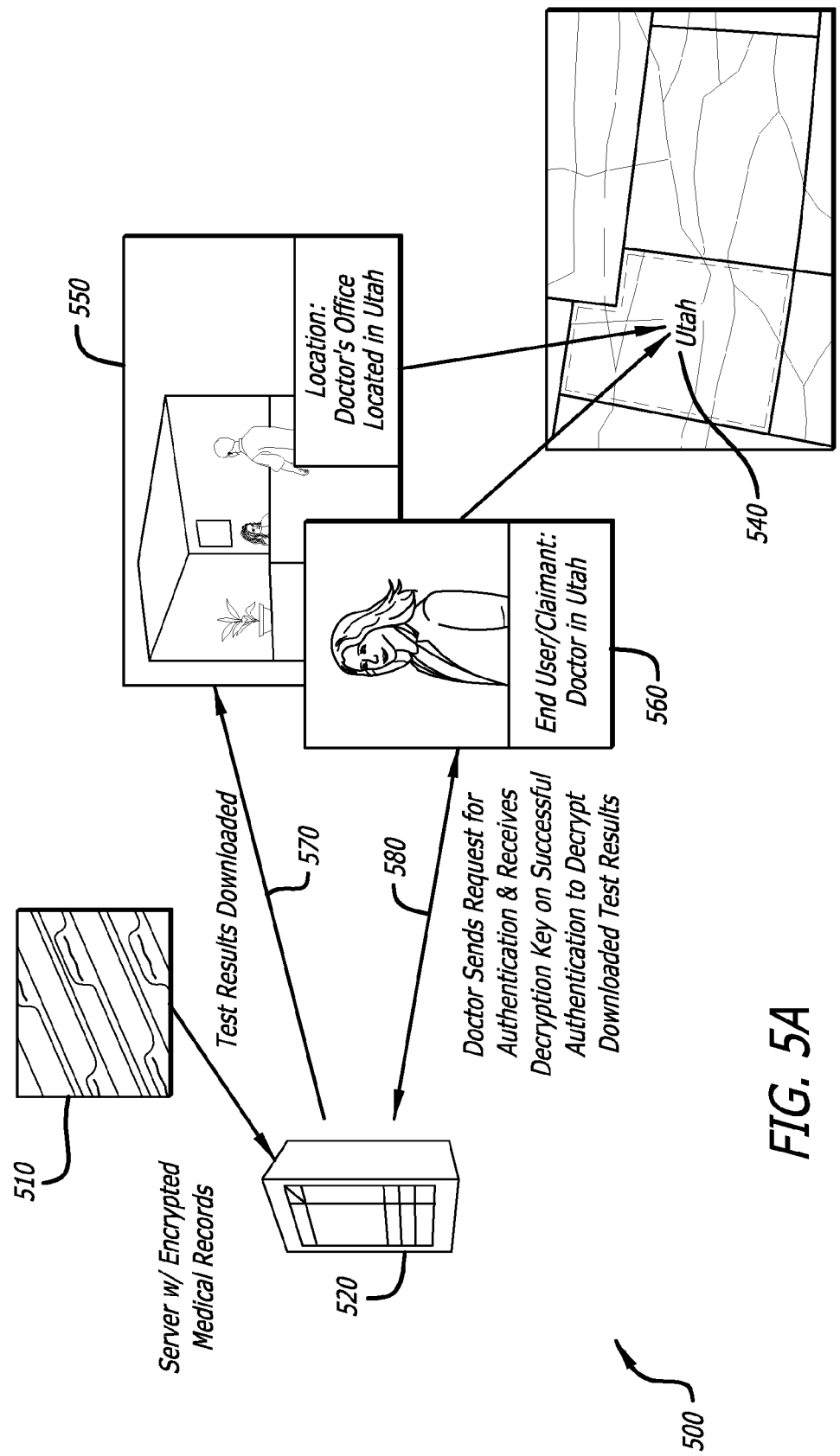
FIG. 5A is a schematic diagram of the disclosed system to improve data access control where the contextual criterion includes a permitted geographical area and a permitted time duration to access medical data, in accordance with at least one embodiment of the present disclosure.

FIG. 5A is a schematic diagram of the disclosed system 500 to improve data access control where the contextual criterion includes a permitted geographical area 530, 540 and a permitted time duration to access medical data 510, in accordance with at least one embodiment of the present disclosure. In this figure, a database is established, for example, to store medical records 510 on a server 520, which may be located in a known physical location (e.g., in the state of Utah 540 within the United States).

At least a portion of the medical data 510 within that database is encrypted with a unique key. To be most effective, this unique key will change from time to time. Medical files 510 and/or other medical data 510 may be downloaded from that database to a local file storage device, such as a server in a doctor's office 550. But, since the data 510 is encrypted, it is unreadable. A claimant 560 seeking the key to decrypt some of the data 510 (e.g., a doctor 560 requesting 580 to access a medical file 510 including blood and other medical test results for a patient) must prove that they are physically located within a permissible geographic area 540 (e.g., within the state of Utah) to the originating server 520. When it is confirmed that the claimant 560 is located within a permissible geographic area 540, such as the state of Utah, the server 520 will provide 580 the decryption key to the claimant 560. Additionally, it should be noted that the originating server 520 may require a further information about the claimant 560 in order to authenticate the claimant 560. For these scenarios, the doctor 560 could provide their medical license information and/or doctor's office operating license information along with proof that they are located within the permissible geographic area 540 (e.g., the state of Utah) to secure access to the data 510.

Alternatively, when the data 510 is transmitted 570 by the originating server 520 to the claimant 560, it may be encrypted at that time versus remaining encrypted on the originating storage device 520. A claimant 560 seeking the key to decrypt the information 510 may need to request 580 the key within some period of time after the data 510 was sent 570 (e.g., within five (5) minutes), and may need to provide satisfactory geographical information clearly verifying that they lie within the permissible geographical area 540.

Figure 5B:
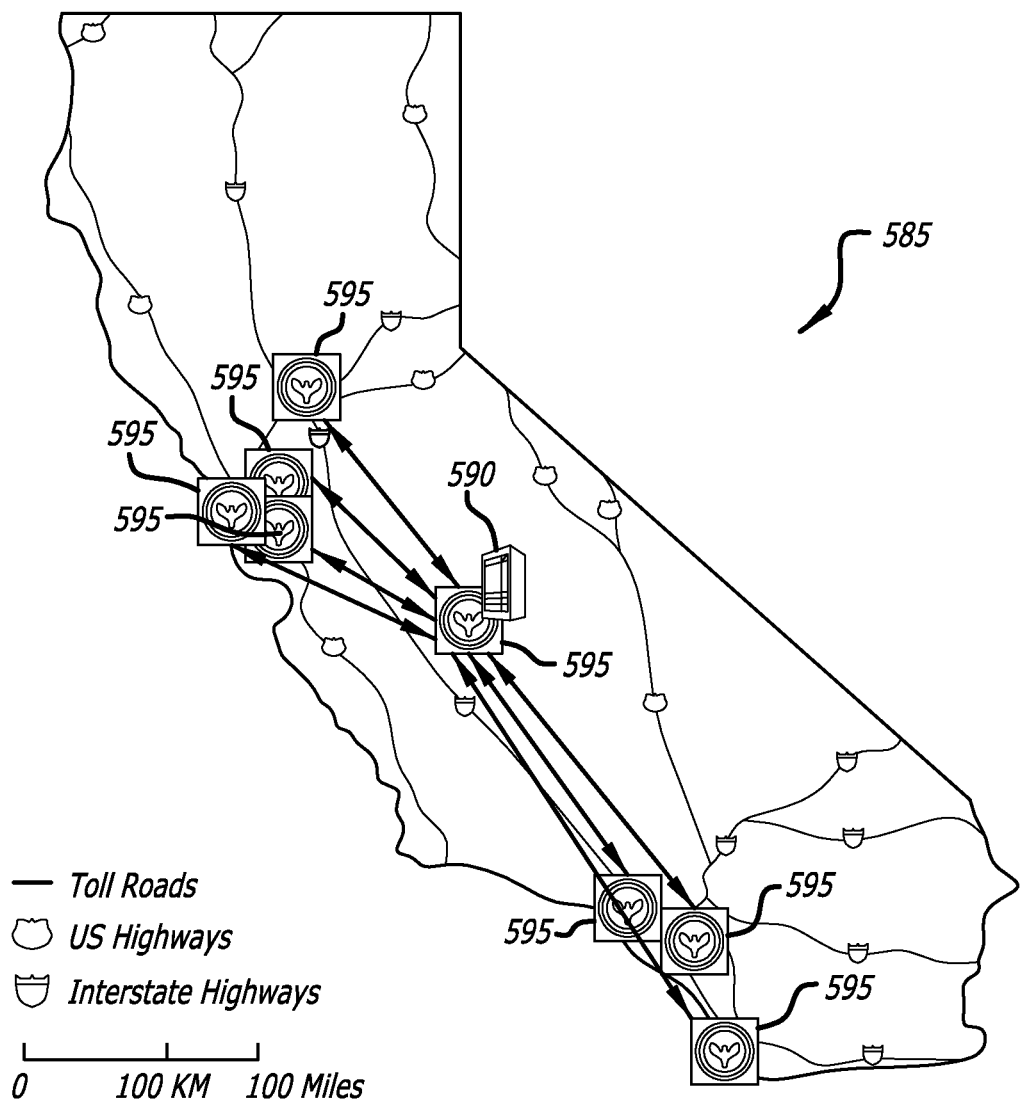
FIG. 5B is an example state map showing multiple virtual data boundary locations identifying permissible geographical areas of permissible accessibility to data, in accordance with at least one embodiment of the present disclosure.

FIG. 5B is an example state map 585 showing multiple virtual data boundary locations 595 identifying permissible geographical areas of permissible accessibility to data, in accordance with at least one embodiment of the present disclosure. In this example, a database is established on a server 590 for some of the United States military recruiting offices in the state of California 585, where the server 590 is possibly, but not necessarily, in a known physical location. Information stored on the database may only be viewed, uploaded, and/or edited by a claimant via a browser running on a computer that is located at one of the identified military recruiting offices 595, when the computer has satisfactory authenticated their physical location to the server 590, as being located within a permissible geographical area, within a defined acceptable period of time (e.g., authenticated the physical location within five (5) minutes after first attempting to access the data).

In a more secure embodiment, the database is "locked down", and the information retrieved from the server 590 may only be viewed (e.g., viewed as an image), but not copied. The data made available to the computer located at a military recruiting office 595 is only in viewable form (e.g., a PDF file, a jpeg file, a web image, or another image-type file), not in editable form (e.g., a Microsoft Word document, spreadsheet, or database). As such, the integrity of the data is more protected. Since each recruiting center 595 no longer maintains its own data, this makes the data less susceptible to a specific center's 595 lack of data security practices.

Figure 6A:
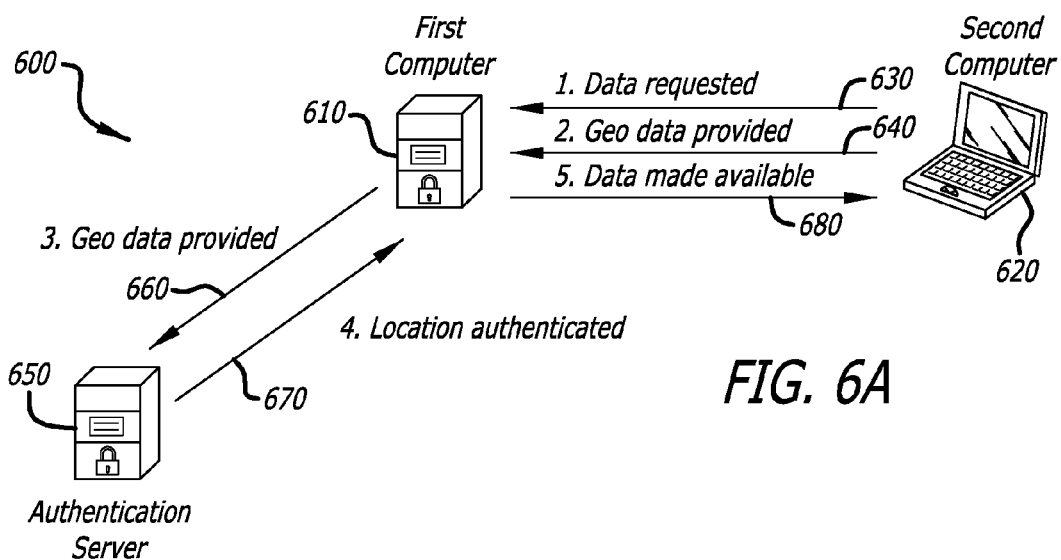
FIG. 6A is a schematic diagram of one disclosed method to improve data access control where the contextual criterion includes a permitted geographical area, in accordance with at least one embodiment of the present disclosure.

FIG. 6A is a schematic diagram 600 of one disclosed method to improve data access control where the contextual criterion includes a permitted geographical area, in accordance with at least one embodiment of the present disclosure.

In this figure, data is stored on a network node that is embodied as a server 610, which is denoted as the "First Computer" 610. In this embodiment, the First Computer 610 maintains its own policies, which include the definition of the geographic area of permissible access for the data.

A user (i.e. a claimant) of a Second Computer 620 attempts to gain access to the data, and does so by sending a request for the data to the First Computer 610 (Step 630), and providing to the First Computer 610 the geolocation data of the Second Computer 620 (Step 640). In this embodiment, authentication is performed by a processor that is located in a server 650, which is denoted as the "Authentication Server" 650. The Authentication Server 650 houses all of the functionality for authentication, and validates that the contextual threshold, which in this case relates only to the claimant's location, has been met.

After the First Computer 610 has received the geolocation data from the Second Computer 620, the First Computer 610 passes the geolocation data to the Authentication Server 650 (Step 660). Once the Authentication Server 650 receives the geolocation data, the Authentication Server 650 validates, by using the geolocation data, that the Second Computer 620 is located in a permitted geographical area. If the Authentication Server 650 validates that this geographical contextual threshold has been met by the Second Computer 620, the Authentication Server 650 authenticates the Second Computer 620.

Then, the Authentication Server 650 forwards to the First Computer 610 the authentication information regarding the Second Computer 620 (Step 670). After the First Computer 610 receives the authentication information, the First Computer 610 makes the data available to the Second Computer 620 (Step 680).

In at least one embodiment, any data request, such as that to view or modify the data, is accompanied by information (e.g., satellite signal data) that can be used to validate the entity's (or claimant's) 620 physical location (i.e. the geolocation data). One possible application of this may be to have a browser provide such information to a Web server. The host node 610 will then contact an Authentication Server 650 and use this information to confirm that the claimant 620 is located within a permissible geographical area. If the contextual threshold is satisfactorily met, access is granted and data is provided.

Figure 6B:
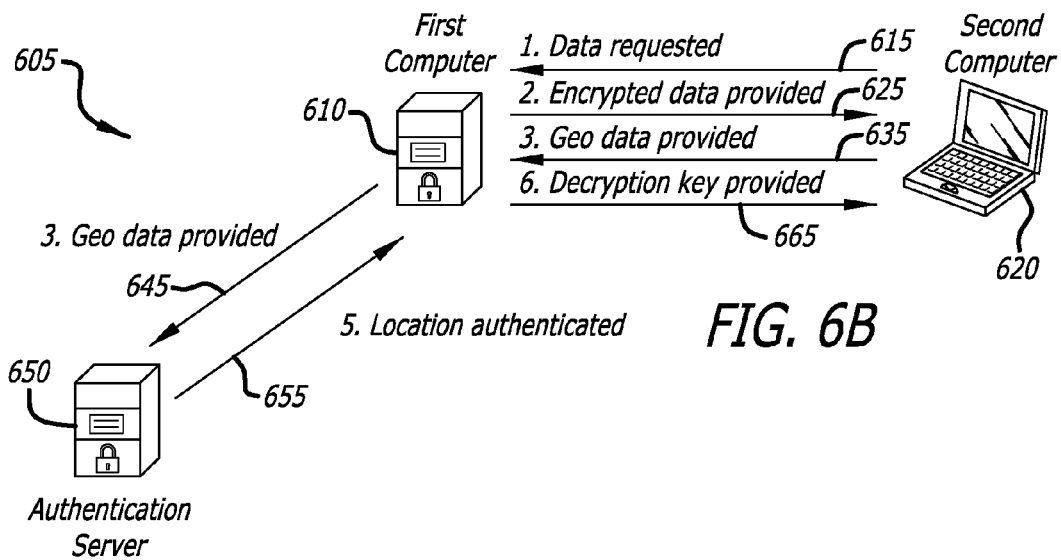
FIG. 6B is a schematic diagram of another disclosed method to improve data access control where the contextual criterion includes a permitted geographical area, in accordance with at least one embodiment of the present disclosure.

FIG. 6B is a schematic diagram 605 of another disclosed method to improve data access control where the contextual criterion includes a permitted geographical area, in accordance with at least one embodiment of the present disclosure. For the embodiment of this figure, which builds off the embodiment of FIG. 6A, data encryption is used to further improve the security of the system. The data is encrypted with a unique key, which may change from time to time, and is stored on a network node (i.e. the First Computer) 610. To view the data, the claimant (i.e. the Second Computer) 620 must supply the host node (i.e. the First Computer) 610 with its geolocation information. The host node 610 will then contact an Authentication Server 650 and confirm that the requesting entity 620 is located within a permissible geographical area. If the Authentication Server 650 authenticates the claimant 620, a decryption key is provided to the requesting claimant 620. It should be evident that the data stored may be transferred to other entities (e.g., other servers or nodes). However, such data is not viewable given the aforementioned encryption.

As is shown in FIG. 6B, at the start of the method, the Second Computer 620 sends a request to the First Computer 610 for data (Step 615). After the First Computer 610 receives the request, the First Computer 610 forwards the encrypted data to the Second Computer 620 (Step 625). After the Second Computer 620 receives the encrypted data, the Second Computer 620 sends its geolocation data to the first Computer 610 (Step 635).

Then, the First Computer 610 forwards to the Authentication Server 650 the geolocation data for the Second Computer 620 (Step 645). Once the Authentication Server 650 receives the geolocation data, the Authentication Server 650 determines, by using the geolocation data, whether the Second Computer 620 is located within a permissible geographical area. The Authentication Server 650 authenticates the Second Computer 620, if the Authentication Server 650 determines that the Second Computer 620 is located within a permissible geographical area. Once the Authentication Server 650 authenticates the Second Computer 620, the Authentication Server 650 sends to the First Computer 610 authentication information for the Second Computer 620 (Step 655). After the First Computer 610 receives the authentication information, the First Computer 610 sends the decryption key to the Second Computer 620 (Step 665). After the Second Computer 620 receives the decryption key, the Second Computer 620 can decrypt the encrypted data, and access it.

Figure 6C:
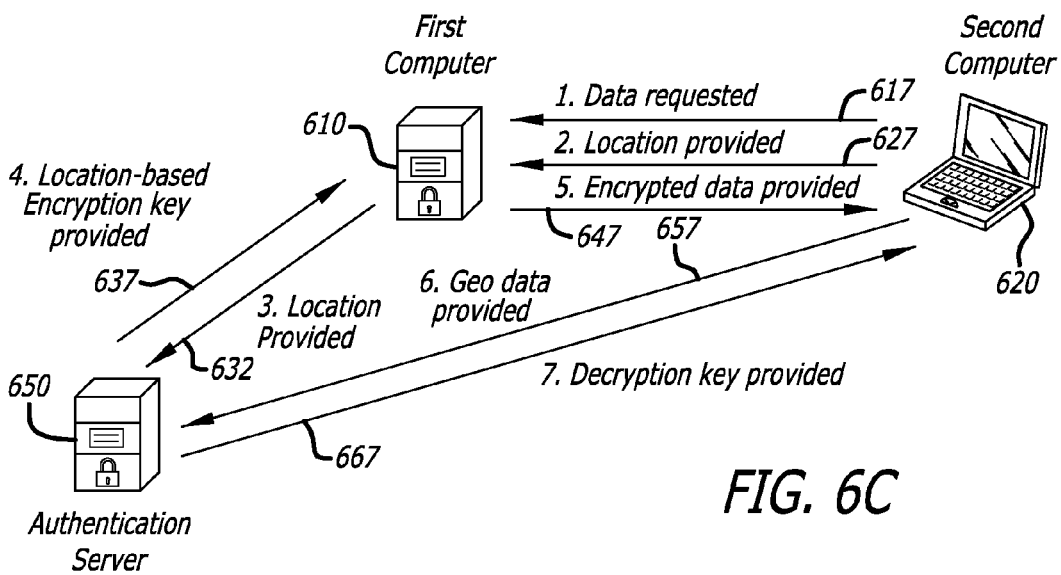
FIG. 6C is a schematic diagram of yet another disclosed method to improve data access control where the contextual criterion includes a permitted geographical area, in accordance with at least one embodiment of the present disclosure.

FIG. 6C is a schematic diagram 607 of yet another disclosed method to improve data access control where the contextual criterion includes a permitted geographical area, in accordance with at least one embodiment of the present disclosure. In this figure, data is stored unencrypted on a network node (i.e. the First Computer) 610. When a claimant (i.e. the Second Computer) 620 requests the data, the data is encrypted on the fly by the First Computer 610 using a location-specific encryption key provided by an Authentication Server 650. The First Computer 610, then, subsequently transmits the encrypted data to the claimant 620. In order for the claimant 620 to access the data, the claimant 620 must request a decryption key within some period of time after the data was sent, and must also provide proof that the claimant 620 is located within a permissible geographic area. The Authentication Server 650 will then compare this information, and validate whether the requesting claimant 620 is located within a prescribed geographical area. If authentication is satisfactorily met, the decryption key is provided to the requesting entity 620.

In at least one embodiment, the location data sent by the Second Computer (i.e. claimant) 620 is a simple declaration of location by the claimant 620. For example, the location data could be in the form of latitude, longitude, and altitude without any true proof. If the claimant's 620 declared location is within the permissible geographic area, then the First Computer 610 will provide the encrypted data to the claimant 620. In order to obtain the decryption key, the claimant 620 must send proof of its location (e.g., data related to its location that is collected from an Iridium satellite's spot beam) to the Authentication Server 650 to show that its claimed location is true. This embodiment puts very little processing or bandwidth overhead on the First Computer 610—the First Computer 610 merely has to determine whether a declared location of the claimant 620 is within the permissible geographic area. The Authentication Server 650 is responsible for validating that the declared location of the claimant 620 is true, but does not have the responsibility of knowing whether the declared location is within the permissible geographic area because this task was already accomplished by the First Computer 610.

As is shown in FIG. 6C, at the start of the method, the Second Computer 620 sends a request to the First Computer 610 for data (Step 617), and sends its location data to the first Computer 610 (Step 627). After the First Computer 610 receives the request and the location data, the First Computer 610 sends a request to the Authentication Server 650 for a location-based encryption key, which is based upon the location of the Second Computer 620 (Step 632). The First Computer 610 then obtains from the Authentication Server 650 (Step 637) a location-based encryption key, which is based on the location of the Second Computer 620, to encrypt the requested data. The First Computer 610 then uses the encryption key to encrypt the data. After the First Computer 610 encrypts the requested data, the First Computer 610 forwards the encrypted data to the Second Computer 620 (Step 647).

After the Second Computer 620 has received the encrypted data, the Second Computer 620 sends proof of its geolocation information to the Authentication Server 650 (Step 657). The proof of the geolocation information may consist of various items. For example, in at least one embodiment, the proof may consist of data the Second Computer 620 received from at least one signal from at least one beam transmitted from at least one satellite (e.g., an Iridium satellite(s)). Once the Authentication Server 650 receives the proof of the geolocation information from the Second Computer 620, the Authentication Sever 650 must determine whether the Second Computer 620 sent the proof of the geolocation information within a defined time period after the Second Computer 620 received the encrypted data (e.g., sent the proof within five (5) minutes of receiving the encrypted data), and must determine whether the Second Computer 620 is indeed located within a permissible geographical area.

The Authentication Server 650 authenticates the Second Computer 620, if the Authentication Server 650 determines that the Second Computer 620 sent the proof of the geolocation information within a defined time period after the Second Computer 620 received the encrypted data and that the Second Computer 620 is located within a permissible geographical area (i.e. substantially at or near the claimed location of Step 627). Once the Authentication Server 650 authenticates the Second Computer 620, the Authentication Server 650 sends a decryption key to the Second Computer 620 (Step 667). After the Second Computer 620 receives the decryption key, the Second Computer 620 can decrypt the encrypted data, and access it.

It should be noted that in the different methods depicted in FIGS. 6A through 6C described above, the Second Computer 620 may use one or more passwords to gain remote access to the data on the First Computer 610. The quantity, type, and/or content of the data made available to the Second Computer 620 may be limited based on the geographic location of the Second Computer 620 when the Second Computer 620 is requesting access to the data, the time the Second Computer 620 is requesting access to the data, the administrative rights of the Second Computer 620 based on the its 620 identity, and/or other contextual information.

Figure 7:
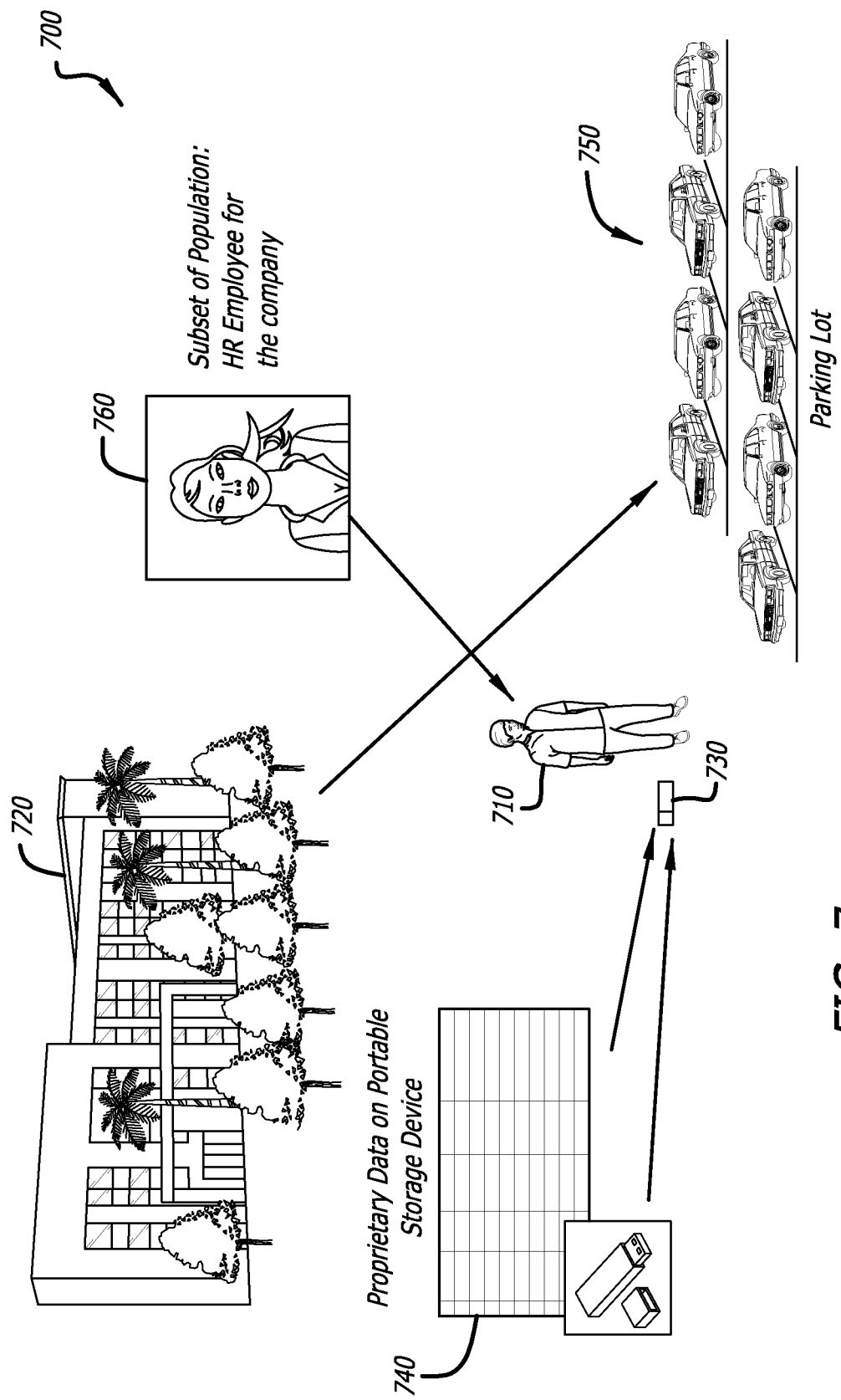
FIG. 7 is a schematic diagram of the disclosed system to improve data access control where the data is deleted if it is not accessed by the claimant within a defined period of time, in accordance with at least one embodiment of the present disclosure.

FIG. 7 is a schematic diagram of the disclosed system 700 to improve data access control where the data is deleted if it is not accessed by the claimant within a defined period of time, in accordance with at least one embodiment of the present disclosure. In this figure, a human resources (HR) representative 710 for a large company 720 is shown to be on his or her way out of the office 720, and unintentionally drops a universal serial bus (USB) drive 730 containing confidential employee information 740 in the parking lot 750. This data 740 is acceptable for the HR representative 710 to access as he or she is part of a subset of the population (e.g., group of HR employees for the company) 760 that has been assigned access privileges to the employee data 740. While the proximity of the device 730 to the building 720 may be within an acceptable range of physical location so as to be located within a permissible geographical area for data access, it may be imperative to add additional security measures, such as static passwords, to improve the likelihood that only the intended user 710, 760 could access the data. Additionally, if the USB drive 730 were to remain lost, after a defined period of time has lapsed, the drive 730 will delete the data 740 residing on it, and/or encrypt the data 740, thereby making the data inaccessible. These disclosed features would remove the security threat even if the drive 730 were to be discovered at a later time.

Figure 8B:
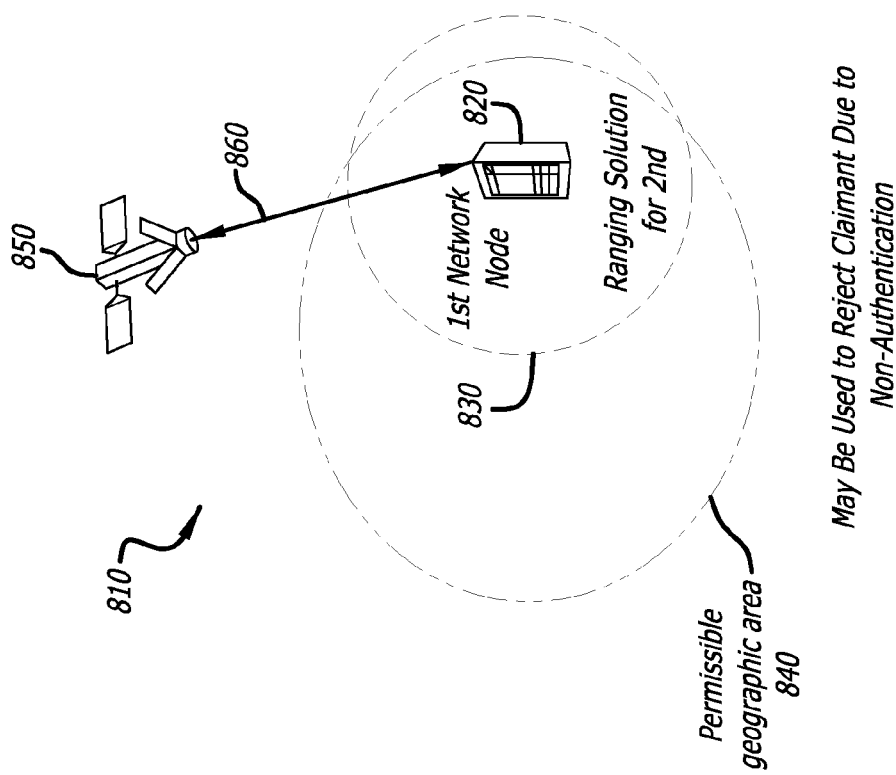
FIG. 8B is a schematic diagram of the disclosed system to improve data access control utilizing satellite and ranging geolocation techniques to authenticate the claimant where the claimant is shown to not be authenticated, in accordance with at least one embodiment of the present disclosure.
Figure 8A:
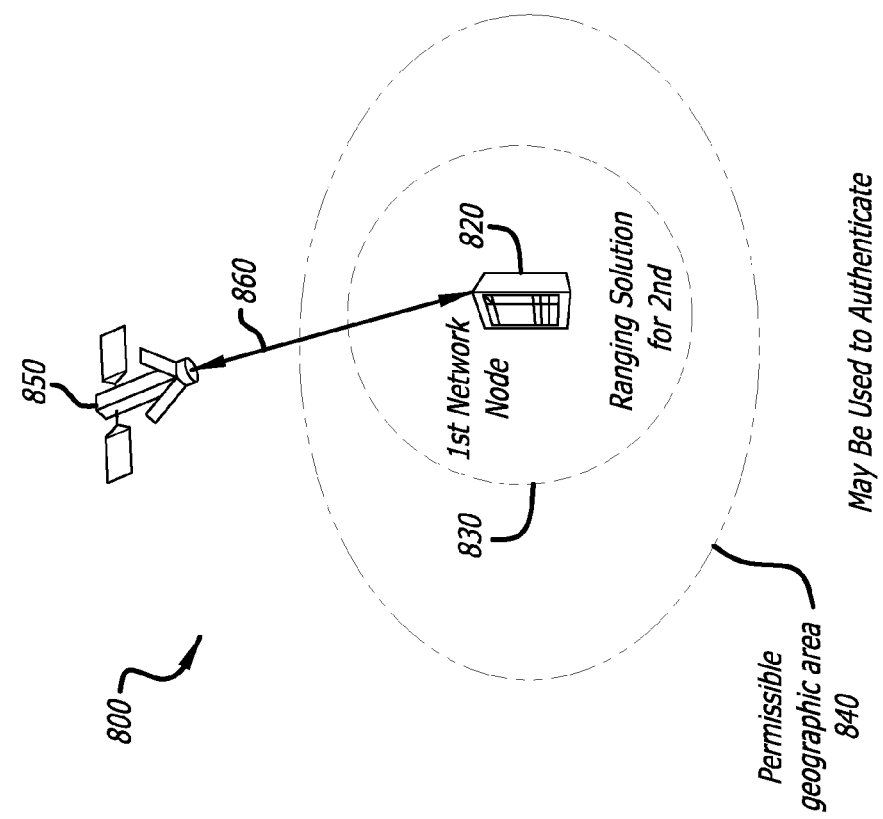
FIG. 8A is a schematic diagram of the disclosed system to improve data access control utilizing satellite and ranging geolocation techniques to authenticate the claimant where the claimant is shown to be authenticated, in accordance with at least one embodiment of the present disclosure.

FIG. 8A is a schematic diagram of the disclosed system 800 to improve data access control utilizing satellite and ranging geolocation techniques to authenticate the claimant where the claimant is shown to be authenticated, in accordance with at least one embodiment of the present disclosure. And, FIG. 8B is a schematic diagram of the disclosed system 810 to improve data access control utilizing satellite and ranging geolocation techniques to authenticate the claimant where the claimant is shown to not be authenticated, in accordance with at least one embodiment of the present disclosure. In these figures, a first network node 820 authenticates its location by using satellite geolocation techniques (e.g., by using at least one signal 860 transmitted from at least one satellite 850). Using ranging techniques (e.g., the first node and the second node sending pings (i.e. signals) to and from each other, and determining the distance between the first node and second node by the amount of time that has lapsed from the sending and the receiving of the pings from the first node and the second node), a second network node (e.g., a server or a router) is confirmed to be located somewhere within a defined circular area 830 (e.g., a two-dimensional circular area or elliptical area, or a three-dimensional spherical or elliptical volume, which may be specified by latitude, longitude, and elevation) that has the first network node 820 located at the absolute center of the area 830. If the entire area 830 is located within a permissible geographic area 840, then the second network node is automatically authenticated, as is shown in FIG. 8A. However, if any portion of the area 830 is located outside of the permissible geographic area 840, then the second node may be located outside of the permissible geographic area and, thus, the second node is not authenticated, as is shown in FIG. 8B.

It should be noted that in one or more embodiments, ranging techniques are used to authenticate the location of the claimant. For these embodiments, a first network node (e.g., a server, a router, or a device) (not shown) authenticates it location by sending pings (i.e. signals) to and from a second node (e.g., a server, a router, or a device) (not shown), which has a known location. The distance between the first node and the second node is determined by the amount of time that has lapsed from the sending and the receiving of the pings from the first node to the second node. Once the distance between the first node and the second node is determined, since the location of the second node is known, an estimation of the location of the first node can be obtained. It should be noted that this process may be repeated with other nodes (e.g., node 3, node 4, node 5, . . . ) that have known locations in order to obtain a more accurate estimation of the location of the first node. Once an estimation of the location of the first node is obtained, it can then be determined whether the first node is located within a permissible geographic area (not shown). If it is determined that the first node is located within a permissible geographic area, the claimant associated with the first node will be given access to the data.

Spot Beam Based Authentication

Entity or user authentication techniques enable a third party verifier to validate the identity and/or physical location of a user, asset, or a device (e.g., a user device) for a remote resource through a one-way authentication method. However, it should be noted that this one-way method may also be used directly by a host system to validate a claimant. An entity may be a device (e.g., a network node, a mobile phone, computer, server, or the like) or asset that needs to be tracked, while a user can be a person or other living/non-living entity. An entity and/or user may be authenticated for the duration of an entire connection or session. The entity and/or user may require re-authentication after the original authentication. The re-authentication requirements may be defined by the host network and may be context specific. Alternatively, this system may be used for a message-based authentication system which requires a separate authentication process for each message. Techniques described herein may be used for either session-based authentication, message-based authentication, or a combination thereof.

Additionally, this method may be applied to receiving devices themselves, such that the one-way authentication does not have to be completed by a remote third party but rather by one or more of the receiving devices. When this method is conducted by a single device it is still considered a one-way authentication method. However, this method can also be applied in a multi-way authentication technique to allow at least two peer devices to authenticate each other. In this one-way or multi-way device-to-device authentication method, authentication may generally rely on a shared secret (symmetric and asymmetric) that each of the two legitimate receiving devices know and any unauthorized or rogue receiving device does not know. Each device may have a unique authentication credential such as a secret password shared between itself and the peer device or public/private key pairs in the form of security certificates. A device has authenticated itself when it proves, to the satisfaction of the other peer device, that it knows the shared secret, and is, therefore, legitimate. Once authentication is complete between the at least two devices in this multi-way authentication method, the devices have proven their identities to one another. The devices may then create their own authenticated network which they may choose to implement cyber security policies which have been agreed on so as to protect the communication and access to networked resources for a given context.

Existing authentication methods may be used or combined to generate the initial-security key(s). The initial-security key may, for example, be cooperatively generated using Diffie-Hellman techniques or may simply be generated by one peer device and sent to the other via an alternate secure channel/process.

In any case, accompanying the initial-security key may include some shared liveness information (as previously defined). In this application, the liveness information is provided through a satellite spot beam and may include such parameters for use in authentication as a timestamp and pseudo-random number (PRN).

The use of the shared liveness information may be used in the derivation allowing for different security keys to be used every time the initiating device authenticates itself to the peer device. This hinders a potential rogue eavesdropper from initiating a statistical attack every time the initiating device is authenticated, adding newly intercepted messages to its analysis of messages intercepted during the initiating device's previous sessions. The liveness information and the initial-security key may then be passed as inputs to a determinative function. As used herein the term "determinative" refers to a function for which the outputs of the function are completely determined by the inputs. This determinative function may be run separately on the initiating device and on the peer device. If these two devices were to produce different outputs when they ran the determinative function, then the security keys derived from the function would not match, the device could not be authenticated, and thus could not be used for intercommunication.

In addition to being determinative, for security's sake the function should be inherently irreversible. Knowing the function's outputs, it should be very difficult or impossible to determine its inputs. Hashes form a class of functions that are both determinative and inherently irreversible and, as such, are often used in encryption and authentication calculations. Pseudo-random function (PRF) used with the well known Transport Level Security (TLS) protocol are an example of the determinative function implementation which may be used.

PRF combines the results of two well known hash functions, Message-Digest Algorithm 5 (MD5) and Secure Hash Algorithm 1 (SHA-1). PRF uses two hash functions in order to preserve security just in case someone determines how to reverse one of the two hash functions. These two hash functions produce outputs that may be too short to be optimum for security. SHA-1 produces 20-byte outputs, and MD5 produces 16-byte outputs. Therefore, for each of the two hash functions, a "data expansion function" may be defined that uses the hash function to produce output of arbitrary length. For SHA-1, the data expansion function may be defined as P_SHA-1:

$$P\_SHA\text{-}1(\text{initial-security key},\text{liveness}) = SHA\text{-}1(\text{initial-security key}, A(1)+\text{liveness}) + SHA\text{-}1(\text{initial-security key}, A(2)+\text{liveness}) + SHA\text{-}1(\text{initial-security key}, A(3)+\text{liveness}) + \ldots \quad \text{EQ 1:}$$

where A(0)=liveness;
A(i)=SHA-1(initial-security key, A(i−1));
and the "+" sign indicates string concatenation.

The definition of the data expansion function P_MD5 is similar to the above definition with "MD5" replacing "SHA-1" wherever it appears. The data expansion functions may be iterated to as many steps as necessary to produce output of a desired length. The desired output length may be set as an implementation option. In at least one embodiment, the desired output length for each hash function is 128 bytes. P_SHA-1 may be iterated out to A(7) for a total output length of 140 bytes (each iteration increasing the output length by 20 bytes). The output may then be truncated to 128 bytes. Each iteration of P_MD5 produces 16 bytes, so iterating it out to A(8) produces the desired 128 bytes with no truncation.

In one embodiment for spot beam based authentication, having chosen the hash functions and iterated their data expansion functions out to the desired output length, PRF takes as inputs the expanded initial-security key, a label (a pre-determined ASCII string), and the liveness information exchanged. PRF is defined to be the exclusive bit-wise OR (XOR) of the output of the two hash data expansion functions, P_MD5 and P_SHA-1:

$$PRF(\text{expanded initial-security key},\text{label},\text{liveness}) = P\_MD5(S1,\text{label}+\text{liveness}) \, XOR \, P\_SHA\text{-}1(S2,\text{label}+\text{liveness}) \quad \text{EQ: 2}$$

where S1 is the first half of the expanded initial-security key, measured in bytes, and S2 is the second half of the expanded initial-security key. (If the expanded initial-security key's length is odd, then its middle byte is both the last byte of S1 and the first byte of S2). As P_MD5 and P_SHA-1 are iterated to produce 128-byte outputs, the output of PRF is also 128 bytes.

The 128-byte output of PRF is divided into four 32-byte session security keys. Then each of the session security keys and truncates it to the length required by the authentication and encryption protocols being used. The truncated result is one of the new set of transient session security keys. The derivation of the transient session security keys allows for both the initiating device and peer device to not directly use either the initial-secret key or the expanded initial-security key in order to minimize, or at least to reduce, the leakage of the security key information. The derivation of the transient session security keys also allows for the initiating device and the peer device to refresh the session security keys derived from the expanded initial-security key at regular intervals or when commanded to prevent statistical analysis by limiting the use of the session security keys.

Each of the authentication and encryption transient session security keys have the following specific purpose: i) encryption of data exchanges, for confidentiality, from initiating device to peer device; ii) encryption of data exchanges, for confidentiality, from peer device to initiating device; iii) signing of data exchanges, for integrity, from initiating device to peer device; and iv) signing of data exchanges, for integrity, from peer device to initiating device.

Derivation of the initial-security key for the spot beam based authentication may use Diffie-Hellman techniques using agreed upon and well known public primitive root generator "g" and prime modulus "p". The initiating device and the peer device each choose a random secret integer and exchange their respective ((g^(secret integer)) mod p). This exchange allows the initiating device and peer device to derive the shared initial-secret key using Diffie-Hellman.

Having derived the initial-secret key that is shared between both the initiating device and the peer device they may use the data expansion to derive the expanded initial-secret using, for example, the P_SHA-1. The liveness information for the data expansion process may be a known random value or timestamp that is agreed upon by the initiating device and the peer device. In some embodiments, the peer device may select a random value and transmit it to the initiating device via the satellite or the terrestrial network. Alternatively, both the initiating device and the peer device may agree upon a timestamp, since they are tightly time synchronized, and thereby avoid data exchanges while being able to select liveness from the shared/common timestamp value.

Following this the initiating device and the peer device have a shared expanded initial-secret key that may be used to derive the new set of transient session security keys. Again for liveness the initiating device and the peer device may use either a shared random value that is transmitted by the peer device or a shared/common timestamp value. The transient session security keys may be used by initiating device and the peer device for further encryption and signing of geolocation and other context information exchanges between initiating device and peer device. Geolocation and other context information is considered confidential and hence it is appropriate that such information be encrypted to ensure that only the authenticated initiating device and peer device can extract the exchanged geolocation and context information. Note that the geolocation is authenticated by the procedure described in this patent application using pseudorandom (PRN) code segments and distinctive beam parameter. The context information shared may include other state or control information for targeted cyber defense application execution or decision support systems. In addition to encryption the integrity of the exchanged geolocation and context information is ensured by the use of the transient session security keys for signing purposes as discussed earlier.

In brief overview, in some embodiments the authentication systems and methods described herein may leverage geolocation techniques for determining the position of the claimant as part of the authentication process. One such geolocation technique is defined in commonly assigned and copending U.S. patent application Ser. No. 12/756,961, entitled Geolocation Leveraging Spot Beam Overlap, the disclosure of which in incorporated herein by reference in its entirety. When authentication is required, the claimant device may capture and transmit the distinctive signature parameters to a verifying device. In addition, the claimant device may transmit its claimed travel path (i.e., waypoint(s) and time at each). Waypoints may be transmitted whether the device is stationary or mobile. A verification device may use the claimant's claimed beam signature parameters, at least one location waypoint, and at least one time associated with this waypoint and beam parameter capture to authenticate the claimant. For example, a claimant may be considered authenticated by the verifier if the beam parameters captured from the at least one spot beam and the at least one claimed waypoint are affirmed against a known valid data set. In this manner, the claimant can be authenticated as being within a region at a particular time. The composite code based on these parameters provide a signal that is extremely difficult to emulate, hack, or spoof. Furthermore, the signal structure and satellite's received signal power allows for the authentication to be used indoors or other attenuated environment. This improves the overall utility of this system approach.

The subject matter of this application is described primarily in the context of low-earth orbiting (LEO) satellites such as those implemented by Iridium satellites. However, one skilled in the art will recognize that the techniques described here are readily applicable to other satellite systems, e.g., medium-earth orbit (MEO) satellite systems or geosynchronous orbit (GEO) satellite systems. Such satellite based communication systems may include or utilize other mobile communication systems, e.g., airborne communication systems or the like, as well as, stationary communication platforms including but not limited to a ship or a cell phone tower.

Figure 9:
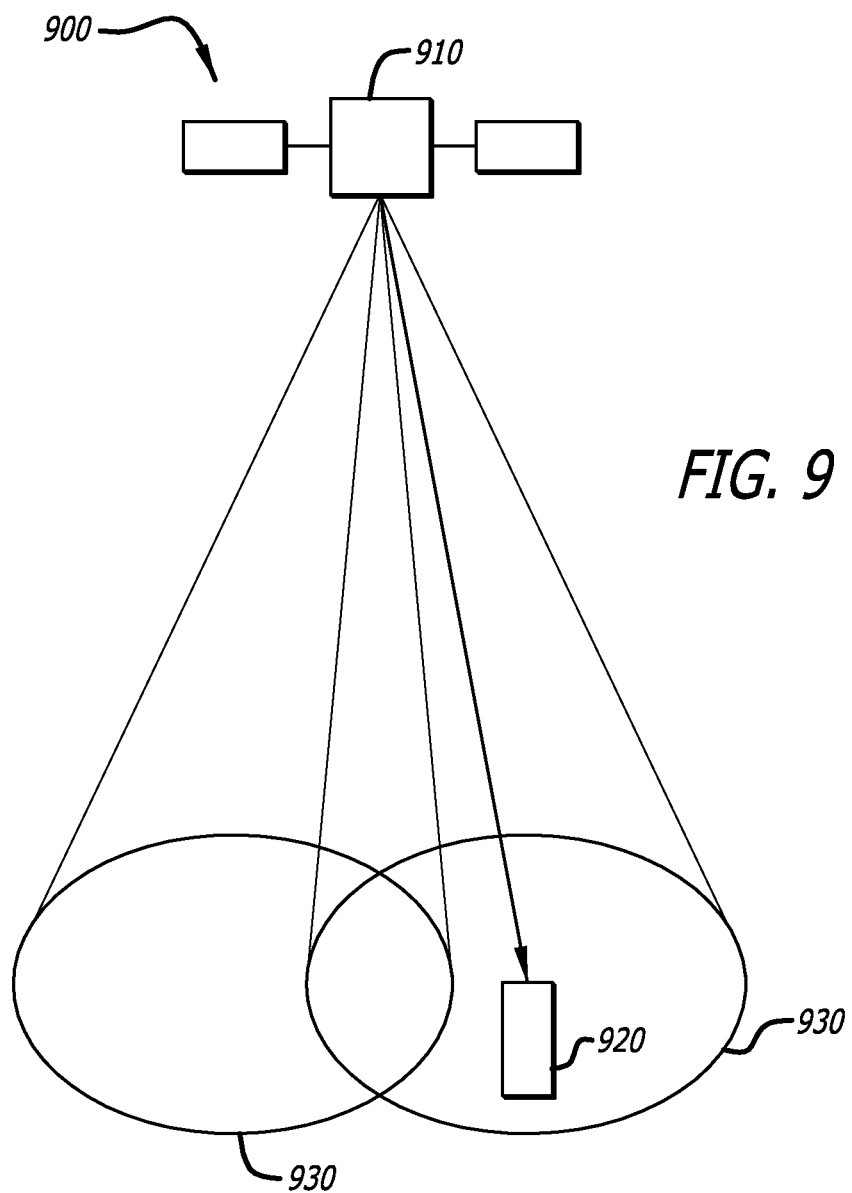
FIGS. 9 through 12 are directed towards the disclosed system and method for spot beam based authentication of the user device.

FIG. 9 is a schematic illustration of a satellite-based communication system 900, according to embodiments. In practice, a satellite based communication system 900 may comprise of at least one satellite 910 in orbit. In the interest of brevity, a single satellite is illustrated in FIG. 9. Referring to FIG. 9, in some embodiments a system 900 comprises one or more satellites 910 in communication with one or more receiving devices 920. In some embodiments the satellites 910 may be embodied as LEO satellites such as those within the Iridium satellite constellation. Satellite(s) 910 orbit the earth in a known orbit and may transmit one or more spot beams 930 onto the surface of the earth in a known pattern. Each spot beam 930 may include information such as pseudorandom (PRN) data and one or more distinctive beam parameters (e.g., time, satellite ID, time bias, satellite orbit data, etc.).

Receiving device(s) 920 may be implemented as communication devices such as satellite or cellular phones or as components of a communication or computing device, e.g., a personal computer, laptop computer, personal digital assistant or the like. In some embodiments, a receiving device (920) may comprise one or more locating or navigation devices or modules analogous to devices used in connection with the global positioning system (GPS).

FIGS. 10A, 10B, and 10C are schematic illustrations of satellite-based authentication systems 1000, according to embodiments. Referring first to FIG. 10A, in some embodiments a satellite 910 in orbit transmits one or more spot beams 930 onto the earth's surface. A receiving device 920 may be configured to receive a signal from the spot beam. In the embodiment depicted in FIG. 10A the receiving device is ground-based and may be operating in attenuated environment. By way of example, an object 1010 such as a roof, building, or the like may obstruct a portion of the communication path between satellite 610 and the receiving device.

A transmitter 1020 transmits data received by the receiving device 920 and/or data generated by the receiving device 920 to a verifier 1030. The transmitter 1020 depicted in FIG. 10A is a wireless transmitter that relays the data from the receiving device to the verifier. However, one skilled in the art will recognize that data from receiving device 920 may be transmitted via a wired communication system, wireless communication system, or a combination of wired and wireless systems. The verifier 1030 uses data captured via a spot beam by the receiving device 920 to prove to the verifier 1030 that it is an authorized user via a one-way authentication approach which is also the case in FIG. 10B.

Furthermore, FIG. 10B depicts an arrangement in which the receiving device 920 may be airborne, e.g., in an aircraft 925. In the embodiment depicted in FIG. 10B the aircraft 925 may maintain an uplink with the satellite 910, e.g., an L-Band Uplink, and data captured by the receiving device 920 in the aircraft may be transmitted back to the satellite 910 via the uplink. The satellite 910 may transmit the data to a second cross-linked satellite 910, which in turn may transmit the data to a verifier 1030.

The system depicted in FIG. 10C illustrates an embodiment in which two (or more) peer devices 920 may implement a two-way authentication technique to authentication each other. Referring briefly to FIG. 10C as described above a satellite 910 in orbit transmits one or more spot beams 930 onto the earth's surface. A first receiving device 920A may be configured to receive a signal from the spot beam. The first receiving device 920A may be configured to derive a security key, e.g., using a Diffie-Helman approach as described above, which incorporates PRN data from the spot beam.

The PRN data is also transmitted to a second device 920B. In some embodiments the second device 920B may be outside the spot beam 930, in which case the PRN data may be transmitted by a computing device 1040 coupled to the second device 920B via a communication network. The computing device 1040 may be communicatively coupled to the satellite 910. By way of example, and not limitation, the computing device 1040 may be a server that is separately coupled to the satellite 910 via a communication link. The computer 1040 may be associated with a control network for satellite 910 and may thereby possess PRN data associated with the spot beam 930.

In operation, the first receiving device 920A initiates a request for authentication data, which is transmitted to the second receiving device 920B. The communication link between the first receiving device 920B may be direct or may be implemented through a transmit network 1020. The second receiving device 920B responds to the request and issues a near-simultaneous request for authentication data from the first receiving device 920A. The first receiving device 920A authenticates the second receiving device 920B and issues a near-simultaneous response to for authentication data to the second receiving device 920B, which may then authenticate the first receiving device 920A.

As described above, the authentication process implemented between the first receiving device 920A and the second receiving device 920B may be a Diffie-Hellman exchange in which the shared secret comprises at least a portion of the PRN data transmitted by the spot beam 930.

Thus, the system depicted in FIG. 10C enables peer-to-peer authentication of receiving device 920A, 920B. One skilled in the art will recognize that this two-way authentication approach could be extended to a receiving device and a server as well as other hardware architectures, or to more than two devices.

FIG. 11A is a schematic illustration of a computing system which may be adapted to implement a satellite based authentication system, according to embodiments. For example, in the embodiments depicted in FIGS. 10A and 10B the verifier 1030 may be implemented by a computing system as depicted in FIG. 11A. Referring to FIG. 11A, in one embodiment, system 1100 may include a computing device 1108 and one or more accompanying input/output devices including a display 1102 having a screen 1104, one or more speakers 1106, a keyboard 1110, one or more other I/O device(s) 1112, and a mouse 1114. The other I/O device(s) 1112 may include a touch screen, a voice-activated input device, a track ball, and any other device that allows the system 1100 to receive input from a user.

The computing device 1108 includes system hardware 1120 and memory 1130, which may be implemented as random access memory and/or read-only memory. A file store 1180 may be communicatively coupled to computing device 1108. File store 1180 may be internal to computing device 1108 such as, e.g., one or more hard drives, CD-ROM drives, DVD-ROM drives, or other types of storage devices. File store 1180 may also be external to computer 1108 such as, e.g., one or more external hard drives, network attached storage, or a separate storage network.

System hardware 1120 may include one or more processors 1122, at least two graphics processors 1124, network interfaces 1126, and bus structures 1128. In one embodiment, processor 1122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 1124 may function as adjunct processors that manage graphics and/or video operations. Graphics processors 1124 may be integrated onto the motherboard of computing system 1100 or may be coupled via an expansion slot on the motherboard.

In one embodiment, network interface 1126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 1128 connect various components of system hardware 1120. In one embodiment, bus structures 1128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 1130 may include an operating system 1140 for managing operations of computing device 1108. In one embodiment, operating system 1140 includes a hardware interface module 1154 that provides an interface to system hardware 1120. In addition, operating system 1140 may include a file system 1150 that manages files used in the operation of computing device 1108 and a process control subsystem 1152 that manages processes executing on computing device 1108.

Operating system 1140 may include (or manage) one or more communication interfaces that may operate in conjunction with system hardware 1120 to transceive data packets and/or data streams from a remote source. Operating system 1140 may further include a system call interface module 1142 that provides an interface between the operating system 1140 and one or more application modules resident in memory 1130. Operating system 1140 may be embodied as a UNIX operating system or any derivative thereof (e.g., Linux, Solaris, Berkeley Software Distribution (BSD), Android, etc.) or as a Windows® brand operating system, or other operating systems.

In various embodiments, the computing device 1108 may be embodied as a personal computer, a laptop computer, a personal digital assistant, a mobile telephone, an entertainment device, or another computing device.

In one embodiment, memory 1130 includes an authentication module 1162 to authenticate a claimant based on data received from the claimant. In one embodiment, an authentication module 1162 may include logic instructions encoded in a non-transitory computer-readable medium which, when executed by processor 1122, cause the processor 1122 to authenticate a claimant based on data received from the claimant. In addition, memory 1130 may comprise a satellite orbit database 1164 which includes orbit information for satellites 910 in a predetermined orbit around the earth. Additional details about the authentication process and operations implemented by authentication module 1162 are described below.

In some embodiments the receiving device 920 may be implemented as a satellite communication module adapted to couple with a conventional computing device 922 (e.g., a laptop, a PDA, or a smartphone device). The receiving device 920 may be coupled to the computing device 922 by a suitable communication connection, e.g., by a Universal Serial Bus (USB) interface, an RS-232 interface, an optical interface, or the like. In the embodiment depicted in FIG. 11B the receiving device 920 may be a "thin" device in the sense that it may include a receiver and limited processing capability, e.g., an application specific integrated circuit (ASIC) or a field programmable gate array (FPGA) configured to implement an authentication routine.

In operation, a user of the computing device 922 may utilize the receiving device 920 to authenticate the computing device 922 with a host network 1190. As described above, the receiving device 920 depicted in FIG. 11B may receive a spot beam transmission 930 from the satellite 910 which includes a distinctive beam signature and a pseudo-random number (PRN). The computing device 922 may initiate an access request to the host network 1190. The access request may include user specific information, e.g., a user ID, one or more coordinated from an earth-based coordinate system (e.g., a zip code, an area code, a latitude/longitude, a Universal Transverse Mercator (UTM); an Earth-Centered Earth-Fixed (ECEF), a World Geographic Reference System (GEOREF), or other miscellaneous system, for example, a zip code) and at least a portion of the PRN data received from the satellite 910.

The host network 1190 may transmit a user access request to the verifier 1030 as an authentication request. In some embodiments the host network may add additional information to the request en enable the verifier 1030 to authenticate the computer 922. By way of example, the host network 1190 may provide limitations regarding where (i.e., from what geographic locations) the claimant may be authenticated). The verifier 1030 may verify the claimant and provide an authentication response to the host network 1190. The host network 1190, in turn, may forward an access response to the computing device 922.

FIG. 12 is a flowchart illustrating operations in a method to authenticate a claimant, according to embodiments. Referring to FIG. 12, at operation 1210 a claimant device determines a physical location of the claimant device. In some embodiments a claimant device 920 may comprise one or more location modules to determine a location of the claimant device 920. By way of example and not limitation, claimant device 920 may include, or be communicatively coupled to, a global positioning system (GPS) module to determine a location based on signals from the global positioning system. Alternatively, or in addition, claimant device 920 may include logic to determine a location based on signals from one or more LEO or MEO satellites 610 as described in one or more of U.S. Pat. Nos. 7,489,926, 7,372,400, 7,579,987, and 7,468,696, the disclosures of which are incorporated herein by reference in their respective entireties. In some embodiments the location of the claimant device 920 may be expressed in latitude/longitude coordinates or another earth-based coordinate system.

At operation 1215 the claimant device 920 receives a spot beam transmission from a satellite 910. In some embodiments the claimant device 920 extracts one or more distinctive beam parameters (e.g., time, satellite ID, beam ID, time bias, satellite orbit data, etc.) including a pseudo random code segment from the satellite spot beam. In some embodiments the claimant device 920 may store the beam parameters in a memory module in, or communicatively coupled to, the claimant device 920. In one or more embodiments operation 1215 may occur near simultaneously to its preceding operation 1210.

At operation 1220 the claimant device 920 may continue to generate one or more waypoint data snapshots which may include the location information for the claimant device 920 from operation 1210, and one or more of the distinctive beam parameters transmitted via the satellite spot beam as noted in operation 1220. In some embodiments the waypoint data snapshots may be stored in a memory module in, or communicatively coupled to, the claimant device 920.

In some embodiments the claimant device 920 may collect an array of waypoint data snapshots over time. For example, an array of waypoint data snapshots may be constructed by receiving spot beams from a plurality of satellites 910 passing over the claimant device 920 over time. Alternatively, or in addition, an array of waypoint data snapshots may be constructed by moving the claimant device 920 in relation to the satellites 910, for example, by placing the claimant device 920 in an aircraft 925 as depicted in FIG. 10B. An additional example would include a claimant device which acts as a tracker to validate the traveled route of an entity or asset which may include dangerous materials. The claimant device may be polled to provide waypoint data to verify the expected path matches that of the actual. The claimant device may be polled randomly.

At operation 1220 the waypoint data snapshot(s) are transferred from the claimant device 920 to a verifier device 1030. By way of example, in the embodiment depicted in FIG. 10A the waypoint data snapshot(s) may be transmitted via a transmitter 1020 or by another communication network. In the embodiment depicted in FIG. 10B the waypoint data snapshot(s) may be transmitted from the aircraft 925 to a satellite 910, then may be transmitted via a satellite network to a verifier device 1030.

At operation 1225 the verifier device 1030 receives location data and waypoint data from the claimant device 920. At operation 1230 the verifier device 1030 compares the location information and the waypoint data to corresponding data in a known valid data set in order to authenticate the claimant. By way of example, a LEO satellite such as the Iridium satellite constellation circumnavigates the earth in a known orbit, the approximate parameters of which are available well in advance. A verifier device 1030 may include a satellite orbit database 1164, or be communicatively coupled to a satellite orbit database 1164, which includes orbit information about satellites 910 in a known orbit about the earth.

In some embodiments the location data and waypoint data received from the claimant device is compared (operation 1230) with location and waypoint data from the known data set to determine whether the claimant device 920 is, in fact, within a reasonable threshold distance of an expected geographic location at an expected time. By way of example and not limitation, the satellite orbit database 1164 may be searched for a data record corresponding to the distinctive beam parameters transmitted from the claimant device 920. When a matching record is located, the orbit data from the record retrieved from the orbit database 1164 may be compared to the data received from the claimant device 920. For example, the known data may comprise a coordinate for the center of the spot beam 930 and an indication of the radius of the spot beam 930 on the surface of the earth. The coordinates received from the claimant device 920 may be compared to the location of the spot beam to determine whether the received data indicates that the claimant device 920 is within the region circumscribed by the spot beam at the time indicated in the data received from the claimant device. In at least one embodiment, the spot beam may be irregular shaped. In at least one embodiment the claimant device may be at an altitude above the surface of the earth.

If, at operation 1235, the data received from the claimant device 920 indicates that the claimant device 920 is within a geographic region encompassed by the spot beam from the satellite 910 at the time associated with the data from the claimant device, then the claimant device 920 may be considered authenticated. In an authentication system, control then passes to operation 1240 and the claimant is allowed to access a resource. By way of example and not limitation, the verifier device 1030 may grant a token to an authenticated claimant device 920. The token may be used by a remote system to grant access to a resource.

By contrast, if the data received from the claimant device 920 indicates that the claimant device 920 is not within a geographic region encompassed by the spot beam from the satellite 910 at the time associated with the data from the claimant device 920, then the claimant device 920 may not be considered authenticated. In an authentication system, control then passes to operation 1245 and the claimant is denied access to a resource. By way of example and not limitation, the verifier device 1030 may deny a token to an authenticated claimant device 920. In the absence of a token the claimant device may be denied access to a resource managed by a remote system.

Figure 10B:
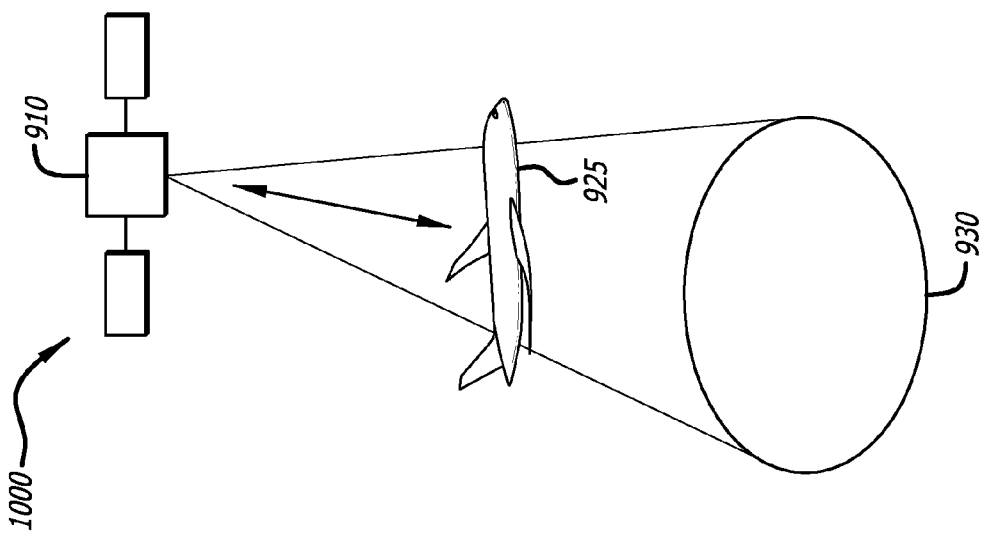

Thus, the system architecture depicted in FIGS. 9-11 and the method depicted in FIG. 12 enable satellite-based authentication of one or more claimant device(s) 920. The authentication system may be used to allow or deny access to one or more resources managed by a remote computing system. In some embodiments the claimant device(s) may be stationary, while in other embodiments the claimant device(s) may be mobile, and the authentication process may be either time-based, location-based, or a combination of both.

In some embodiments the system may be used to implement session-based authentication in which the claimant device(s) 920 are authenticated to use a resource for an entire session. In other embodiments the system may implement message-based authentication in which the claimant device(s) 920 must be authenticated separately for each message transmitted from the claimant device(s) 920 to a remote resource.

In one example implementation, an authentication system as described herein may be used to provide authentication for access to a secure computing resource such as a corporate email system, a corporate network, a military or civil infrastructure network, or an electronic banking facility. In other example implementations, an authentication system may be used to confirm the itinerary of a vehicle in a logistics system. By way of example, a mobile entity such as a truck, train, watercraft or aircraft may comprise one or more claimant device(s) 920. During the course of a scheduled mission a logistics system may periodically poll the claimant device(s) 920, which may respond with authentication data obtained from the satellite 910. The authentication data may be collected in the logistics system and used to confirm that the claimant device(s) are in specific locations at predetermined times in accordance with a logistics plan.

In yet another example, implementation of an authentication system as described herein may be used to verify the location of a claimant device(s) associated with a monitoring system, e.g., a house arrest surveillance system. In such embodiments the claimant device(s) may incorporate one or more biometric sensors such as a fingerprint biometric sensor to authenticate the user of the system, while the authentication system may be used to confirm that the claimant device is in a predetermined location at a predetermined time (i.e., the claimant is in the right place, at the right time, and is the right person). The authentication device may also review the claimant device location against a defined list of approved locations which may also further be refined by the authentication system by reviewing the claimant device's location and time against an approved set of location(s) at an approved time period(s). Furthermore, this system may be used to track registered sex offenders.

In some embodiments the satellite 910 may be part of a LEO satellite system such as the Iridium constellation which orbits the earth in a known orbit and which transmits spot beams having a known geometry, such that a claimant device(s) may be authenticated by confirming that the claimant device is within a designated spot beam at a designated time. Thus, a claimant may be authenticated using a single signal source (e.g., a single satellite 910). Also because LEO satellites such as the Iridium constellation and MEO satellites transmit a relatively high power signal levels the system may be used to authenticate one or more claimant device(s) which are located in an obstructed environment, e.g., indoors or in urban locations. Also, the relatively high signal strength of LEO satellites and MEO satellites leaves these signals less susceptible to jamming efforts.

Guard Spot Beam Based Authentication

Guard Spot Beam Based Authentication relates to a method, system, and apparatus to authenticate a claimant (e.g., a user or a user device) and to use guard spot beams to deter satellite-based authentication system spoofing. In one or more embodiments, Guard Spot Beam Based Authentication utilizes a method for a transmission-based authentication system to prevent an unauthorized claimant from tracking a signal.

FIG. 13 illustrates an embodiment of a transmission-based authentication system 1300 employing a satellite 1310 that transmits overlapping spot beams 1340 comprising an authentication beam 1320, which may also be referred to as "beam zero," along with one or more guard beams 1330. An unauthorized claimant 1350 attempts to spoof the authentication system 1300 in order to achieve access to a secure network by simulating the location of a legitimate, authorized claimant 1360. In one or more embodiments, a claimant may be a user or an entity that may be stationary or mobile. In one embodiment, the entity may be a device (e.g., a cell phone, personal device, computer, server, etc.) or system, and a user may be a person or other living or non-living thing.

Each location within the guard beams 1330 and beam zero 1320 receives unique authentication signals from each beam 1340. The locations within the regions where the beams 1340 overlap receive composite authentication signals. The unauthorized claimant 1350 is not located at the authorized claimant's 1360 location and, thus, the unauthorized claimant 1350 will not receive the particular authentication signal 1320 that is necessary for access to the secure network. Unless a claimant is at a legitimate location that is verifiable by the satellite authentication signals, access to the secure network will be denied.

FIG. 14 illustrates an embodiment of a transmission-based authentication system 1400 used with an indoor environment. In one or more embodiments, types of tracking/monitoring systems where the transmission-based authentication system 1400 may be employed include, but are not limited to, radio-frequency identification (RFID) systems; smart cards, such as those used for employee security; online banking or other fund/credit monitoring; prisoner tracking; and tracking of sexual offenders under Megan's Law.

As shown in FIG. 14, an authorized claimant 1410, who is in an indoor/attenuated environment, gains access to a secure network when an authenticator device 1430 verifies that the authorized claimant 1410 is located at a legitimate location by using a satellite signal that is unique in both time and location. An unauthorized claimant 1420, who attempts to spoof the authentication system 1400 by falsely claiming that they are at a legitimate location, is denied access to the network because they cannot provide the correct, unique signal data. The unique signal is a resultant composite signal that is received at a specific location from multiple overlapping beams transmitted by the satellite 1450. These overlapping beams cover a region containing an authorized claimant 1410. In this figure, the authorized claimant 1410 is shown to be indoors where GPS and other location determination signals cannot reach, and the unauthorized claimant 1420 is shown to be outside and attempting to spoof the authenticator device 1430.

Still referring to FIG. 14, the authorized claimant 1410 requests secure network access from the secure network authenticator device 1430 through ground-based communication systems 1440. This request includes data from the unique time and location signal that the authorized claimant 1410 receives from the satellite 1450. If the signal data matches the authorized claimant's 1410 location, the authenticator device 1430 will grant the claimant 1410 access to the secure network. As such, the authorized claimant 1410, shown in a region illuminated by beam zero, is granted secure network access, while the unauthorized claimant 1420, shown in a region illuminated by beam zero and by a guard beam that corrupts the beam zero authorization signal, is denied access.

FIGS. 15A through 15F depict an embodiment where the signal received by one or more claimants from multiple overlapping spot beams is used to authenticate the location and identity of one or more claimants. The basic concept is that depending upon where the claimants are located within the overlapping spot beam pattern, each claimant will receive a different composite signal from the combination of signals transmitted from the multiple spot beams. In particular, FIG. 15A shows the disclosed transmission-based authentication system having an exemplary situation of four claimants (i.e., A, B, C, and D) being located at various positions within and near three overlapping spot beams (i.e., Beam 1, Beam 2, and Beam 3). As such, this figure illustrates the overlapping spot beams illuminating the locations of claimants A, B, and C. The location of claimant D is shown to be just outside the beam pattern.

FIG. 15B illustrates a graph 1500 showing exemplary signals (1, 2, and 3) that are transmitted by the three spot beams of FIG. 15A. In particular, this figure shows an exemplary set of signals that are transmitted by each spot beam (Beam 1, Beam 2, and Beam 3), and are used to authenticate claimants. The three curves (indicated by 1, 2, and 3 on graph 1500) show the bit sequence over time for the transmitted signals from each spot beam. These three bit sequences are only used to demonstrate the concept. As such, many other types of signals and forms of modulation may also be employed. The signal pattern may also be changed periodically to provide additional protection from unauthorized claimants and to provide a unique time for when a mobile claimant is at a particular location. In addition, these signals that are used to authenticate a claimant may be sent separate from a normal signal for brief periods during normal transmission or, alternatively, may be embedded within the normal signal.

FIG. 15C shows an array 1510 of the signal strengths of the three spot beams (Beam 1, Beam 2, and Beam 3) at the locations of the four claimants (A, B, C, and D) of FIG. 15A. In particular, the signal beam received (sbr) array 1510 shows the signal strength received by each claimant (A, B, C, and D) in the array 1510 columns from the signal beam received (Beam 1, Beam 2, and Beam 3) in the rows of the array 1510. For example, a claimant at location B receives most of the signal from Beam 2, which has a signal strength of 11, compared to signal strengths 2 and 1.5 from Beams 1 and 3, respectively. The characteristics and/or properties of a claimant's received signal is the signature that is used to validate the claimant's location.

FIG. 15D depicts an array 1520 of bits for the three spot beams (Beam 1, Beam 2, and Beam 3) of FIG. 15A. In this figure, the bits array 1520 shows the signal sequence transmitted by each beam (Beam 1, Beam 2, and Beam 3) in the three array rows, as a function of time, which is represented by the sixteen (16) columns of the array 1520. Here, to illustrate the concept, the transmitted signals are binary. However, in alternate embodiments, other signal patterns may be employed.

FIG. 15E illustrates an array 1530 of the resultant signal sequences that are received by the four claimants (A, B, C, and D) of FIG. 3A. This figure shows the resultant sequence of composite signals received by the claimants at locations A, B, C and D from the multiple overlapping beams. The resultant signal $(rx)=g\times(sbr^T)\times(bits)$, where g equals the gain of each claimant receiver. In this example, gain (g) is chosen to be equal to 0.7 (i.e. g=0.7). The sixteen (16) rows of the received array $(rx^T)$ 330 represent time steps, and the four (4) columns correspond to the different locations (A, B, C and D) of the claimants. It should be noted that, in this example, the claimant at location D receives no signal since this location is outside of the beam pattern.

FIG. 15F shows a graph 1540 depicting the resultant signals that are received by the four claimants (A, B, C, and D) of FIG. 15A. The four curves (indicated by A, B, C, and D) show the time sequence of the resultant signals that are received by claimants at locations A, B, C and D. The four resultant composite signals provide unique claimant location identification for the four claimants (A, B, C, and D), respectively.

FIG. 16 illustrates an embodiment of the transmission-based authentication system 1600 using guard beam transmission as part of a secondary mission. In this embodiment, at least one guard beam is used to transmit legitimate data as part of a secondary mission for the satellite 1610. For example, a guard beam could be used to broadcast regional information, such as differential GPS network corrections that are valid in the guard beam footprint. However, it should be noted that for higher security this is not the preferred embodiment because the regional information is more likely to be able to be determined by a spoofer than a more random signal. As another example, the guard beam could be used to transmit data that is relevant to the primary mission (i.e. the authentication signal) and/or relevant to a secondary mission.

As shown in FIG. 16, the authentication signals may be transmitted in bursts. The authentication signals may be randomly sent in bursts, in beam zero or in alternating beams (including beam zero and guard beams), so that the timing of the authentication signals indicates the location of the claimant. As such, if a claimant receives multiple bursts, then the claimant is located within beam zero or within a beam overlapping region.

In alternative embodiments, the authentication signals may be embedded in the normal data transmission in order to minimize their impact on satellite transmission power and/or bandwidth. The authentication signals may be embedded in the data transmission by various ways (e.g., time, frequency, polarization shifts, etc.) that do not impact normal reception, but are detectable by special processing.

In one or more embodiments, the authentication signals may be embedded in normal data transmission by varying broadcast power on a bit-by-bit basis. For these embodiments, the guard beam bit modulation changes the broadcast power of the transmitted bits on a bit-by-bit basis. This prevents a spoofer from attempting to observe the bits in their local guard beam, and processing the data to remove them.

For example, a spoofer makes a series of measurements (m):

95 105 105 −105 105 −105 95 −105 −95 −95

The spoofer might guess that the guard signal (g) was sign(m):

1 1 1 −1 1 −1 1 −1 −1 −1

And, the signal the spoofer is trying to access is sign(m−sign(m)*100):

−1 1 1 −1 1 −1 −1 −1 1 1

If instead of a fixed power signal, the guard beam broadcast power was modulated such that its component of the received signal was:

107 97 91 −93 99 −91 93 −107 −107 −101

Then, the signal the spoofer would receive would be:

102 102 96 −98 104 −96 88 −112 −102 −96

It would be much more difficult for the spoofer to try to figure out the authentication signal from that set of measurements.

In addition, it should be noted that an extension of that same idea would be to add a small random quadrature phase shift keying (QPSK) signal onto the guard band signal. For this case, the guard signal could still be used to transmit useful information.

FIG. 17 shows the transmission-based authentication system 1700 employing out-of-phase binary phase shift keying (BPSK) guard beam transmission. Specifically, in this figure, the guard beams transmit the authentication signal using out-of-phase BPSK signals between adjacent overlapping beams. The signal in the overlap region will then be a QPSK signal. The unique location of a claimant within a beam can then be determined by analyzing the signal phasing and signal type that the claimant receives.

In general, the authentication operations may include mobile claimants and/or stationary claimants (i.e. claimants at fixed locations) which utilize unique time and location signals provided by the guard beams to acquire access to a secure network. FIG. 18 illustrates an embodiment of a transmission-based authentication system 1800 having a mobile, air-based claimant 1805. For these embodiments, one or more satellites may be used to transmit time-varying authentication signals from overlapping beams that cover both fixed and mobile ground, sea, and air claimants. In some embodiments, the system will periodically change the guard beam authentication signals in an effort to further minimize the potential for spoofing. The guard beams, ideally, would be continuously changed randomly and/or changed in some other random way to suit a secondary mission, such as a mission for performing local GPS corrections.

As shown in FIG. 18, a satellite 1850 may transmit a beam zero authentication signal 1810 as well as guard beams 1845. The mobile, air-based claimant 1805, which is depicted as an aircraft, requests secure network access by sending authentication data, which may be obtained from time and spatially varying overlapping guard beams, though a satellite communication up-link 1815. The satellite 1850 transmits the authentication request via a cross-link 1820 to another satellite 1855. The satellite 1855 may then transmit the request via a down-link 1825 to a satellite communication terminal 1830. The satellite communication terminal 1830 passes the request through a land-based communication system 1835 to a ground-based authenticator device 1840. If the mobile claimant 1805 is at a legitimate location at the appropriate time, the claimant 1805 may be granted secure network access. In this embodiment, the secure network link 1815 to the aircraft 1805 is shown via a satellite 1850, but in other embodiments alternate mobile secure links may be employed. In some embodiments, the secure network accesses may be granted to claimants for only limited amounts of time before the claimants are required to be recertified. These embodiments pertain especially to mobile claimants.

In alternative embodiments, a secondary signal source may be used to provide additional shielding transmissions. For example, a second satellite could broadcast guard beams for the outside beams of a first satellite.

FIG. 19 illustrates an embodiment of a transmission-based authentication system 1900 employing a cyber locate portal 1910 in conjunction with an authentication server 1920. In this figure, an authorized user wishes to log into the secure protected network 1930 via the user's laptop computer 1940.

The user, depending upon the user's location, will receive a unique authentication signal that is being transmitted by the satellite 1950.

The laptop computer 1940 will access the internet via the cyber locate portal 1910 device. In order to do this, the laptop computer 1940 may optionally netboot via the cyber locate portal 1910 device. After the laptop computer 1940 has performed the netboot, the laptop computer 1940 will be operating on the cyber locate portal 1910 device's operating system (OS). By operating on the cyber locate portal 1910 device's operating system, the laptop computer 1940 is utilizing a more secure operating system because the cyber locate portal 1910 device's operating system has much smaller chance of having a virus than the laptop computer's 1940 operating system. This is because the laptop computer 1940 is frequently used by the claimant to access the internet and open email attachments and, thus, is generally more vulnerable to cyber and/or network attacks.

The laptop computer 1940 will then send the unique authentication signal information across secure internet links 1960 through the cyber locate portal 1910 to the authentication server 1920.

Once the authentication server 1920 receives the unique authentication signal information, the authentication server 1920 will process the information in order to verify if the user is authorized. After the authentication server 1920 verifies that the user is authorized, the authentication server 1920 will send an authorization message to the secure protected network 1940 across secure internet links 1960. Once the secure protected network 1940 receives the authorization message, the secure protected network 1940 will allow the user to access it. In one or more embodiments, the secure protected network is 1930 connected to the internet via a virtual private network (VPN) server 1970.

The methods and apparatus herein provide an operative system for guard spot beams. Specifically, this system relates to guard spot beams to deter satellite-based authentication system spoofing. The systems and methods teach a transmission-based authentication system that may used to prevent an unauthorized claimant from tracking a signal that is intended for a legitimate, authorized claimant. A claimant may be an entity or a user that is either mobile or stationary. In one or more embodiments, the systems and methods employ a plurality of "guard beams" to prevent the tracking of a signal in a single spot beam "beam zero" by an unauthorized claimant. In at least one embodiment, the guard beams send legitimate transmissions to authorized claimants. These transmissions may contain localized information or regional information. In other embodiments, the guard beams may transmit false data that may be used to detect and locate unauthorized claimants and compromised systems.

In particular, the systems and methods teach a transmission based authentication system that may be capable of using at least two transmitted spot beams to authenticate a claimant. The data transmitted in the spot beams may include an authentication key and/or other pseudo-random code segment that may be used to distinguish data in one of the beams from data in the other beams. The systems and methods may use other distinguishing beam characteristics and/or data characteristics to distinguish the data between the beams. In addition, the systems and methods may be employed in an indoor environment. The systems and methods may additionally employ the use of biometrics to authenticate an authorized claimant in order to improve the overall security of the system.

In one or more embodiments, the systems and methods may be utilized for various types of network security and/or cyber security applications. In some embodiments, the systems and methods relate to network security for networks including, but not limited to, self-forming, peer-to-peer, and/or ad hoc networks. In addition, the systems and methods may be used to restrict access to a networked system.

The authentication system includes at least three aspects. One aspect of the authentication system is that it restricts unauthorized claimants from accessing a secure network or resource. One way unauthorized claimants attempt to gain access to a secure network or resource is through spoofing an authenticator device into identifying them as an authorized claimant. With the addition of at least one "guard beam", which provides at least one additional signal that the unauthorized claimant will to have to decode, the unauthorized claimant's ability to access the primary signal may be much more difficult. This is because it may be more difficult for the unauthorized claimant to extract a signal from a mixed signal than to extract a signal from only noise. Thus, each additional guard beam added around the perimeter of beam zero increases the difficulty in spoofing.

In one or more embodiments, the guard beams may be transmitted at a higher power than beam zero is transmitted. This will cause the signals from the guard beams to shield the beam zero authentication signal by making it difficult for an unauthorized claimant to decode the primary signal in beam zero. This in effect is essentially jamming (i.e., the phenomena that occurs when different data transmitted on the same frequency interferes with each other at the receiver) the unauthorized claimant's receiver by masking the beam zero authentication signal. In addition, it should be noted that since the unauthorized claimant may be located outside of the perimeter of the beam zero authentication beam, the shielding guard beams may be closer in terms of distance to the unauthorized claimant than the beam zero authentication beam. As such, the shielding guard beams may have a higher signal strength at the unauthorized claimant's receiver than the beam zero authentication beam. As such, the higher signal strengths of the guard beams may help to shield the beam zero authentication signal from the unauthorized claimant's receiver.

A second aspect of the authentication system is that only a single signal transmission source may be required. This may be the case, for example, if the disclosed system employs an Iridium Low Earth Orbit (LEO) satellite constellation, where each of the satellites in the constellation has an antenna geometry that transmits forty-eight (48) spot beams with a distinctive spot beam pattern. An authenticator device can authenticate an authorized entity, user, and/or message by determining that the claimant is located within the correct spot beam. Alternatively, the authenticator device can authenticate an authorized entity, user, and/or message by determining that the claimant is located within the correct spot beam at the correct time. The beam geometry of the satellites in this particular constellation allows for the previously discussed spoofing deterrent to take place when employing only one of these satellites to transmit at least two beams. It should be noted that in alternative embodiments, the system may employ more than one signal transmission source.

In one or more embodiments, when the authentication system employs the Iridium satellite constellation, at least one of the satellites may be used to transmit at least one high power signal, which may include a unique pseudorandom noise (PRN) code segment (i.e., an authentication key). An authorized claimant on the ground may record this signal, which includes the beam specific authentication key, and then transmit the recorded signal to an authenticator device (e.g., via a terrestrial network) in an attempt to prove its claimed false position. As the spot beams' configuration and overlap change with time, a given authorized claimant will log a unique key history. Would-be hackers (i.e., unauthorized claimants) located outside of the authentication region cannot access the authentication keys and/or substantiate their location and, therefore, are denied access to the system. As such, the system may be difficult to spoof or hack because of the sheer number of satellites that are employed, the satellites' low orbits, the rapid motion of the spot beams, and the spot beam configuration of the Iridium satellites. In at least one embodiment, in addition to the spot beam authentication feature, this system leverages geolocation to constrain authentication to within 100 meters (m), typically.

A third aspect of the authentication system is that, when employing one of the above-described Iridium LEO satellites, for example, the transmission signal power is sufficiently strong enough to allow for the signal to penetrate into an indoor environment. This allows for the system to be used for many indoor applications for authentication technologies.

In order to better understand how the authentication systems and methods are able to benefit network security, a brief discussion regarding network security is presented. Network security remains an important infrastructural element as networked electronic systems become more engrained into society and integrated into cyber systems. Such systems are utilized for extensive data processing, for other more general processes through the web, and for other networks whose vulnerability threatens our national infrastructure. Foreign and domestic efforts to infiltrate, compromise, and/or disable key infrastructural elements are increasing and, thus, there is a need to bolster network security in order to protect these systems from these growing threats. Access to these systems by an unauthorized party may have varying degrees of societal impact; and while any given attack may seem to be less significant in nature, it could be the predecessor to a more aggressive future attack. Electronic cyber systems worldwide are seeing dramatic increases in cyber attacks. Cyber attacks often stem from network vulnerabilities, and are often conducted by impersonating a legitimate end user.

Existing methods to detect unauthorized users or compromised electronic systems are lacking, in that, even if an attack is discovered, the culprit's methods may hide the location of where the unauthorized access originated. This issue creates additional problems in that if the attack is believed to have originated in, for instance, a foreign country, the inability to determine the general vicinity of the unauthorized user means that officials may not be able to seek amends or more aggressively pressure foreign countries for conducting investigations of such cyber attacks on the United States.

Current existing identity verification methods are, in general, non-dynamic (e.g., use passwords, pins, etc.), and this leaves these systems more vulnerable to interception and other brute force hacking methods. From a high level, these network security systems have three primary goals: (1) authenticating only authorized users, (2) maintaining system availability and reliability, and (3) restricting access to unauthorized users. Accordingly, it would be advantageous to have improved techniques to restrict access, to authenticate legitimate authorized users, and to maintain system availability and reliability, while at the same time bolster the security of these existing network systems.

In one embodiment at least one authentication signal may be transmitted from at least one Iridium satellite. Each Iridium satellite has forty-eight (48) spot beams that may be used to transmit localized authentication signals to claimants on or near the Earth's surface. The broadcasted message burst content associated with these authentication signals includes pseudorandom noise (PRN) data. Since a given message burst may occur within a specific satellite spot beam at a specific time, the message burst content including PRN and unique beam parameters (e.g., time, satellite identification (ID), time bias, orbit data, etc.) may be used to authenticate the claimant.

As briefly discussed above, a spot beam based authentication system may be inherently vulnerable to spoofing by an unauthorized claimant. Such a claimant can put a receiver device at a location near the authentication signal's intended claimant in order to eavesdrop on the signal transmission. By doing so, an unauthorized claimant can attempt to spoof the specialized authentication signal. This may be accomplished by recording the transmitted authentication data and completing signal processing to develop a signal that has the same bits as the recorded signal and has timing and Doppler characteristics consistent with the location of the intended claimant. By doing this, the authenticator device may think the unauthorized claimant is actually at the same location as the authorized claimant. However, the unauthorized claimant would have to attempt to record the data from an adjacent spot beam, as recording the data within beam zero would be unlikely due to the infrastructural complexity associated with doing so.

With the use of Iridium satellites for transmission, the authentication signal may be a strong signal with a structure that allows it to be received indoors. As such, it may be relatively easy for an unauthorized claimant having an outdoor receiver that is located outside of beam zero to receive the authentication signal if the unauthorized claimant is receiving only signal plus noise (i.e., this occurs in the case when an authentication signal is being transmitted with no guard beams). However, when the satellite is broadcasting different signals in adjacent spot beams, it may be much more difficult for the unauthorized claimant to receive the authentication data that is intended for an authorized claimant at the spoofed location.

In one or more embodiments, in order to mitigate successful spoofing, the authentication systems: (1) transmit an authentication signal via beam zero for the intended legitimate, authorized claimant; and (2) transmit guard signals, which may be on the same frequency as the authentication signal, via guard beams surrounding beam zero and the intended, authorized claimant. As such, the unauthorized claimant's receiver may receive multiple authentication signals including data from beam zero and its guard beams, and may have difficulty processing the data, as it may be difficult to extract a signal out of a signal versus extract a signal out of noise. Additionally, if the unauthorized claimant is able to process at least one of the signals, the signal(s) may be one of the guard signals due to the fact that the received power of the guard beams may be stronger at the unauthorized claimant's receiver location because the guard beams are located closer to the unauthorized claimant. In at least one embodiment, the outside guard beams may have a higher relative power than any of the inner guard beams.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method to improve data access control, the method comprising:

assigning at least one threshold to at least one contextual criterion;

receiving, by a receiver associated with a claimant, at least one secure geographically dependent spot beam based signal;

receiving contextual information from the claimant;

determining whether the contextual information from the claimant meets the at least one threshold to the at least one contextual criterion;

authenticating the claimant, when the contextual information from the claimant meets at least one of the at least one threshold to the at least one contextual criterion; and allowing the claimant access to data, when the claimant is authenticated, wherein the contextual information from the claimant includes a geographical location of the claimant when the claimant is attempting to access the data, the geographical location of the claimant is determined by using satellite geolocation techniques, and the satellite geolocation techniques use the at least one secure geographically dependent spot beam based signal to obtain the geographical location of the claimant, wherein the at least one secure geographically dependent spot beam based signal depends upon the geographical location of the receiver associated with the claimant.

2. The method of claim 1, wherein the at least one contextual criterion is at least one of a permitted geographic area of permitted accessibility defined by a permitted virtual data boundary, a non-permitted geographic area of non-permitted accessibility defined by a non-permitted virtual data boundary, a permitted time of permitted accessibility, a non-permitted time of non-permitted accessibility, a permitted subset of a population with permitted accessibility, a non-permitted subset of the population with non-permitted accessibility, and a password.

3. The method of claim 2, wherein the permitted subset of the population and the non-permitted subset of the population each include at least one person.

4. The method of claim 1, wherein the contextual information from the claimant further includes at least one of a time of day the claimant is attempting to access the data, a day of the week the claimant is attempting to access the data, a job function assigned to the claimant, a quantity of data the claimant has gained access to during a first predefined time period, a number of times the claimant has logged in during a second predefined time period, and a type of a device associated with the claimant that the claimant is using to attempt to access the data.

5. The method of claim 1, wherein the at least one signal used for authentication is transmitted by at least one transmission source.

6. The method of claim 5, wherein the at least one transmission source is employed in at least one of at least one satellite and at least one pseudo-satellite.

7. The method of claim 6, wherein the at least one satellite is at least one of a Lower Earth Orbiting (LEO) satellite, a Medium Earth Orbiting (MEO) satellite, and a Geosynchronous Earth Orbiting (GEO) satellite.

8. The method of claim 1, wherein the geographical location of the claimant is further determined by using ranging techniques.

9. The method of claim 1, wherein access to the data is obtained by at least one of viewing at least a portion of the data, copying at least a portion of the data, editing at least a portion of the data, deleting at least a portion of the data, and adding additional data to the data.

10. The method of claim 1, wherein the method further comprises providing viewing access to at least a portion of the data, when the claimant is authenticated, by supplying to the claimant at least one of a file containing the at least a portion of the data and a link to a webpage including the at least a portion of the data.

11. The method of claim 1, wherein at least a portion of the data is related to at least one of at least one textual file, at least one image file, at least one application, at least one webpage, at least one computer code, and at least one server structure.

12. The method of claim 1, wherein at least one of the at least one contextual criterion is dependent upon a type of a device associated with the claimant.

13. The method of claim 12, wherein the type of the device associated with the claimant is one of a laptop computer, a desktop computer, a cellular device, and a personal digital assistant (PDA).

14. The method of claim 1, wherein at least a portion of the contextual information from the claimant is related to at least one of an identity of the claimant, a device associated with the claimant that is attempting to access the data, a device associated with the claimant that is not attempting to access the data, the data the claimant is attempting to access, a node that is storing the data the claimant is attempting to access, interconnects between the node that is storing the data and the device associated with the claimant, and a network that the data the claimant is attempting to access resides.

15. The method of claim 1, wherein the method further comprises logging at least a portion of the contextual information from the claimant.

16. The method of claim 1, wherein the data is encrypted, and wherein the encrypted data is decrypted by the claimant by using a decryption key.

17. The method of claim 16, wherein the decryption key is based on at least one of the at least one contextual criterion.

18. The method of claim 16, wherein the data is encrypted by at least one of an author of the data, an owner of the data, an editor of the data, a device that is creating the data, and a network node transmitting the data.

19. The method of claim 1, wherein the at least one threshold to the at least one contextual criterion is assigned by at least one of an author of the data, an owner of the data, an editor of the data, a device that is creating the data, and a network management entity.

20. A device to improve data access control, the device comprising:

memory to store data, data access control policies, and at least one executable program product to enforce at least one of the data access control policies;

a transmitter to transmit contextual information related to a claimant associated with the device;

a receiver to receive at least one secure geographically dependent spot beam based signal, and to receive a response regarding whether the claimant is authenticated; and at least one processor to enforce the data access control policies and to allow the claimant access to at least a portion of the data, when the claimant is authenticated, wherein the contextual information from the claimant includes a geographical location of the claimant when the claimant is attempting to access the data, the geographical location of the claimant is determined by using satellite geolocation techniques, and the satellite geolocation techniques use the at least one secure geographically dependent spot beam based signal to obtain the geographical location of the claimant, wherein the at least one secure geographically dependent spot beam based signal depends upon the geographical location of the receiver of the device, which is associated with the claimant.

21. A method for a device to improve data access control, the method comprising:

storing, in memory of the device, data, data access control policies, and at least one executable program product to enforce at least one of the data access control policies;

receiving, by a receiver associated with the device, at least one secure geographically dependent spot beam based signal;

transmitting, by a transmitter associated with the device, contextual information related to a claimant associated with the device;

receiving, by the receiver associated with the device, a response regarding whether the claimant is authenticated; and enforcing, by at least one processor associated with the device, the data access control policies and allowing the claimant access to at least a portion of the data, when the claimant is authenticated, wherein the contextual information from the claimant includes a geographical location of the claimant when the claimant is attempting to access the data, the geographical location of the claimant is determined by using satellite geolocation techniques, and the satellite geolocation techniques use the at least one secure geographically dependent spot beam based signal to obtain the geographical location of the claimant, wherein the at least one secure geographically dependent spot beam based signal depends upon the geographical location of the receiver associated with the device, which is associated with the claimant.

22. The method of claim 21, the method further comprises, performing with the at least one processor at least one of:

causing at least a portion of the data to be deleted from the memory, encrypting at least a portion of the data in memory, causing a notification to be sent to a network management entity, and providing to the claimant access to false data, when the response regarding whether the claimant is authenticated is not received within a predefined time duration starting from when the transmitter transmitted the contextual information.

23. The method of claim 21, the method further comprises, performing with the at least one processor at least one of:

causing at least a portion of the data to be deleted from the memory, encrypting at least a portion of the data in memory, causing a notification to be sent to a network management entity, and providing to the claimant access to false data, when the data is not accessed by the claimant within a predefined time duration starting from when the at least one processor allows the claimant access to the data.

24. The method of claim 21, the method further comprises, performing with the at least one processor at least one of:

causing at least a portion of the data to be deleted from the memory, encrypting at least a portion of the data in memory, causing a notification to be sent to a network management entity, and providing to the claimant access to false data, when the data is attempted to be accessed by the claimant after the receiver received a response that the claimant is not authenticated.

25. A system to improve data access control, the system comprising:

a first transmitter to transmit contextual information from a claimant;

a first receiver to receive the contextual information;

at least one processor to determine whether the contextual information meets at least one threshold that is assigned to at least one contextual criterion, to authenticate the claimant if the contextual information meets at least one of the at least one threshold to the at least one contextual criterion, to allow the claimant access to data if the claimant is authenticated, and to not allow the claimant access to the data if the claimant is not authenticated;

a second transmitter to transmit a response regarding whether the claimant is authenticated; and a second receiver to receive at least one secure geographically dependent spot beam based signal, and to receive the response regarding whether the claimant is authenticated, wherein the contextual information from the claimant includes a geographical location of the claimant when the claimant is attempting to access the data, the geographical location of the claimant is determined by using satellite geolocation techniques, and the satellite geolocation techniques use the at least one secure geographically dependent spot beam based signal to obtain the geographical location of the claimant, wherein the at least one secure geographically dependent spot beam based signal depends upon the geographical location of the second receiver, which is associated with the claimant.

26. The system of claim 25, wherein the at least one contextual criterion is at least one of a permitted geographic area of permitted accessibility defined by a permitted virtual data boundary, a non-permitted geographic area of non-permitted accessibility defined by a non-permitted virtual data boundary, a permitted time of permitted accessibility, a non-permitted time of non-permitted accessibility, a permitted subset of a population with permitted accessibility, a non-permitted subset of the population with non-permitted accessibility, and a password.

27. The system of claim 26, wherein the permitted subset of the population and the non-permitted subset of the population each include at least one person.

28. The system of claim 25, wherein the contextual information from the claimant further includes at least one of a time of day the claimant is attempting to access the data, a day of the week the claimant is attempting to access the data, a job function assigned to the claimant, a quantity of data the claimant has gained access to during a first predefined time period, a number of times the claimant has logged in during a second predefined time period, and a type of a device associated with the claimant that the claimant is using to attempt to access the data.

29. The system of claim 25, wherein the at least one signal used for authentication is transmitted by at least one transmission source.

30. The system of claim 29, wherein the at least one transmission source is employed in at least one of at least one satellite and at least one pseudo-satellite.

31. The system of claim 30, wherein the at least one satellite is at least one of a Lower Earth Orbiting (LEO) satellite, a Medium Earth Orbiting (MEO) satellite, and a Geosynchronous Earth Orbiting (GEO) satellite.

32. The system of claim 25, wherein the geographical location of the claimant is further determined by using ranging techniques.

33. The system of claim 25, wherein access to the data is obtained by at least one of viewing at least a portion of the data, copying at least a portion of the data, editing at least a portion of the data, deleting at least a portion of the data, and adding additional data to the data.

34. The system of claim 33, wherein when the claimant is authenticated, the at least one processor is to provide the viewing access to at least a portion of the data by supplying to the claimant at least one of a file containing the at least a portion of the data and a link to a webpage including the at least a portion of the data.

35. The system of claim 25, wherein at least a portion of the data is related to at least one of at least one textual file, at least one image file, at least one application, at least one webpage, at least one computer code, and at least one server structure.

36. The system of claim 25, wherein at least one of the at least one contextual criterion is dependent upon a type of a device associated with the claimant.

37. The system of claim 36, wherein the type of the device associated with the claimant is one of a laptop computer, a desktop computer, a cellular device, and a personal digital assistant (PDA).

38. The system of claim 25, wherein at least a portion of the contextual information from the claimant is related to at least one of an identity of the claimant, a device associated with the claimant that is attempting to access the data, a device associated with the claimant that is not attempting to access the data, the data the claimant is attempting to access, a node that is storing the data the claimant is attempting to access, interconnects between the node that is storing the data and the device associated with the claimant, and a network that the data the claimant is attempting to access resides.

39. The system of claim 25, wherein the at least one processor is to log at least a portion of the contextual information from the claimant.

40. The system of claim 25, wherein the data is encrypted, and wherein the encrypted data is decrypted by the claimant by using a decryption key.

41. The system of claim 40, wherein the decryption key is based on at least one of the at least one contextual criterion.

42. The system of claim 40, wherein the data is encrypted by at least one of an author of the data, an owner of the data, an editor of the data, a device that is creating the data, and a network node transmitting the data.

43. The system of claim 25, wherein the at least one threshold to the at least one contextual criterion is assigned by at least one of an author of the data, an owner of the data, an editor of the data, a device that is creating the data, and a network management entity.

* * * * *